(12) United States Patent
Ganesan et al.

(10) Patent No.: US 7,302,411 B2
(45) Date of Patent: Nov. 27, 2007

(54) ELECTRONIC BILLING WITH REQUIRED VIEWING OF SUPPLEMENTAL INFORMATION

(75) Inventors: Ravi Ganesan, Norcross, GA (US); Kenneth Hobday, Powell, OH (US)

(73) Assignee: Checkfree Corporation, Norcross, GA (US)

( * ) Notice: Subject to any disclaimer, the term of this patent is extended or adjusted under 35 U.S.C. 154(b) by 1102 days.

(21) Appl. No.: 09/798,895

(22) Filed: Mar. 6, 2001

(65) Prior Publication Data
US 2001/0037296 A1  Nov. 1, 2001

Related U.S. Application Data

(63) Continuation-in-part of application No. 09/414,731, filed on Oct. 8, 1999.

(51) Int. Cl.
*G06Q 40/00* (2006.01)

(52) U.S. Cl. ................. 705/35; 37/39; 37/40; 385/1.15

(58) Field of Classification Search ................. 705/40, 705/37, 39; 385/1.15
See application file for complete search history.

(56) References Cited

U.S. PATENT DOCUMENTS

| | | | |
|---|---|---|---|
| 4,277,837 A | 7/1981 | Stuckert | 364/900 |
| 4,319,336 A | 3/1982 | Anderson et al. | 364/900 |
| 4,460,960 A | 7/1984 | Anderson et al. | 364/200 |
| 5,007,084 A | 4/1991 | Materna et al. | |
| 5,025,373 A | 6/1991 | Keyser, Jr. et al. | 364/408 |
| 5,220,501 A | 6/1993 | Lawlor et al. | 364/408 |
| 5,231,571 A | 7/1993 | D'Agostino | 364/408 |
| 5,283,829 A | 2/1994 | Anderson | 380/24 |
| 5,287,270 A | 2/1994 | Hardy et al. | 364/408 |
| 5,325,290 A | 6/1994 | Cauffman et al. | 364/401 |
| 5,326,959 A | 7/1994 | Perazza | 235/379 |
| 5,336,870 A | 8/1994 | Hughes et al. | 235/379 |
| 5,341,429 A | 8/1994 | Stringer et al. | 380/23 |
| 5,347,632 A | 9/1994 | Filepp et al. | 395/200 |

(Continued)

FOREIGN PATENT DOCUMENTS

DK     19539617     5/1996

(Continued)

OTHER PUBLICATIONS

Jessica Ostrow, "MSFDC Puts financial institutions at the heart of Internet bill presentment and payment" Journal of Retail Banking Service, New York: Autumn 1998. vol. 20, Iss. 3; p. 1,7 pages.*

(Continued)

*Primary Examiner*—Jagdish Patel
*Assistant Examiner*—Harish T. Dass
(74) *Attorney, Agent, or Firm*—Sutherland Asbill & Brennan LLP

(57) ABSTRACT

The present invention provides a method, system, and article of manufacture for presenting information via a network. Multiple information identifiers, each associated with information to be directed to a network user, are received and stored. A notice of availability of the information, as well as one of the information identifiers, are transmitted to the network user. Only after the network user views the information associated with the transmitted information identifier, another information identifier is transmitted to the network user to allow the network user to view the information associated with the other information identifier.

27 Claims, 47 Drawing Sheets

U.S. PATENT DOCUMENTS

| | | | |
|---|---|---|---|
| 5,383,113 A | 1/1995 | Kight et al. | 364/401 |
| 5,420,405 A | 5/1995 | Chasek | 235/379 |
| 5,465,206 A | 11/1995 | Hilt et al. | 364/406 |
| 5,473,143 A | 12/1995 | Vak et al. | |
| 5,483,445 A | 1/1996 | Pickering | 364/406 |
| 5,594,910 A | 1/1997 | Filepp et al. | 395/800 |
| 5,649,117 A | 7/1997 | Landry | |
| 5,655,089 A | 8/1997 | Bucci | 395/240 |
| 5,699,528 A | 12/1997 | Hogan | 395/240 |
| 5,710,889 A | 1/1998 | Clark et al. | 395/244 |
| 5,727,249 A | 3/1998 | Pollin | 705/40 |
| 5,794,221 A | 8/1998 | Egendorf | |
| 5,815,665 A | 9/1998 | Teper et al. | |
| 5,832,460 A | 11/1998 | Bednar et al. | |
| 5,884,288 A | 3/1999 | Chang et al. | |
| 5,943,656 A | 8/1999 | Crooks et al. | |
| 5,956,700 A | 9/1999 | Landry | |
| 5,963,925 A * | 10/1999 | Kolling et al. | 705/40 |
| 5,978,780 A | 11/1999 | Watson | |
| 6,035,285 A | 3/2000 | Schlect et al. | |
| 6,044,362 A | 3/2000 | Neely | |
| 6,055,567 A | 4/2000 | Ganesan et al. | |
| 6,070,150 A | 5/2000 | Remington et al. | |
| 6,078,907 A * | 6/2000 | Lamm | 705/40 |
| 6,128,603 A | 10/2000 | Dent et al. | |
| 6,173,272 B1 | 1/2001 | Thomas et al. | |
| 6,188,994 B1 | 2/2001 | Egendorf | |
| 6,285,991 B1 | 9/2001 | Powar | |
| 6,289,322 B1 * | 9/2001 | Kitchen et al. | 705/40 |
| 6,292,789 B1 * | 9/2001 | Schutzer | 705/40 |
| 6,304,857 B1 | 10/2001 | Heindel et al. | |
| 6,374,229 B1 | 4/2002 | Lowrey et al. | |
| 2001/0032181 A1 | 10/2001 | Jackstadt et al. | |
| 2001/0037240 A1* | 11/2001 | Marks et al. | 705/14 |
| 2001/0037295 A1 | 11/2001 | Olsen | |
| 2002/0002536 A1 | 1/2002 | Braco | |
| 2002/0007320 A1 | 1/2002 | Hogan et al. | |
| 2002/0019808 A1 | 2/2002 | Sharma | |
| 2002/0023041 A1* | 2/2002 | Brett | 705/37 |
| 2002/0023055 A1 | 2/2002 | Antognini et al. | |
| 2002/0029248 A1 | 3/2002 | Cook et al. | |
| 2002/0065772 A1 | 5/2002 | Saliba et al. | |
| 2002/0069163 A1 | 6/2002 | Gilbert | |
| 2002/0069168 A1 | 6/2002 | Lee et al. | |
| 2005/0197957 A1* | 9/2005 | Keith et al. | 705/40 |
| 2005/0203835 A1* | 9/2005 | Nhaissi et al. | 705/39 |

FOREIGN PATENT DOCUMENTS

| | | |
|---|---|---|
| EP | 0370146 | 5/1990 |
| EP | 0745947 | 12/1996 |
| WO | 99/10823 | 3/1999 |
| WO | 00/48102 | 8/2000 |

OTHER PUBLICATIONS

Open Financial Exchange Bill Presentment, Jun. 12, 1997, 1997 CheckFree Corp., Intuit Inc., Microsoft Corp., pp. 312-356.

* cited by examiner

| Biller | First Network Address | Second Network Address |
|---|---|---|
| #1 | URL 1A | URL 1B |
| #2 | URL 2A | URL 2B |
| #3 | URL 3 | |
| | | |
| | | |
| | | |
| | | |
| | | |
| | | |
| | | |
| n | | |

Figure 22B

| Biller | First Network Address | Second Network Address | Forced Network Address |
|---|---|---|---|
| #1 | URL 1A | URL 1B | URL 1C |
| #2 | URL 2A | URL 2B | URL 2C |
| #3 | URL 3 | | |
| | | | |
| | | | |
| | | | |
| | | | |
| | | | |
| | | | |
| n | | | |

Figure 22D

ELECTRONIC BILLING WITH REQUIRED VIEWING OF SUPPLEMENTAL INFORMATION

RELATED APPLICATIONS

This application is a Continuation-In-Part of pending application Ser. No. 09/414,731, entitled "Electronic Billing With Flexible Biller Controlled Electronic Bill Presentment", filed Oct. 8, 1999, which is related to application Ser. No. 09/017,169, entitled "Distributed Data Accessing Technique", filed Feb. 2, 1998, now U.S. Pat. No. 6,055,567.

FIELD OF THE INVENTION

The present invention relates to electronic bill presentment and more particularly to electronic billing with biller controlled electronic bill and supplemental information presentment.

BACKGROUND OF THE INVENTION

There are two prevalent models for electronic bill presentment that are currently used in industry. The first is an aggregation model 10, which is shown in FIG. 1. In its simplest form, the aggregation model 10 includes a customer 12, an aggregator 14, and a plurality of billers 16. The customer 12 can be, for example, an individual person, a family, or a business. The aggregator 14 can be a financial institution (FI) such as, for example, a bank. Alternatively, the aggregator 14 can be a separate entity which acts of behalf of a sponsor 18, which can also be an FI such as a bank. Each biller 16 can be of any billing institution type such as, for example, a local telephone company, a local electric company, a retail outlet, or a national long distance telephone company.

Each biller 16 provides customer-related invoice data to the aggregator 14. The aggregator 14 serves as an intermediary between each biller 16 and the customer 12 by providing bill presentment directly to the customer 12, potentially on behalf of the sponsor 18.

There are two variants of the aggregation model 10 resulting from the ownership, or "branding", of the presentation experience and the communication channel between the aggregator 14 and the customer 12. In one variant, the aggregator 14 may offer aggregator branding, thus totally owning both the presentation experience and the communication channel between the aggregator 14 and the customer 12. In the other variant, the aggregator 14 may offer sponsor-branding, thus staying "behind the scenes" in terms of the presentation experience and supporting the communication channel between the aggregator 14 and the customer 12 on behalf of the sponsor 18.

The second prevalent model for electronic bill presentment is a biller direct model 20, which is shown in FIG. 2. In its simplest form, the biller direct model 20 includes a customer 12 and at least one biller 16. In the biller direct model 20, each biller 16 retains the customer-related invoice data and the full relationship with the customer 12 (i.e., the presentation experience and the communication channel). The customer 12 may have software for providing a capability similar to Web browser bookmarking so as to allow easy navigation between billers, and thus some level of virtual aggregation. However, there is no actual aggregation such as with the aggregator 14 of the aggregation model 10 described above.

The above-described models present a dichotomy between a sponsor-centric view and a biller-centric view of bill presentment. That is, the aggregation model 10 allows the aggregator 14 and/or the sponsor 18 to use customer-related invoice data, bill presentment, and the communication channel between the aggregator 14 and the customer 12 for cross-selling or other peripheral services. The biller direct model 20, on the other hand, insures that control of customer-related invoice data, bill presentment, and the communication channel between the biller 16 and the customer 12 remains with the biller 16.

Also, neither of the above-described models adopts a truly customer-centric view. That is, neither of the above-described models allow a customer 12 to interact directly with individual billers 16 while retaining the benefits of interacting with a single aggregator 14 such as, for example, the ability to retain a single authentication and log-in procedure and a common bill presentation framework. Further, neither of the above-described models allow a customer 12 to retain the benefits of interacting with a single aggregator 14 while allowing the aggregator 14, billers 16, and sponsor 18 to retain certain preferences such as, for example, the ability to retain control of customer-related data and a communication channel with each customer 12. Accordingly, it would be desirable to provide a distributed data accessing technique which addresses the above-mentioned shortcomings of the above-described models.

When delivering paper bills to customers, billers often include supplemental information with the delivered paper bills. This supplemental information typically includes special announcements, promotional offers, regulatory notices, and notices associated with the customer's account, such as terms and conditions. Typically, supplemental information is printed on materials included in a same envelope in which a bill is delivered, and as such these materials are sometimes referred to as envelope stuffers. Also, supplemental information may be printed on the paper bill itself.

Supplemental information is also delivered with bills presented electronically. Both the aggregation model and the biller direct model support supplemental information delivery with electronic bills. Supplemental information may be delivered two ways. In a first variant, the supplemental information is incorporated into an electronic bill image. Depending upon the amount of supplemental information, this can substantially increase the size of the bill image. This results in increased data storage needs, as bill images are typically retained for lengthy periods of time. Increased bill image size can also adversely impact performance of bill image retrieval, transmission, and display. Additionally, the method used for presenting the bill content may unduly constrain the presentation of the supplemental information, as bill content is primarily textual, while supplemental information often includes graphics, streaming audio, and streaming video.

In a second variant, the supplemental information is not presented with the bill image, but rather is presented through an electronic bill presentment user interface, perhaps on a bill summary information screen. The presentment can either be the supplemental information itself, or a hyper-link to the supplemental material. Decoupling the supplemental information from bill images alleviates the aforementioned storage and performance problems. Use of hyper-links to supplemental information solves the problem of unduly constraining the presentation of the supplemental information, whether it be presented with the bill image or through a user interface. However, in either variant, there is currently no technique to ensure that a customer actually views supplemental information.

OBJECTS OF THE INVENTION

It is an object of the present invention to provide a flexible data accessing technique that allows an information provider to enforce network user access of certain information before network user access of other information.

The above-stated objects, as well as other objects, features, and advantages, of the present invention will become readily apparent from the following detailed description which is to be read in conjunction with the appended drawings.

SUMMARY OF THE INVENTION

In accordance with a first embodiment of the present invention, a method is provided for presenting information via a network. The information may be any type of information which is capable of being presented via a network. The network could be a public network, such as the Internet, a private network, such as a local area network, or any other type of network over which information could be presented. A system and an article of manufacture are provided for implementing the method.

According to the method, a first information identifier and a second information identifier are received. The first information identifier is associated with first information. The second information identifier is associated with second information. An information identifier identifies a location of the information with which it is associated, and optionally identifies the nature of the information. An information identifier is preferably, but is not limited to, a link to the information, such as an icon, or a hyper-link. The first information and the second information are each associated with the same network user. That is, each is intended for the same network user. The information identifiers are stored upon their receipt.

Also according to the method, a notice of availability as well as the first information identifier are transmitted to the network user at the same time. The notice of availability informs the network user that the first information and the second information are available for that network user. However, as only the first information identifier has been transmitted to the network user, the network user can only access the first information. The transmitted first information identifier is processed to access the first information. Preferably, the first information identifier is clicked on, or otherwise selected, to cause the first information to be presented to the network user. However, if the first information identifier is not a link, the first information identifier is nonetheless still processed to cause the first information to be presented.

The second information identifier is transmitted to the network user only after the network user requests access to the first information. This could be a transmission which takes place automatically upon the network user requesting access to the first information, or this could be a transmission in response to some other trigger. In any event, the second information identifier is not transmitted to the network user until the network user requests access to the first information.

According to an aspect of this first embodiment of the invention, the transmitted second information identifier is processed, as described above, to access the second information.

In a particularly beneficial aspect of this first embodiment of the present invention, the first information identifier and the second information identifier are received from a biller. A biller is an entity which issues bills for goods or services provided to customers. The biller could be the actual entity which provides the goods or services, or could be an entity which issues bills on behalf of a provider of goods or services. The first information identifier is a first hyper-link to a first network address storing the first information. Likewise, the second information identifier is a second hyper-link to a second network address, different than the first network address, storing the second information. The second information is detailed billing information for a bill of the network user. Detailed billing information could include one, or any combination of, an amount of a bill, a date the bill is due, a network user's account number, bill particulars, as well as other information typically found on a bill.

The first information is supplemental information. Supplemental information, in this aspect, is information other than billing information. This could include any of, but is not limited to, special announcements, promotional offers, regulatory notices, and notices associated with the network user's account. Supplemental information is information the biller wishes the network user to view before viewing bill detail information. Thus, this first embodiment of the present invention allows a biller to force a network user to view supplemental information before viewing bill detail information.

It will be appreciated that the first information could be bill detail information, and the second information could be supplemental information. In such a case, the network user would be required to view bill detail before viewing supplemental information. Also, the first information could be bill detail information, and the second information could be information which enables the network user to pay the bill, such as a network address at a bill payment service. In such a case, the network user would have to view bill detail information before paying the bill.

According to another aspect of this method, the first information identifier is transmitted to the network user by a first entity, and the second information identifier is transmitted to the network user by a second entity different than the first entity.

In another beneficial aspect of this first embodiment, a second notice, different than the notice of availability, is received. This notice indicates that the network user has accessed the first information. This second notice is stored. By storing the second notice, a record of the network user having accessed the first information is created. Advantageously, the second information identifier is transmitted to the network user only after receipt of the second notice. As described above, this may be an automatic transmission upon receipt of this notice, or may be upon the occurrence of another trigger.

In yet another advantageous aspect of the first embodiment of the invention, the first and the second information are each associated with a bill of the network user. The first information could be bill detail information, and the second information could be information associated with payment of the bill. The first information could be bill summary information, and the second information could be information associated with payment of the bill. The first information could be information other than billing information that a biller requires a payer to view before viewing the second information. In any event, a request to pay the bill is processed only after the network user requests access to the first information. Thus, a network user is required to access first information before paying the bill. In a related, yet different, aspect of the first embodiment, a request to pay the bill is processed only after the network user requests access to both the first information and the second information. Thus, a network user is required to access both first and second information before paying the bill.

According to another beneficial aspect of the first embodiment of the present invention, the first information and the second information are each personalized information associated with the network user. That is, the first information and the second information are each directed to the network user in particular. It should be understood that the network user could be one of a plurality of network users, and the first information and the second information could each be directed to only this network user. Or, the network user could be a member of a class of network users, and each member of that class could receive the same or similar personalized information. That is, the information is personalized for a class of network users.

In a particularly advantageous aspect of this first embodiment of the invention, the first information identifier is transmitted to the network user a second time. Thus, because the first information identifier is stored, e.g. retained for future use, the network user is enabled to access the first information more than once. This second transmission of the first information identifier could be an automatic transmission, or the network user could request that the first information identifier be transmitted a second time. Furthermore, in this aspect of the first embodiment, the number of transmissions of the first information identifier is not limited to two transmissions.

In another aspect of this first embodiment, the stored first and second information identifiers are stored in a memory. The first information identifier is removed from the memory after the network user requests access to the first information. In this manner, the first information is only presented to the network user once. Thereinafter, the first information is unavailable to the network user.

The system to implement the method of this first embodiment of the present invention includes a first network station, a second network station, and a third network station. A network station could be a personal digital assistant (PDA), cellular or digital telephone, personal computer, high-powered workstation, server, sophisticated mainframe computer, or any computing device capable of performing the functions described herein. The first network station is configured, e.g. programmed, to transmit the first information identifier and the second information identifier to the second network station. The second network station is configured, e.g. programmed, to store the received information identifiers, transmit the notice and the first information identifier to the network user, and transmit the second information identifier to the network user, as described above. The third network station is configured, e.g. programmed, to process the transmitted first information identifier to access the first information and to process the transmitted second information identifier to access the second information, also as described above.

In another aspect of the system of the first embodiment, the first network station is a biller network station, the second network station is a central network station, and the third network station is a user network station.

As in the method described above, the first network station is further configured to transmit the second information identifier to the network user. Thus, the first and the second network stations are each configured to transmit the second information identifier to the network user. Only one of these network stations could transmit the second information identifier to the network user, or both of these network stations could transmit the second information identifier to the network user.

In accordance with a second embodiment of the present invention, a method is provided for presenting billing information via a network. Billing information is information from a biller for a customer. As above, a biller could be an entity which provides goods or services to a customer, or could be an entity which bills on behalf of such an entity. The network is also as described above. A system and article of manufacture are provided for implementing the method.

According to the method of the second embodiment, a first message is transmitted to the network user. The message indicates availability of detailed billing information and availability of supplemental information. Detailed billing information could include any or all information typically contained on a bill. Supplemental information is information other than detailed billing information that a biller wishes presented to a network user. The first message includes a hyper-link to only the supplemental information. Thus, as will be understood from the discussion above, the network user can only access the supplemental information upon receipt of the first message.

A second message is received which indicates an accessing of the supplemental information by the network user. This second message may be received from the network user, or from another entity, perhaps an entity at which the supplemental information is stored.

A third message is then transmitted. This message is transmitted to the network user and is only transmitted only after receipt of the second message. The third message includes a hyper-link to the detailed billing information. Thus, the network user can only access the detailed billing information after accessing the supplemental information.

The system to implement the method of this second embodiment of the present invention includes at least one processor for processing data, a memory for storing data, and a communications port for transmitting and receiving information via a network. The processor may be any type processor capable of functioning as described herein, though preferably the processor is a server. The memory may be an type of memory capable of storing data, including random access memory, floppy or had magnetic disk, or optical disk. Data stored in the memory and the data processed by the processor are exchanged between the processor and the memory. The data includes the detailed billing information and the supplemental information, among other data. The processor is configured, e.g. programmed, to implement the method of the second embodiment, described above.

In accordance with a third embodiment of the present invention, a method is provided for distributing bill related information via a network. The network will be understood by reference to the above discussion. The bill related information could be any of the information discussed above, including detailed billing information, supplemental information from a biller, and bill payment information.

According to the method of this third embodiment, a first information identifier and a second information identifier are received. An information identifier will be understood by reference to the above discussion. The first information identifier is associated with first bill related information. The second information identifier is associated with second bill related information. The first and the second bill related information are each associated with a bill of a network user.

The received first information identifier and the received second information identifier are stored.

The received first information identifier and the received second information identifier are processed to select a mode of operation. The mode of operation is preferably selected based only upon processing the first and the second information identifiers. Though, other information in addition to the information identifiers could be processed to select the mode of operation.

If a first mode is selected, a notice of availability as well as the first information identifier are transmitted to the network user at the same time, as will be understood by reference to the above discussion of the first embodiment. Thus, as above, if a first mode is selected the network user must access the first information before accessing the second information.

If a second mode is selected, a notice of availability, the first information identifier, and the second information identifier are transmitted to the network user. If a second mode is selected, the network user is not required to access the first information before accessing the second information.

The system to implement the method of this third embodiment of the present invention includes a communications port, a memory, and a processor. Each of these will be understood by reference to the discussion above of the system of the second embodiment. The processor is configured, e.g. programmed, to implement the method of the third embodiment.

It will be understood by those skilled in the art that each of the first, second, and third embodiments are easily implemented using computer software. More particularly, software can be easily programmed, using routine programming skill, based upon the description of the invention set forth herein and stored on a storage medium which is readable by a computer processor to cause the processor to operate such that the method of the respective embodiment is performed as described herein.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 22B depicts an EPCS database for storing different addresses at which bills of a biller are presented to different users.

FIG. 22D is a further depiction of the EPCS database of FIG. 22B showing forced network addresses at which supplemental information or bill bills of a biller are presented to different users in accordance with the present invention.

DETAILED DESCRIPTION OF A PREFERRED EMBODIMENT

Figure 1:
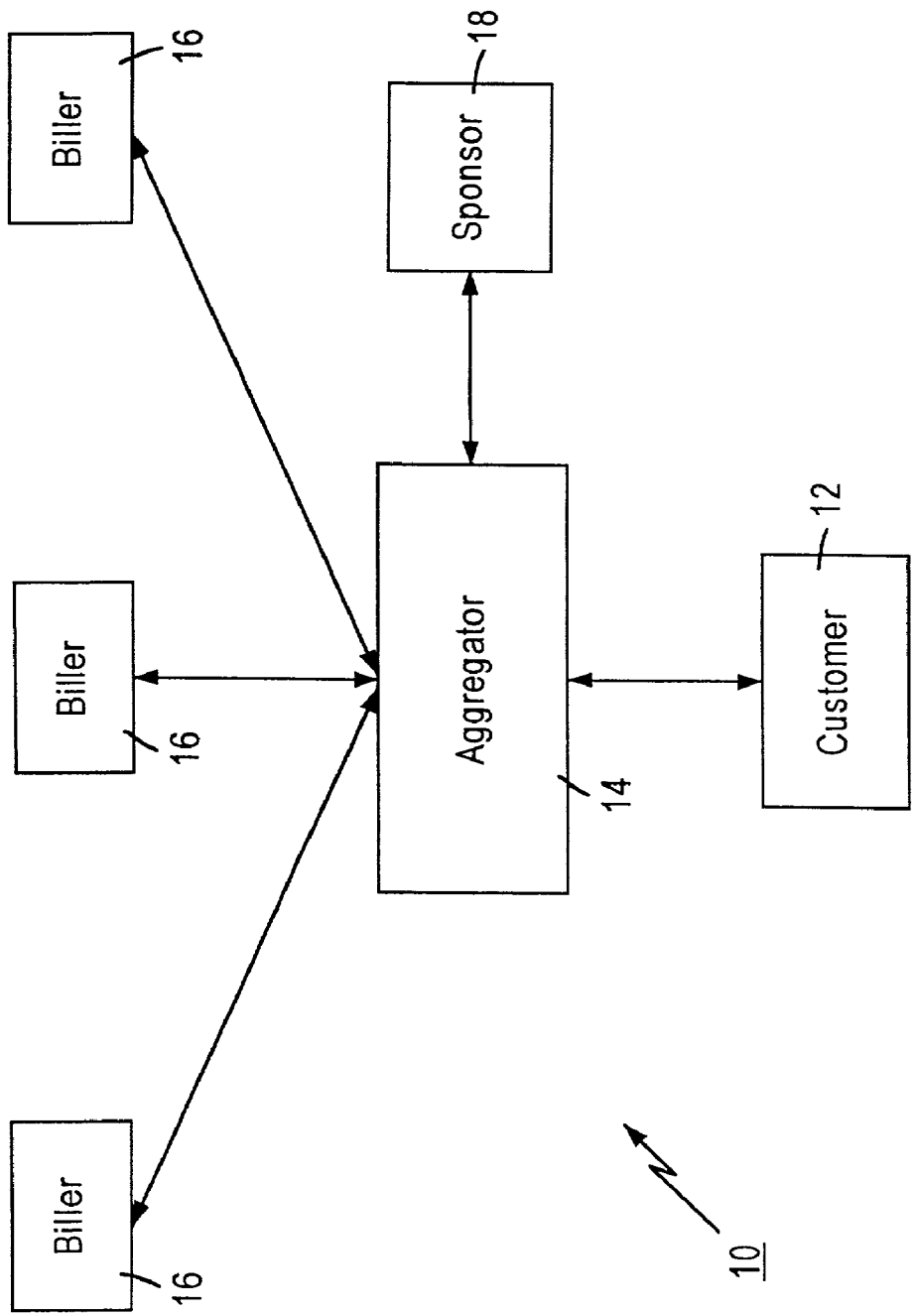
FIG. 1 is an aggregation model for electronic bill presentment.
Figure 2:
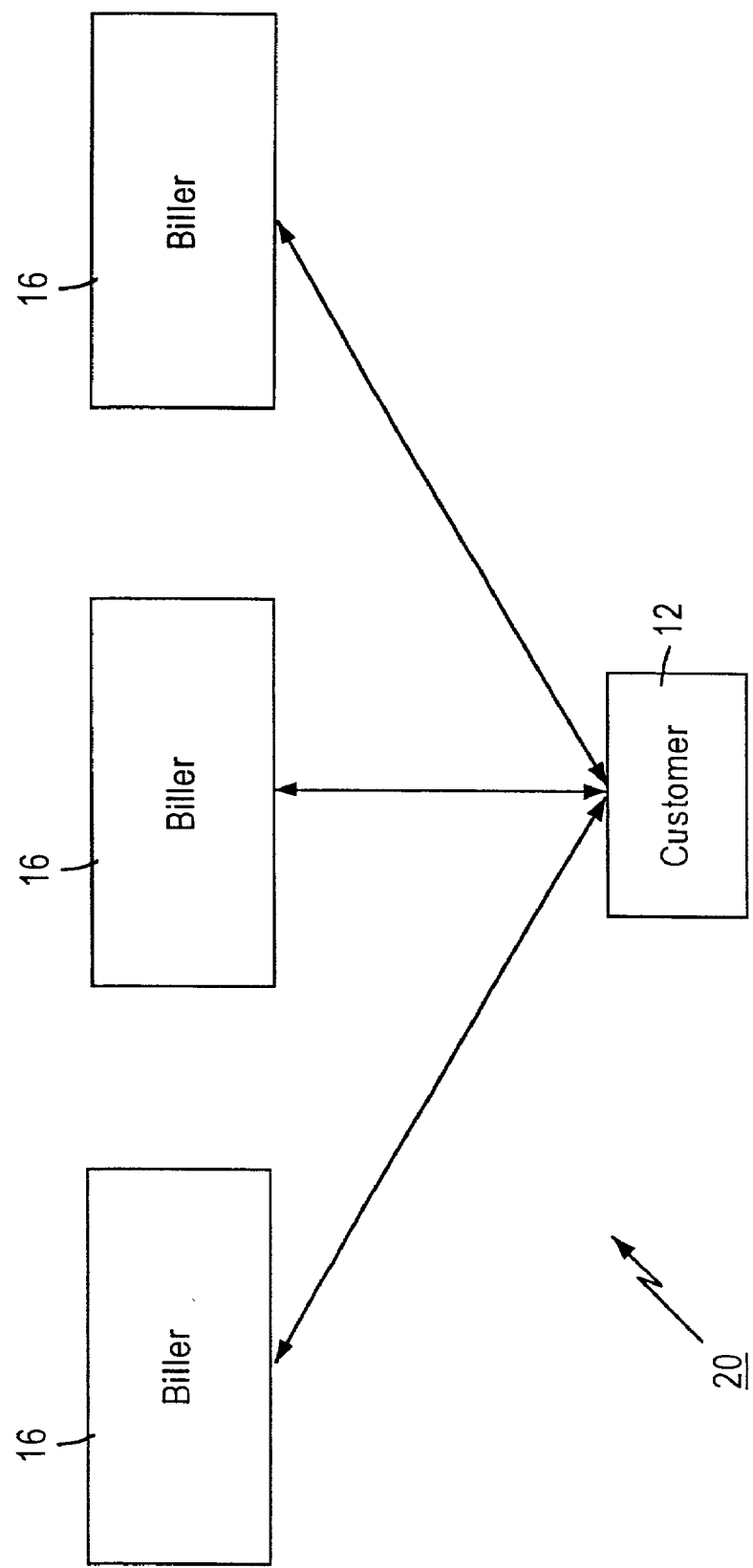
FIG. 2 is a biller direct model for electronic bill presentment.
Figure 3:
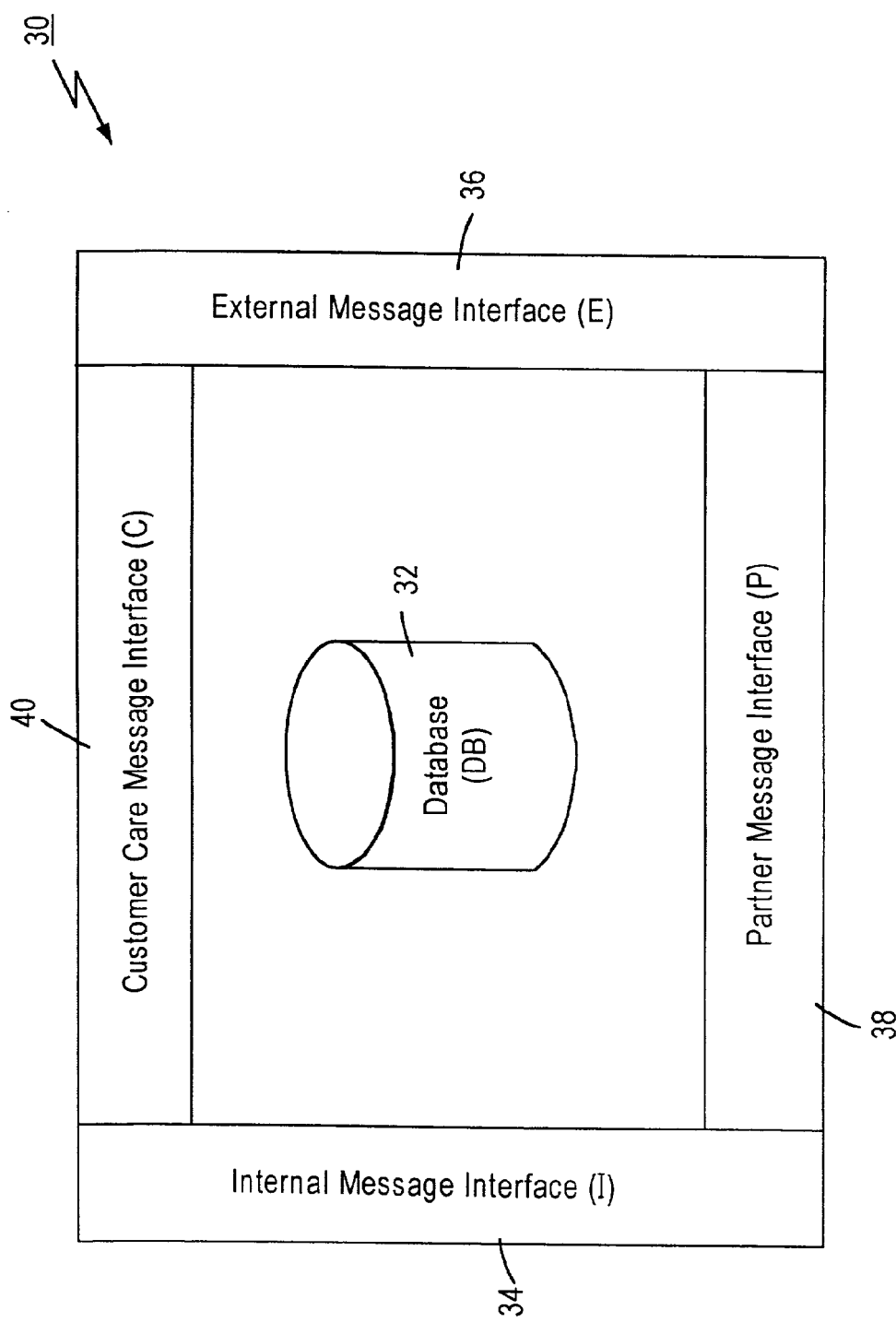
FIG. 3 is an infrastructure diagram of a distributed database entity in accordance with the present invention.

Referring to FIG. 3, there is shown an infrastructure diagram of a distributed database entity 30 in accordance with the present invention. The distributed database entity 30 comprises a database component 32 and a plurality of message interfaces 34-40 for facilitating communication between the database component 32 and other distributed database entities and system components. The database component 32 typically contains data that is controlled or "owned" by the controller or "owner" of the distributed database entity 30. For example, if the distributed database entity 30 is owned by a financial institution (FI) such as a bank, then the database component 32 could contain information such as checking and savings account balances. It should be noted, however, that the database component 32 can also contain data from other distributed database entities and system components, as will be described in detail below.

The plurality of message interfaces 34-40 includes an internal message interface 34, an external message interface 36, a partner message interface 38, and a customer care message interface 40. The internal message interface 34 defines messages that are used to communicate and query data between the given distributed database entity 30 and other distributed database entities, or other system components having an internal message interface. For example, in a bill presentment and payment system, communication between a banking entity and a billing entity may be required. The external message interface 36 defines messages that are used to communicate and query data between the given distributed database entity 30 and any existing system(s) that are directly related to the given distributed database entity 30. For example, an FI such as a bank can have an existing direct deposit account (DDA) system. The partner message interface 38 defines messages that are used to communicate and query data between the given distributed database entity 30 and any existing system(s) that are indirectly related to the given distributed database entity 30. For example, in a bill presentment and payment system, communication with an established billing aggregator may be necessary to satisfy customer demands. The customer care message interface 40 defines messages that are used to communicate and query data between the given distributed database entity 30 and a customer care entity. For example, in a bill presentment and payment system, a billing entity may allow a third party to access bill data in order to provide feedback to bill customers. It should be noted that all of the above-described interfaces will be described in greater detail below.

Figure 4:
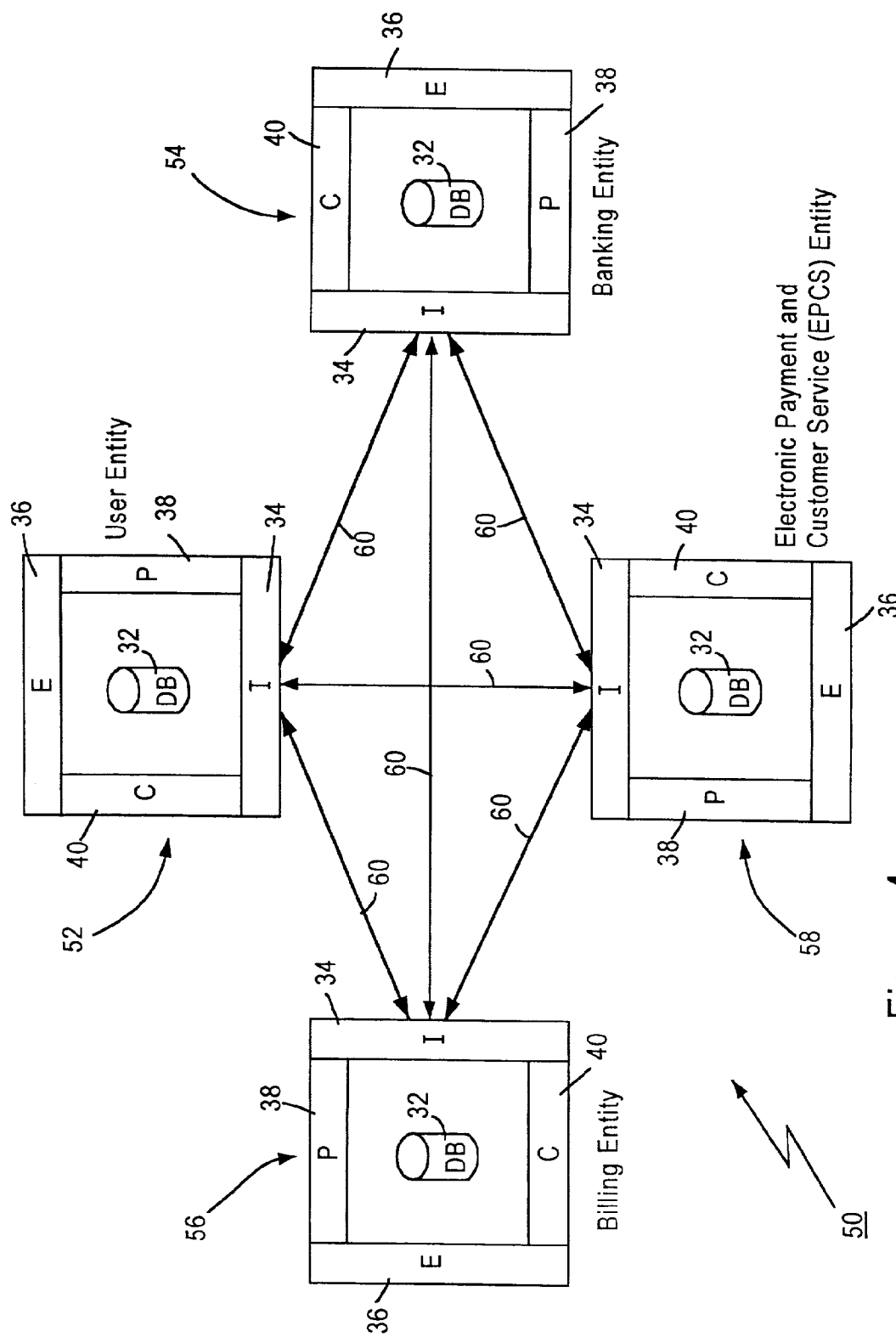
FIG. 4 is a schematic diagram of an electronic bill presentment and payment system in accordance with the present invention.

Referring to FIG. 4, there is shown a schematic diagram of a versatile electronic bill presentment and payment system 50 in accordance with the present invention. The system 50 comprises a user entity 52, an aggregator entity represented as a banking entity 54, a billing entity 56, and an electronic payment and customer service (EPCS) entity 58. It should be understood that the aggregator entity could be a portal, stockbroker or other type entity if desired. For purposes of this detailed description, the user entity 52, the banking entity 54, the billing entity 56, and the EPCS entity 58 are each distributed database entities 30 as defined above. Thus, the user entity 52, the banking entity 54, the billing entity 56, and the EPCS entity 58 each has a database component 32, an internal message interface 34, an external message interface 36, a partner message interface 38, and a customer care message interface 40. It should be noted, however, that the user entity 52, the banking entity 54, the billing entity 56, and the EPCS entity 58 are not required to have a database component 32, an internal message interface 34, an external message interface 36, a partner message interface 38, and a customer care message interface 40. That is, each entity is only required to have an internal message interface 34 so that communications can take place between each of the entities.

At this point it should be noted that, although only a single user entity 52, banking entity 54, billing entity 56, and EPCS entity 58 is shown in the system 50, it is common to have a plurality of such entities in an actual versatile electronic bill presentment and payment system in accordance with the present invention.

As previously described, an internal message interface 34 defines messages that are used to communicate and query data between distributed database entities. Thus, since the user entity 52, the banking entity 54, the billing entity 56, and the EPCS entity 58 are all distributed database entities, they all communicate through internal message interfaces 34. The communications are performed over interconnections 60. These communication, as well as communications via other interfaces, can be electrical wire, optical fiber, or microwave based communications.

At this point it should be noted that each internal message interface 34, as well as each external message interface 36, partner message interface 38, and customer care message interface 40, can be implemented using any number of existing message-based communication systems such as, for example, a TCP/IP message-based communication system running on the infrastructure of the internet. Alternatively, any or all interfaces could be implemented with proprietary messaging software on a private network or intranet. It should also be noted that there are no requirements as to the nature of the messaging protocol, or any middleware used to support the messaging.

The user entity 52 is typically a personal computer (PC) that is directly connected to the system 50, or is connected to the system 50 through a network server. Thus, the database component 32 associated with the user entity 52 can be located on the PC (e.g., a traditional "fat" client), or on the network server (e.g., an HTML browser client). It should be noted that the database component 32 associated with the user entity 52 can also be located in one of the other distributed database entities, which can download data to the user entity 52 (e.g., a Java client). It should also be noted that any database component 32 associated with any entity can be distributed among any of the other of the entities, owing to the distributed nature of each database component 32. Thus, each database component 32 should not be thought of as a single, monolithic database. Rather, each database component 32 is better described as a distributed repository of data categorized by the entity that "owns" the data.

Wherever it is located, the database component 32 associated with the user entity 52 stores data that is related to the type of user interface (UI) that is being presented to a subscriber of the system 50. For example, the database component 32 associated with the user entity 52 can store data that is related to the particular type of presentation technology being used (e.g., a "fat" client, an HTML browser client, or a Java client), a specific application, or a particular version. The database component 32 associated with the user entity 52 can also store data that is related to a particular computing session such as, for example, the existence of a computing session and/or the duration of a computing session. The database component 32 associated with the user entity 52 can further store subscriber authentication data, which is described in detail below.

The main function of the user entity 52 is to build a UI using data obtained from the other distributed database entities, and then present the UI to a subscriber of the system 50. The presentation of the UI to a subscriber is dependent upon the particular type of presentation technology being used (e.g., a "fat" client, an HTML browser client, or a Java client). For example, a UI for a Java client requires that presentation data be downloaded from one of the other distributed database entities.

Other functions of the user entity 52 include storing certain data locally so as to facilitate off-line editing and viewing, maintaining a state in a connectionless environment (e.g., an HTTP environment), and sensing the availability of software updates and managing their subsequent application. All of these functions depend on the nature of the client (e.g., a "fat" client, an HTML browser client, or a Java client). As previously indicated, another function of the user entity 52 includes storing subscriber authentication data (e.g., a security ticket) that is used to gain access to other distributed database entities in the system 50.

The banking entity 54, which is typically a financial institution (FI) such as, for example, a bank, is generally viewed as a primary point of presence for a subscriber to the system 50, typically providing an appearance of aggregation to the subscriber. This view is held primarily due to the trust that consumers typically place in a bank brand, and the fact that bank customers who already bank online are also likely to want to receive bills online. Thus, in the following discussion, the banking entity 54 is assumed to be the aggregator of the system 50. It should be noted, however, that any one of the other entities could also be the aggregator of the system 50 in accordance with the present invention. There are several factors which can be used to determine aggregator status such as, for example, market clout.

The banking entity 54 typically gains access to the system 50 through a network server. Thus, the database component 32 associated with the banking entity 54 can be located in the network server. It should be noted that the database component 32 associated with the banking entity 54 can also be located in a system associated with the banking entity 54 such as, for example, a DDA system. Such a DDA system could be accessed through the external message interface 36 of the banking entity 54, as described in detail below.

The database component 32 associated with the banking entity 54 stores bank-specific subscriber profile data profile such as, for example, subscriber names and addresses and subscriber account numbers. The database component 32 associated with the banking entity 54 can also store account information such as, for example, static account information (e.g., lease rate, principle), and dynamic account information (e.g., balance). The database component 32 associated with the banking entity 54 can further store profile data specifically associated with the FI such as, for example, graphics, business rules, banking-related transaction histories, and aggregation relationships such as those between the FI and billers.

Since it is likely that the system 50 will be used with existing banking systems such as, for example, an existing DDA system, one of the main functions of the banking entity 54 is the continuation of current banking and bill payment functionality including the maintaining of customer profiles and already existing interfaces. In its role as aggregator, the banking entity 54 also provides data to the user entity 52 to be used for the creation of a navigation portion of a UI. For an HTML browser client, this data would be used to create a navigation frame. The content of the navigation frame could be supplied by the banking entity, or another entity. It should be noted that the banking entity 54 can also provide data to the user entity 52 to be used for the creation of a UI for traditional banking and bill payment.

Since the banking entity 54 is generally viewed as the primary point of presence for a subscriber to the system 50, the banking entity 54 also functions as the likely, but not exclusive, entry point for subscriber sign-on. Thus, the banking entity 54 typically controls the sign-on and authentication procedures for subscribers through the user entity 52. It should be noted that the banking entity 54 typically works in conjunction with the EPCS entity 58 in controlling the authentication procedure, as described in detail below.

Another function of the banking entity 54 includes tracking bank related and other events and storing them in an event tracking database, which is typically associated with the EPCS entity 58, as also described in detail below.

The billing entity 56 is typically a biller such as, for example, a utility company. The billing entity 56 typically gains access to the system 50 through a network server. Thus, the database component 32 associated with the billing entity 56 can be located in the network server. It should be noted that the database component 32 associated with the billing entity 56 can also be located in a system associated with the billing entity 56 such as, for example, a legacy billing system. Such a legacy billing system could be accessed through the external message interface 36 of the billing entity 56, as described in detail below.

The database component 32 associated with the billing entity 56 stores biller-specific subscriber profile data such as, for example, subscriber names and addresses and subscriber account numbers and types (e.g., business vs. residential phone line). The database component 32 associated with the billing entity 56 also stores billing data for use by the user entity 52 in building the UI for the subscriber. The billing data can include bill availability data, detailed billing data and supplemental information indicating ads and other cross-sale displays, bill payment terms and conditions, notices and links to supplemental information stored at other locations.

The database component 32 associated with the billing entity 56 can also store biller transaction history such as, for example, bill data manipulation (e.g., viewing, searching, sorting), and viewing of supplemental information. The database component 32 associated with the billing entity 56 can further store biller profile data such as, for example, graphics, business rules, and relationships with aggregators such as banks.

The main function of the billing entity 56 is to provide billing data and supplemental information to the user entity 52 for use in creating the UI for the subscriber. The billing entity 56 also provides bill availability data to an aggregator database, whether it is located in the banking entity 54, the EPCS entity 58, or another entity, to provide notice of bill availability to subscribers. The billing entity 56 can also access legacy billing systems through the external message interface 36 of the billing entity 56, as indicated above.

Another function of the billing entity 56 includes tracking biller-related events and storing them in an event tracking database, which is typically associated with the EPCS entity 58, as described in detail below.

Figure 5:
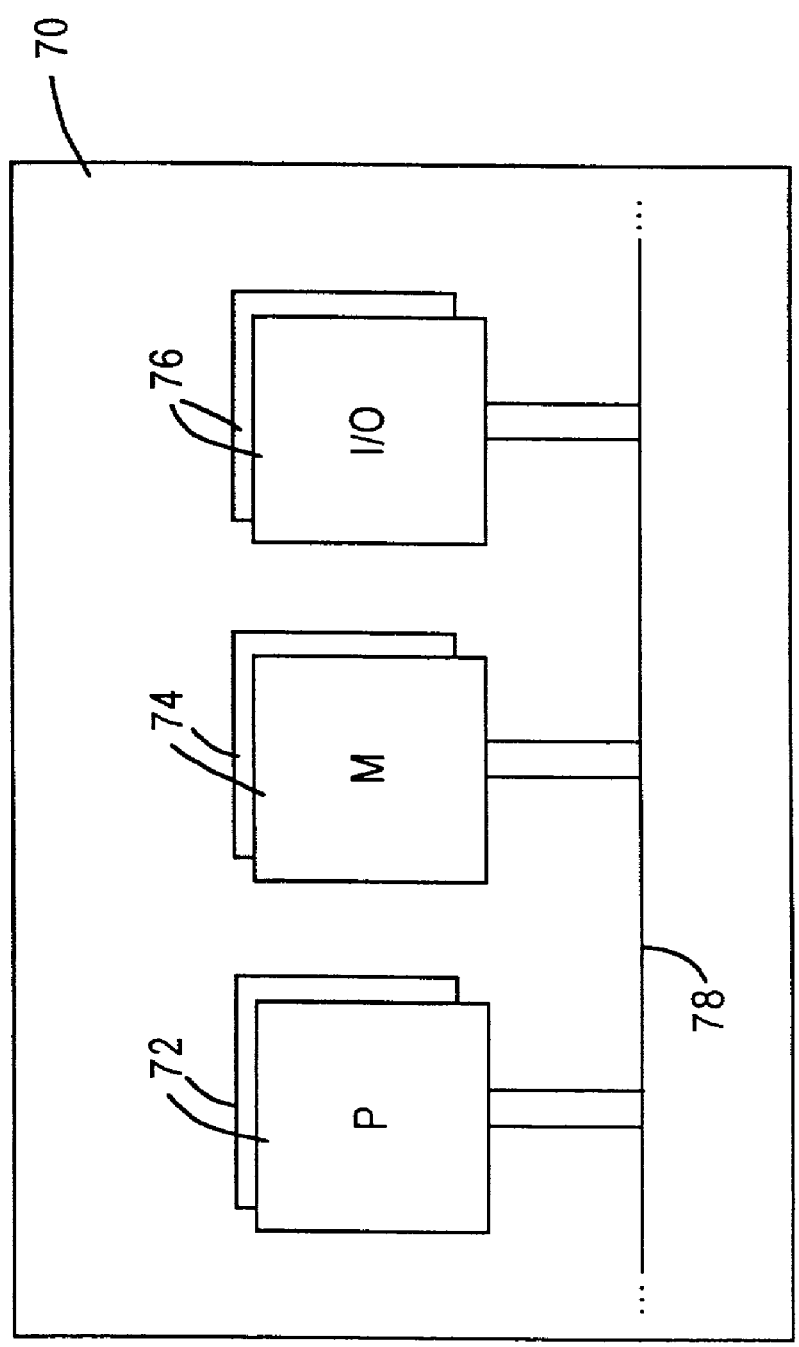
FIG. 5 is a schematic diagram of an electronic payment and customer service (EPCS) entity in accordance with the present invention.

The EPCS entity 58 can generally be described in terms of a data processing system 70, such as shown in FIG. 5. The data processing system 70 preferably comprises at least one processor (P) 72, memory (M) 74, and input/output (I/O) interface 76, which are connected to each other by a bus 78, for implementing the functions of the EPCS entity 58, as described in detail below.

Referring again to FIG. 4, the EPCS entity 58 typically gains access to the system 50 through a network server. Thus, the database component 32 associated with the EPCS entity 58 can be located in the network server. It should be noted that the database component 32 associated with the EPCS entity 58 can also be located in a system associated with the EPCS entity 58 such as, for example, a legacy aggregating system. Such a legacy aggregating system could be accessed through the external message interface 36 of the EPCS entity 58, as described in detail below.

The database component 32 associated with the EPCS entity 58 stores bill payment-specific subscriber profile data such as, for example, subscriber names and addresses, subscriber DDA account numbers, and subscriber credit ratings. The database component 32 associated with the EPCS entity 58 also stores bill payment warehouse data such as, for example, user-specific payees, single occurrence payments, and recurring payments/models.

As previously described, both the banking entity 54 and the billing entity 56 track and store events in an event tracking database. This event tracking database is typically located in the database component 32 associated with the EPCS entity 58. The event tracking data that is stored typically comprises event summaries and links to other databases, perhaps residing at other entities, which provide event details and/or an audit trail.

The database component 32 associated with the EPCS entity 58 also stores bill payment transaction histories, and system subscriber profile data such as, for example, metadata about subscribers and metadata about subscribers' relationships to other entities (e.g., a list of billers that a subscriber has enabled). The database component 32 associated with the EPCS entity 58 further stores billing-related profile information on the system aggregator and billers such as, for example, metadata about billing arrangements (e.g., flat rate, per subscriber, event-driven, etc.), and aggregation data such as, for example, new bill availability and supplemental information available from the billing entity 56. The database component 32 associated with the EPCS entity 58 still further stores security data such as, for example, required sign-on information and macro-level authorizations. The database component 32 associated with the EPCS entity 58 additionally stores customer service data such as, for example, FAQ's, FI and biller contact information, and problem resolution data.

The EPCS entity 58 is the glue that holds the distributed database entities together. The EPCS entity 58 accomplishes this by functioning as an integration agent by maintaining bill payment profiles and warehouse data, aggregating bill availability data, bill status data, supplemental information availability data, and supplemental information status data (but typically not bill content or presentation or supplemental information content or presentation), and maintaining an event tracking database (or audit trail) that can be accessed by all of the database entities. Also, in order to facilitate a single point of sign-on, the EPCS entity 58 functions as the authentication gate keeper. This does not mean to imply that the EPCS entity 58 necessarily maintains user identification numbers and/or passwords. However, it does imply that the EPCS entity 58 accepts sign-on requests and may, if desired, dole out authentication "tickets" in response, in conjunction with the banking entity as described above. Note that the aggregator entity, e.g. the bank entity, may choose to take total responsibility for authentication of the user; in which case, the EPCS entity 58 trusts the aggregator entity to verify the user credentials.

It should be noted that, like user identification numbers and passwords, other data elements, like event details, may end up being virtually aggregated by the EPCS entity 58, but may still physically reside in a distributed manner across several of the database entities.

It should also be noted that the EPCS entity 58 may also route messages, including e-mail messages, to and from the various database entities, as well as store messages, including e-mail messages, sent to and from the various database entities.

As previously described, an internal message interface 34 defines messages that are used to communicate and query data between distributed database entities. The following types of messages are examples of messages which may be employed to implement an internal message interface 34 in accordance with the present invention.

Depending upon the nature of the presentation technology being used (e.g., a "fat" client, an HTML browser client, or a Java client), the user entity 52 may need to process an internal message to store a security ticket for later use in gaining access to other distributed database entities in the system 50. The user entity 52 may also need to process an internal message to update any resident software. The user entity 52 may further need to process an internal message containing various types of information (assuming a push model). The user entity 52 may additionally need to process internal messages such as, for example, those for receiving data from other database entities.

The banking entity 54 will process an internal message to add/update/delete/retrieve FI branding information, as well as an internal message to add/update/delete an entry from a list of billers that have been aggregated. The banking entity 54 will also process an internal message to activate a subscriber for home banking via a messaging protocol, which can be an existing messaging protocol such as, for example, OFX or a batch process. The banking entity 54 will further process an internal message to query/update bank subscriber profile data for purposes of customer care. The banking entity 54 will still further process an internal message to query bank transaction history for customer care and for linking to the event tracking database. The banking entity 54 will still further process an internal message to retrieve a list of billers available under the FI sponsor umbrella. An alternative to this is to place the list of billers available under the FI sponsor umbrella in an aggregation database. However, placing the list of billers available under the FI sponsor umbrella allows the EPCS entity 58 to tailor the list by FI sponsor. The banking entity 54 will additionally process internal messages such as, for example, those for sending data to other database entities, receiving data from other database entities, and broadcasting data to other database entities.

The billing entity 56 will process an internal message to add/update/delete/retrieve biller branding information, as well as an internal message to activate a subscriber for electronic bill presentment via a messaging protocol, which can be an existing messaging protocol such as, for example, OFX or a batch process. The billing entity 56 will also process an internal message to retrieve bill availability data, retrieve bill detail data, retrieve bill presentation specifications or content, and retrieve supplemental information. For example, the retrieved data could be URL links, HTML data, or OFX data. The billing entity 56 will further process an internal message to query/update biller subscriber profile data for purposes of customer care. The billing entity 56 will still further process an internal message to query biller transaction history for customer care and for linking to the event tracking database. The billing entity 56 will additionally process internal messages, including e-mail messages, such as, for example, those for sending data to other database entities, receiving data from other database entities, and broadcasting data to other database entities.

The EPCS entity 58 will process internal event tracking messages. Such event tracking messages are used to gain access to two types of information in the event tracking database: summary data and a link to another database entry that can provide more detail. Such detail includes subscriber enrollment data, subscriber service activation data (e.g., biller, bill payment, banking, etc.), sign-on data, bill availability data, bill viewed data, bill payment generated data (optionally associated with presented bill data), subsequent bill payment events data (e.g., submitted, processed, failed, cleared, remittance received by biller, etc.), supplemental information event data (e.g., ad/offer viewed, ad/offer clicked, product/service purchased, terms, conditions, or notices viewed), email created/read/deleted data.

The EPCS entity 58 will also process an internal messages related to subscriber profile data such as, for example, to add/modify/delete/read subscriber profile data, often as a function of the events listed above (e.g., enrollment, activation, etc.).

The EPCS entity 58 will also process internal security messages. Such internal security messages may relate to authentication, which result in the EPCS entity 58 issuing a security ticket. It should be noted that an authentication request does not have to come as a result of a subscriber "surfing" to the network server of the banking entity 54. It may be initiated if a subscriber tries to gain access to the billing entity 56, and thereby not even contacting the banking entity 54. The point being that with a security ticket a subscriber is generally allowed to freely traverse any database entity in the system 50 without going through repeated sign-on procedures.

An internal security message may also relate to macro-level authorization, wherein a security ticket may contain the credentials to allow a subscriber access to a particular billing entity, but doesn't address micro-level authorization issues such as allowed operations.

An internal security message may also relate to getting a security ticket without authentication. Such a message will originate from a trusted party (e.g., an FI performing its own authentication). Therefore, a security ticket is provided without performing an authentication.

It should be noted that the use of a security ticket enables, but does not mandate, a single sign-on procedure. In other words, a database entity such as, for example, the billing entity 56 may, for whatever reason, require additional authentication information.

The EPCS entity 58 will further process internal messages relating to aggregation data. For example, an EPCS entity 58 will process an internal message to create a link to summary or detailed bill information, or to create a link to supplemental information that is available from the billing entity 56 or another entity.

The EPCS entity 58 will still further process an internal message to query/update bill payment transaction history for purposes of customer care.

The EPCS entity 58 will additionally process internal email messages such as, for example, those associated with routing e-mail, picking-up e-mail, and querying and e-mail mailbox.

The EPCS entity 58 may also process internal messages related to data mining. Such messages are handled very carefully with respect to privacy, perhaps even providing an ACL or other mechanisms to ensure privacy. The results of such messages may be delivered out of band (e.g., by batch).

Figure 6:
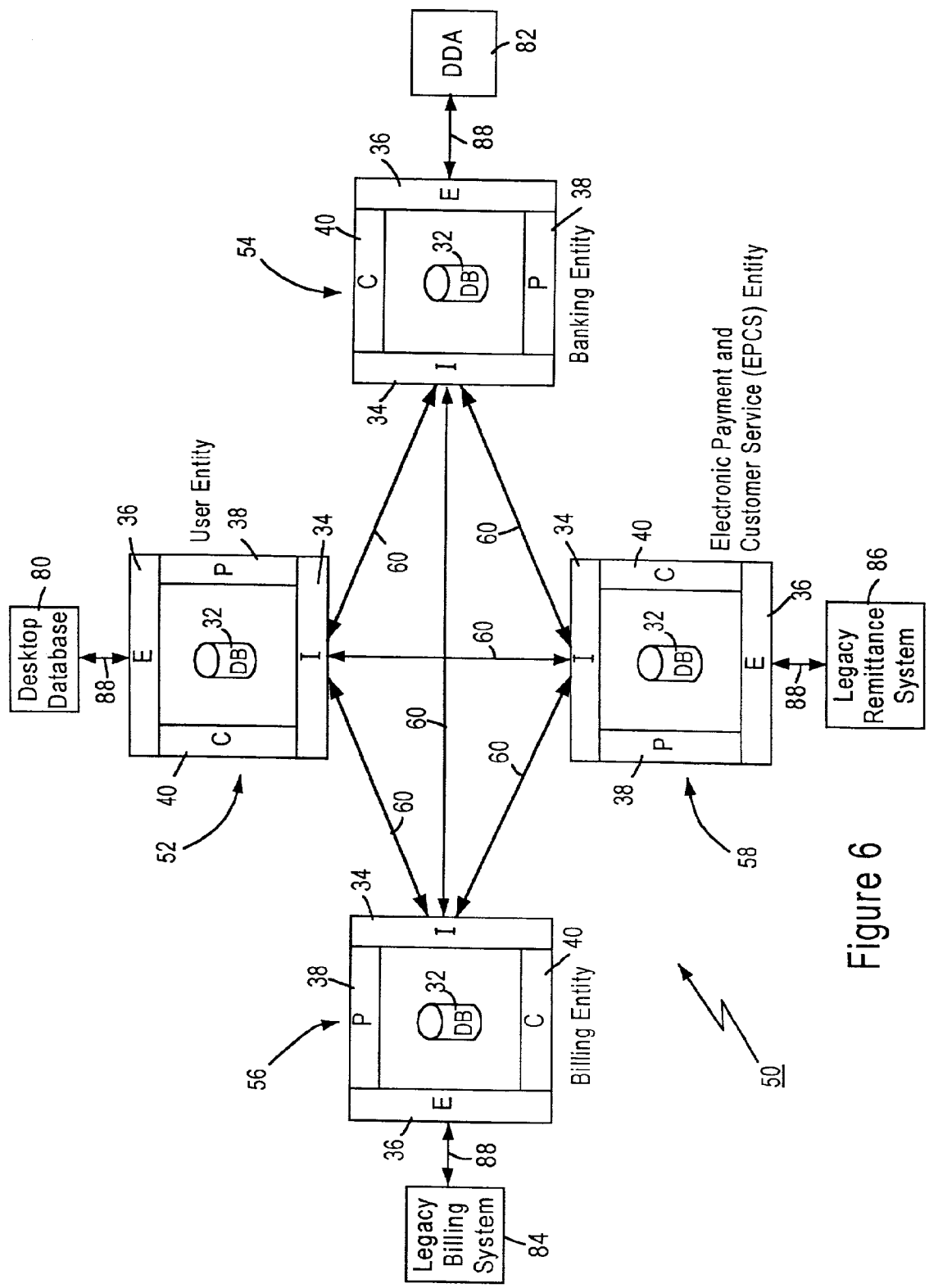
FIG. 6 is a schematic diagram of the electronic bill presentment and payment system shown in FIG. 4, extended to include certain associated directly related systems.

As previously described, an external message interface 36 defines messages that are used to communicate and query data between a given distributed database entity 30 and any existing system(s) that are directly related to the given distributed database entity 30. Referring to FIG. 6, there is shown a schematic diagram of the versatile electronic bill presentment and payment system 50, along with some associated directly related systems. The associated directly related systems comprise a desktop database 80, a DDA system 82, a legacy billing system 84, and a legacy remittance system 86.

Depending upon the nature of the presentation technology being used (e.g., a "fat" client, an HTML browser client, or a Java client), the user entity 52 may need to process an external message in order to communicate with an existing system such as, for example, the desktop database 80. To support such a legacy system, it may be necessary to implement the external message interface 36 of the user entity 52 in the context of an existing, and possibly extended, protocol specification, such as Gold, NPC, or OFX.

The banking entity 54 will process external messages to and from an existing system such as, for example, the DDA system 82 in order to query and update information such as, for example, subscriber profile data, subscriber account data, out-of-band (e.g., ATM) account activity, and statement history. It's also conceivable that the banking entity 54 would need to interface with other banking systems (e.g., stops). Thus, the external message interface 36 of the banking entity 54 is a key feature of the versatile electronic bill presentment and payment system 50.

The billing entity 56 will process external messages to and from an existing system such as, for example, the legacy billing system 84 in order to query and update information such as, for example, subscriber profile data, subscriber account data, account activity, and statement history. Most of this data is industry, if not biller, specific. Thus, the external message interface 36 of the billing entity 56 is a key feature of the versatile electronic bill presentment and payment system 50.

The EPCS entity 58 will process external messages to and from an existing system such as, for example, the legacy remittance system 86. The legacy remittance system 86 could be, for example, ACH, RPP, RPS, or Direct Send.

Figure 7:
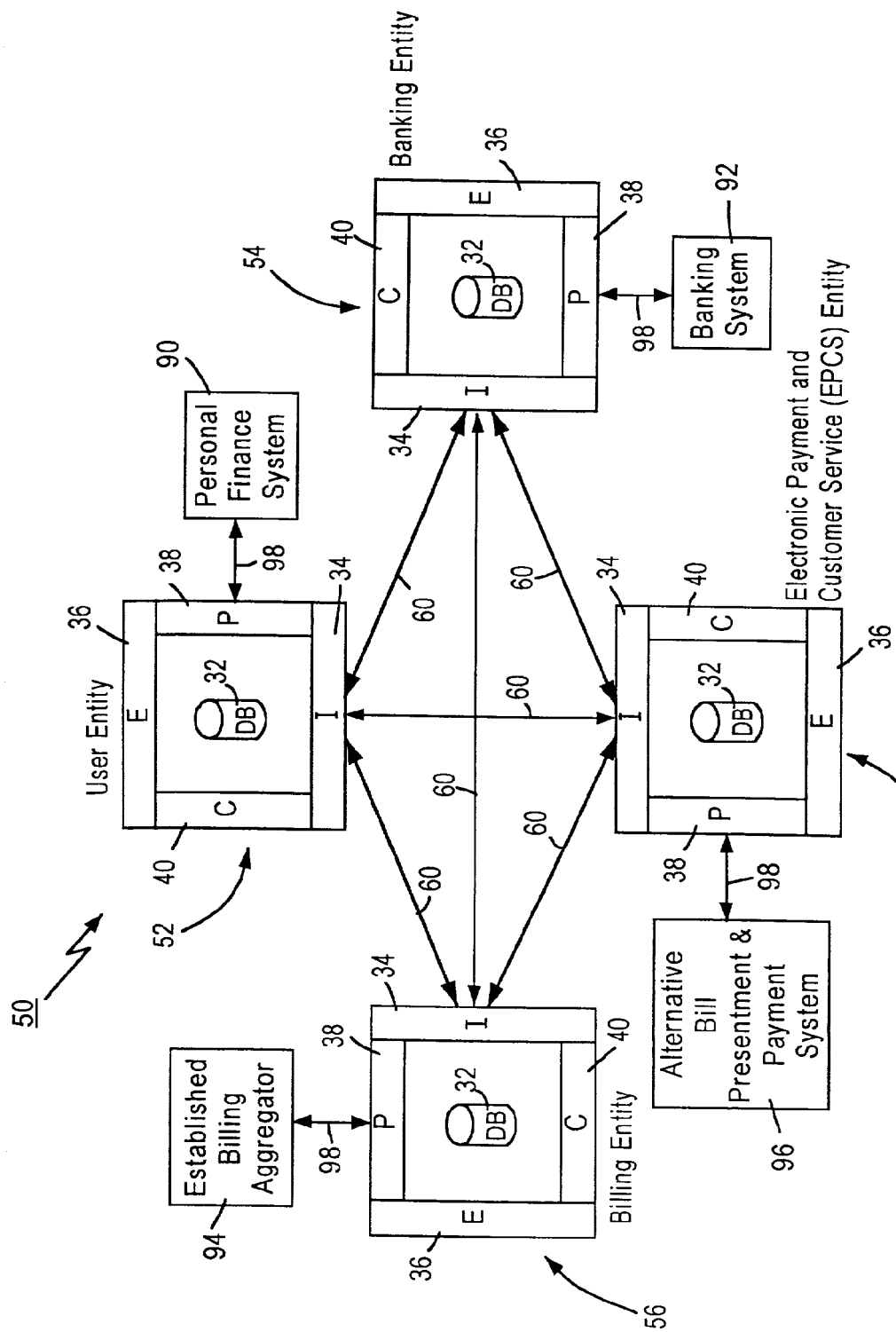
FIG. 7 is a schematic diagram of the electronic bill presentment and payment system shown in FIG. 4, extended to include certain associated indirectly related systems.

As previously described, a partner message interface 38 defines messages that are used to communicate and query data between a given distributed database entity 30 and any existing system(s) that are indirectly related to the given distributed database entity 30. Referring to FIG. 7, there is shown a schematic diagram of the versatile electronic bill presentment and payment system 50, along with some associated indirectly related systems. The associated indirectly related systems comprise a personal finance system 90, a banking system 92, an established billing aggregator 94, and an alternative bill presentment and payment system 96.

Depending upon the nature of the presentation technology being used (e.g., a "fat" client, an HTML browser client, or a Java client), the user entity 52 may need to process a partner message in order to communicate with a partner such as, for example, the personal finance system 90. The personal finance system 90 could be, for example, a personal financial manager (PFM) software package such as, for example, Quicken or Money.

The banking entity 54 will process partner messages to and from a partner such as, for example, the banking system 92.

The billing entity 56 will process partner messages to and from a partner such as, for example, the established billing aggregator 94. Such a partner relationship may be required if a large group of subscribers are using the established billing aggregator 94, and thereby have the leverage to demand that all of their bills come through the established billing aggregator 94. The established billing aggregator 94 is essentially treated as a proxy for the billers that it represents. Thus, subscribers to the established billing aggregator 94 will have equal footing as subscribers to the present system 50. This means that subscribers to the established billing aggregator 94 will receive the same event tracking, customer service, and payment processing functionality as subscribers to present system 50. Of course, to gain the additional functionality provided by the present system 50, the established billing aggregator 94, or someone acting on their behalf, will need to provide the same programming support that is required of any biller participating in the present system 50.

To present a bill generated by the established billing aggregator 94, the present system 50 would, for example, receive bill availability data and the URL of a web server of the established billing aggregator 94, and the billing entity 56 would then point to the web server of the established billing aggregator 94 to get an HTML presentation of detailed bill data. In this scenario, the partner message interface 38 would be essentially the same as an internal message interface 34, but possibly with added bulk transfer capability.

The EPCS entity 58 will process partner messages to and from a partner such as, for example, the alternative bill presentment and payment system 96. Such a partner relationship may be required if a billing entity 56 has a subscriber base that is split between using the present system 50 and the alternative bill presentment and payment system 96. In such a scenario, the present system 50 could function as a billing aggregator for the alternative bill presentment and payment system 96, and vice-versa. However, the alternative bill presentment and payment system 96 and its subscribers would not receive any of the benefits of the messaging functionality provided by the present system 50. Only the minimum amount of functionality would be provided. That is, the partner message interface 38 would only provide what is required to present bills through the alternative bill presentment and payment system 96, and not offer any of the advantages provided by the present system 50. The goal being to have the billing entity 56 encourage all of its subscribers to access bills through the present system 50.

It should be noted that the EPCS entity 58 will typically require the capabilities of a billing entity 56 in order to present bills to and from the alternative bill presentment and payment system 96.

Figure 8:
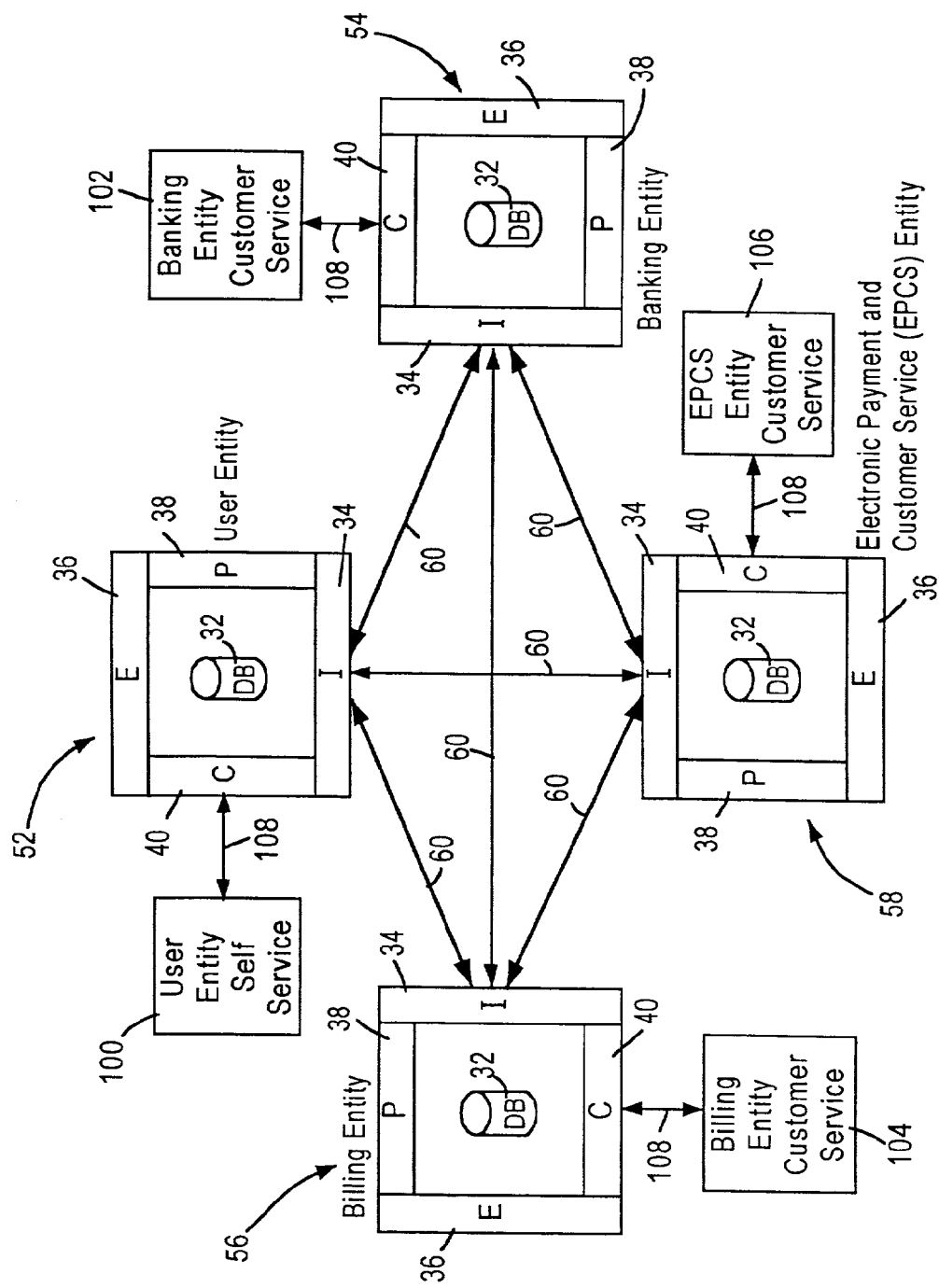
FIG. 8 is a schematic diagram of the electronic bill presentment and payment system shown in FIG. 4, extended to include certain associated customer care entities.

As previously described, a customer care message interface 40 defines messages that are used to communicate and query data between a given distributed database entity 30 and a customer care entity. Referring to FIG. 8, there is shown a schematic diagram of the versatile electronic bill presentment and payment system 50, along with some associated customer care entities. The associated customer care entities comprise a user entity self service center 100, a banking entity customer service center 102, a billing entity customer service center 104, and an EPCS customer service center 106. The communications between the various database entities and their associated customer care entities are performed over interconnections 108.

Depending upon the nature of the presentation technology being used (e.g., a "fat" client, an HTML browser client, or a Java client), the user entity 52 may need to process a customer care message in order to communicate with a customer care entity such as, for example, the user entity self service center 100. The user entity self-service center 100 could be, for example, a self-service diagnostic tool.

The banking entity 54 will process customer care messages from a customer care entity such as, for example, the banking entity customer service center 102. A customer care message may be a request for data or a request to modify existing data. The banking entity 54 will process such customer care messages by providing the requested data or providing a confirmation that the existing data has been modified, respectively, to the banking entity customer service center 102. The banking entity customer service center 102 could be, for example, a third party telemarketing group that is allowed access to banking and overall system data in order to provide feedback to system subscribers.

The billing entity 56 will process customer care messages from a customer care entity such as, for example, the billing entity customer service center 104. A customer care message may be a request for data or a request to modify existing data. The billing entity 56 will process such customer care messages by providing the requested data or providing a confirmation that the existing data has been modified, respectively, to the billing entity customer service center 104. The billing entity customer service center 104 could be, for example, a third party telemarketing group that is allowed access to billing and overall system data in order to provide feedback to system subscribers.

The EPCS entity 58 will process customer care messages from a customer care entity such as, for example, the EPCS entity customer service center 106. A customer care message may be a request for data or a request to modify existing data. The EPCS entity 58 will process such customer care messages by providing the requested data or providing a confirmation that the existing data has been modified, respectively, to the EPCS entity customer service center 106. The EPCS entity customer service center 106 could be, for example, a third party telemarketing group that is allowed access to event and overall system data in order to provide feedback to system subscribers.

Figure 9:
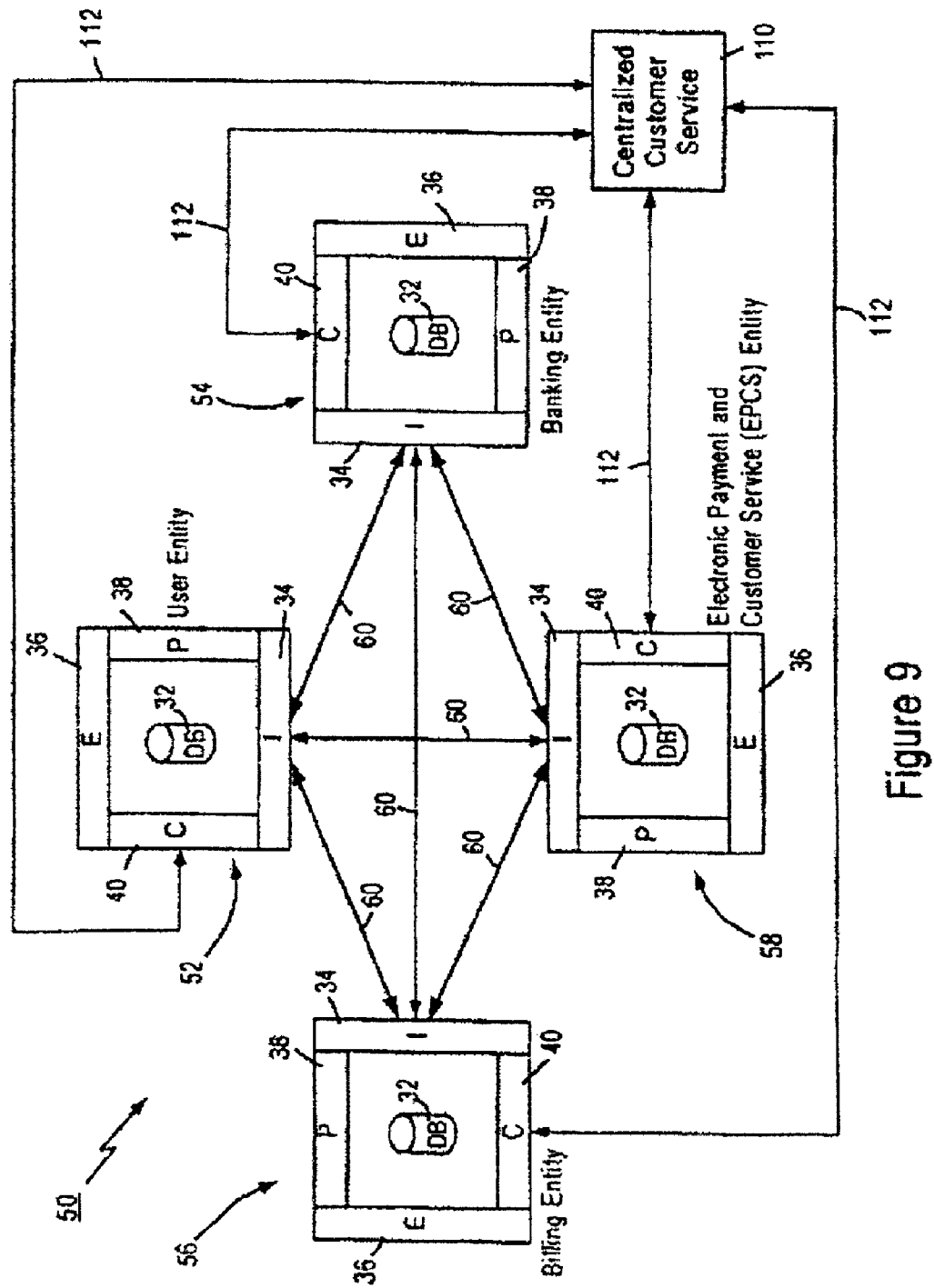
FIG. 9 is a schematic diagram of the electronic bill presentment and payment system shown in FIG. 4, extended to include a centralized customer care entity.

It should be noted that all of the customer care entities described above could be consolidated into a centralized customer service center 110, as shown in FIG. 9. In such a scenario, each of the database entities would process customer care messages to and from the centralized customer service center 110 similar to as described above. The communications between the various database entities and the centralized customer service center 110 would be performed over interconnections 112.

Referring to FIGS. 10-15, there are shown flowchart diagrams of data and message flows between the various entities within the system 50. These flowchart diagrams assume that the user entity 52 is an HTML browser client, the banking entity 54 is the primary point of presence for a subscriber to the system 50, the billing entity 56 controls bill presentment, and the EPCS entity 58 controls bill payment.

Figure 10:
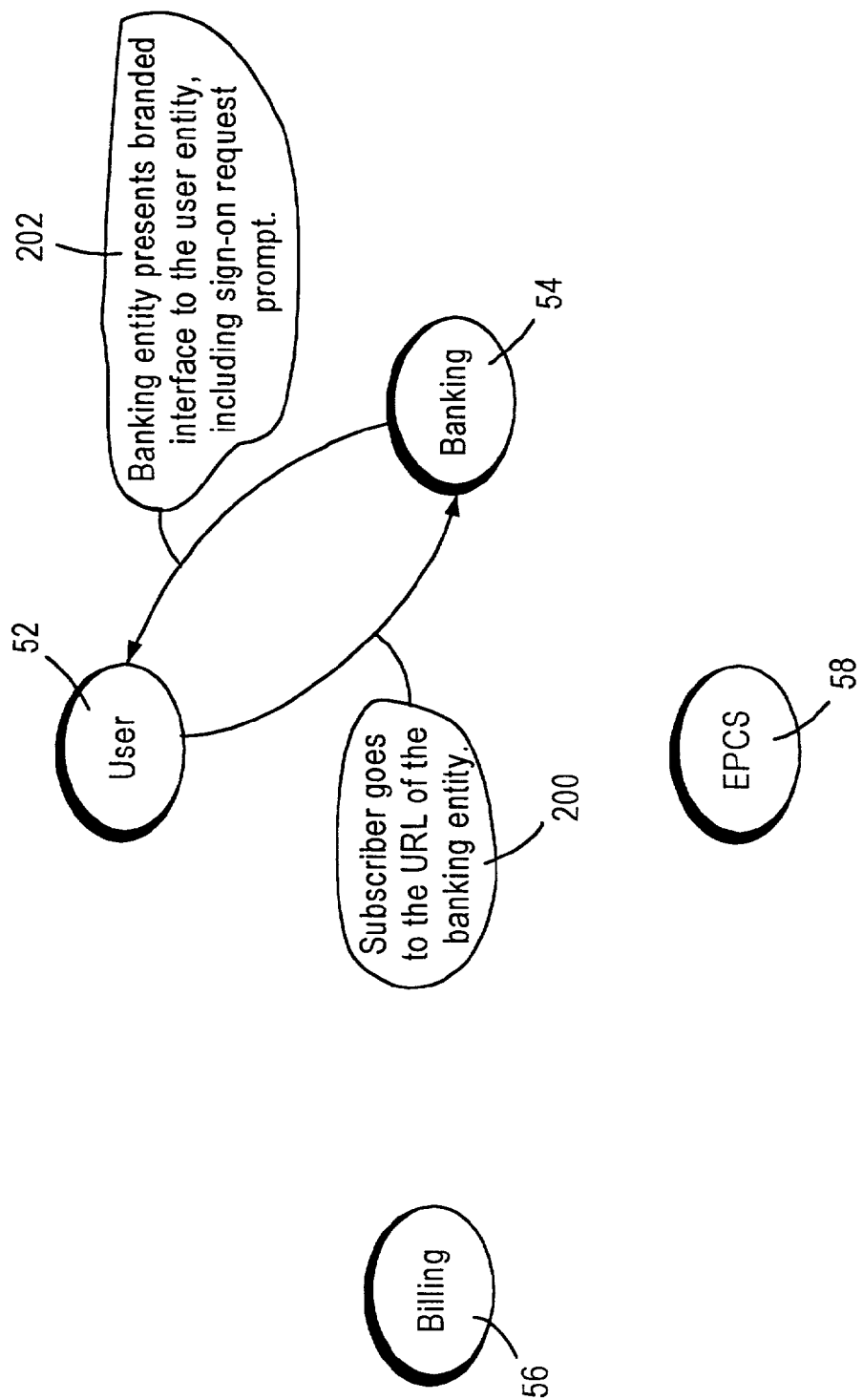
FIG. 10 is a flowchart diagram showing initial sign-on data and message flows between a user entity and a banking entity in the electronic bill presentment and payment system shown in FIG. 4.
Figure 16:
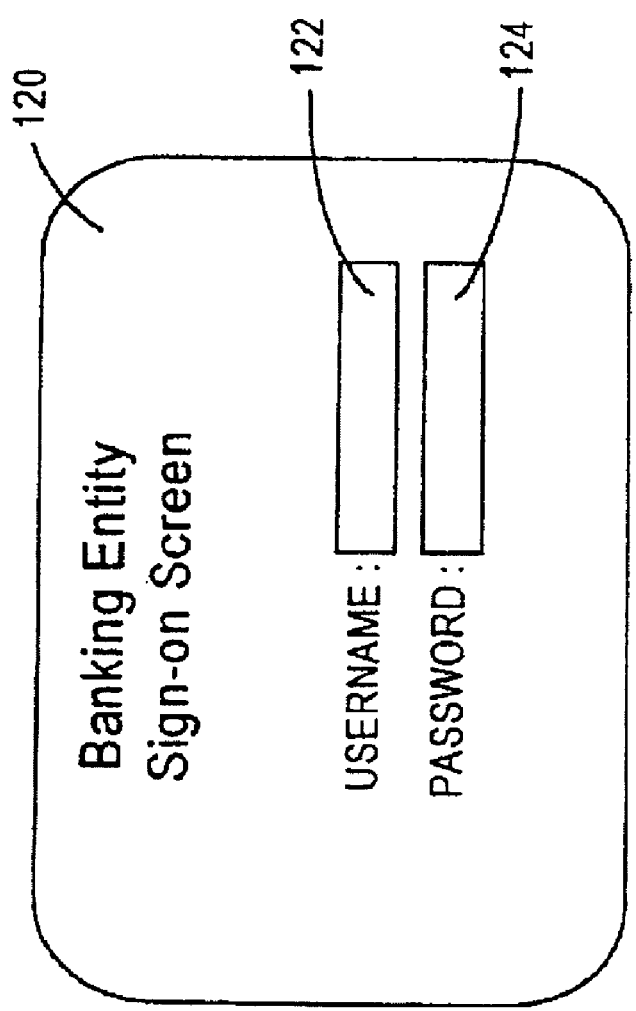
FIG. 16 shows an example of a branded interface having a sign-on request prompt that includes a username field and a password field.

In FIG. 10, a subscriber at the user entity 52 accesses the web site of the banking entity 54 in step 200. In return, the banking entity 54 presents a branded interface to the user entity 52, including a sign-on request prompt in step 202. FIG. 16 shows an example of such a branded interface 120, wherein the sign-on request prompt includes a username field 122 and a password field 124.

Figure 11:
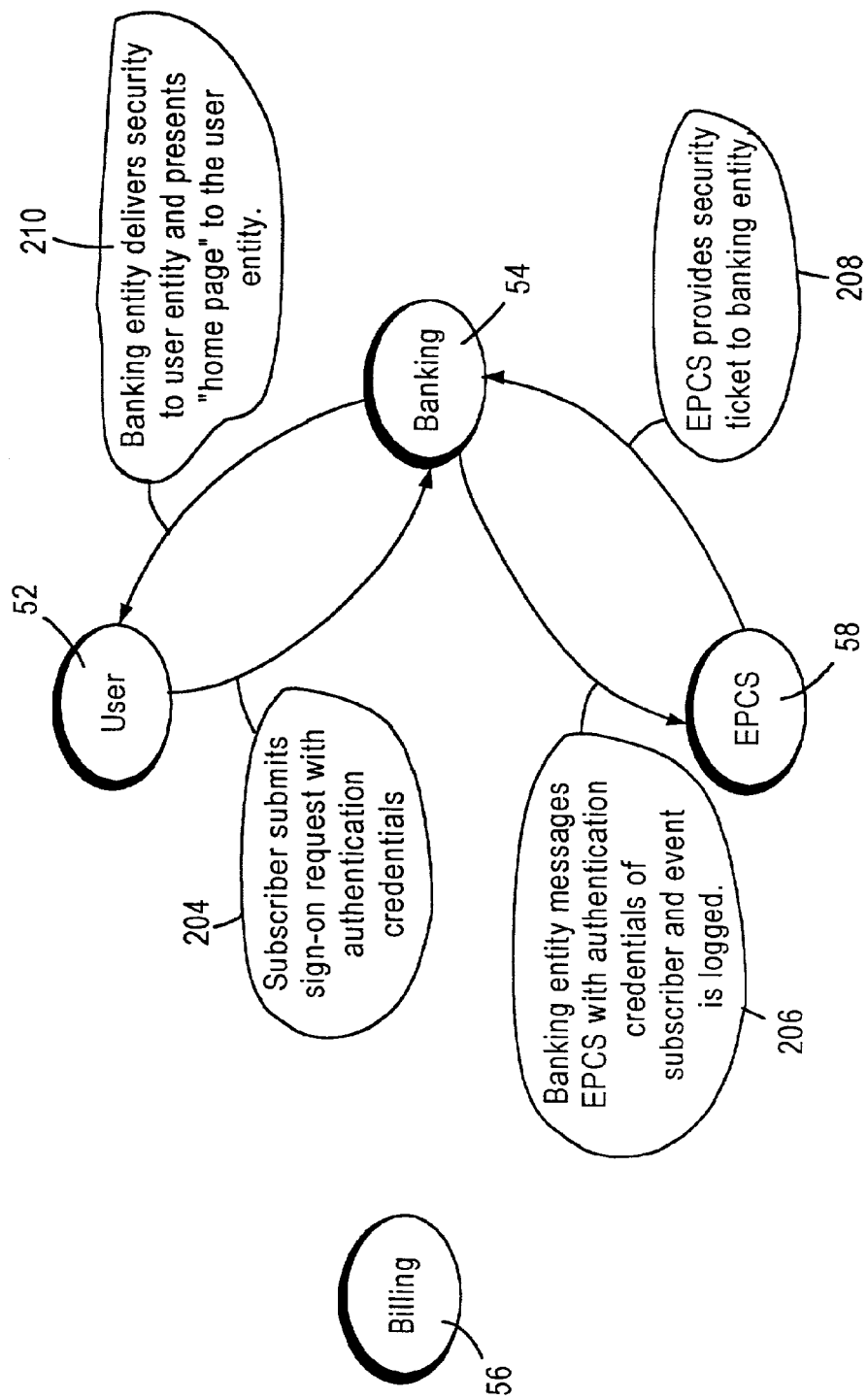
FIG. 11 is a flowchart diagram showing sign-on and authentication data and message flows between a user entity, a banking entity, and an EPCS entity in the electronic bill presentment and payment system shown in FIG. 4.
Figure 17:
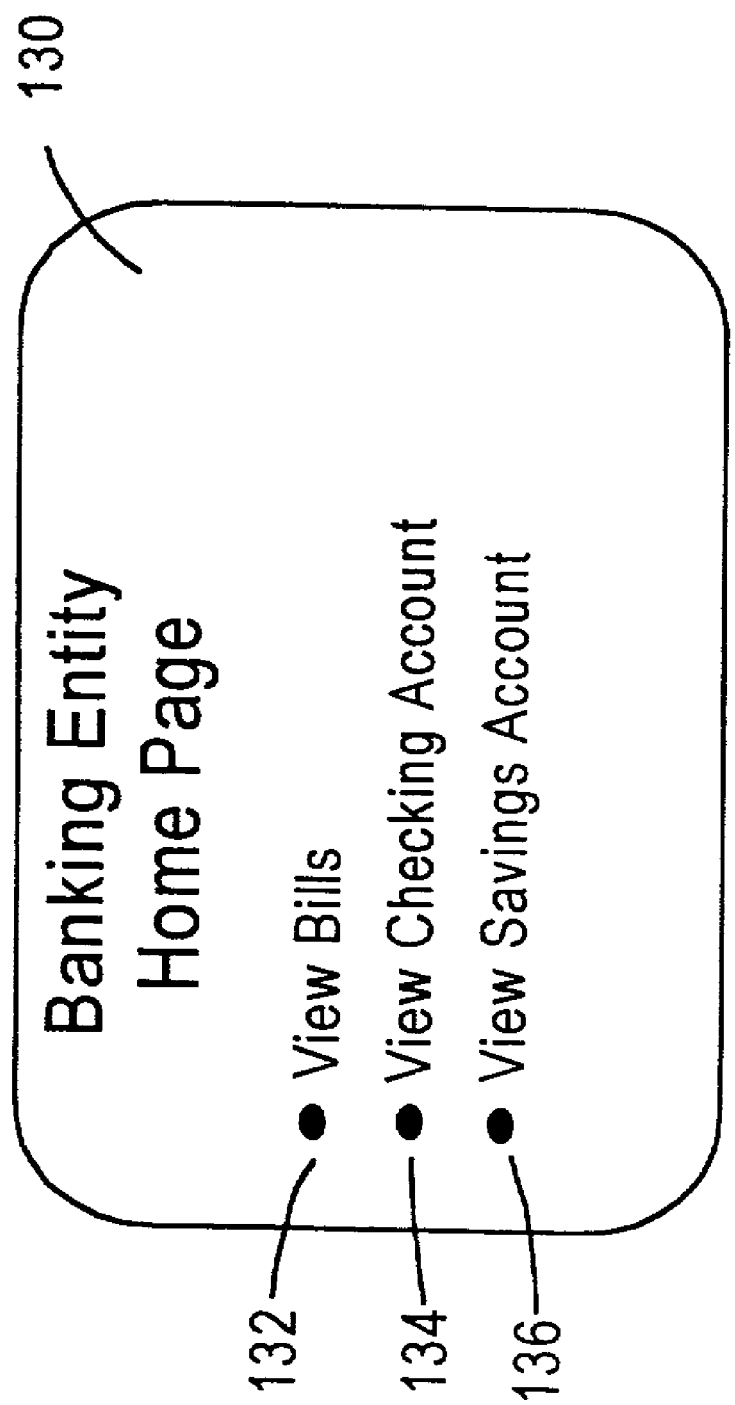
FIG. 17 shows an example of a banking entity home page, including a "view bills" icon, a "view checking account" icon, and a 'view savings account" icon.

In FIG. 11, the user entity 52 submits a sign-on request with authentication credentials in steps 204. The banking entity 54 messages the EPCS entity 58 with the authentication credentials of the subscriber and the event is logged in step 206. The EPCS entity 58 provides a security ticket to the banking entity 54 in step 208. The banking entity 54 delivers the security ticket to the user entity 52 and presents its "home page" to user entity 52 in step 210. FIG. 17 shows an example of such a home page 130, which includes a "view bills" icon 132, a "view checking account" icon 134, and a "view savings account" icon 136.

It should be noted that either the EPCS entity 58 or the banking entity 54 could perform the authentication procedure, but in either case the event is still logged in the event tracking database.

Figure 12:
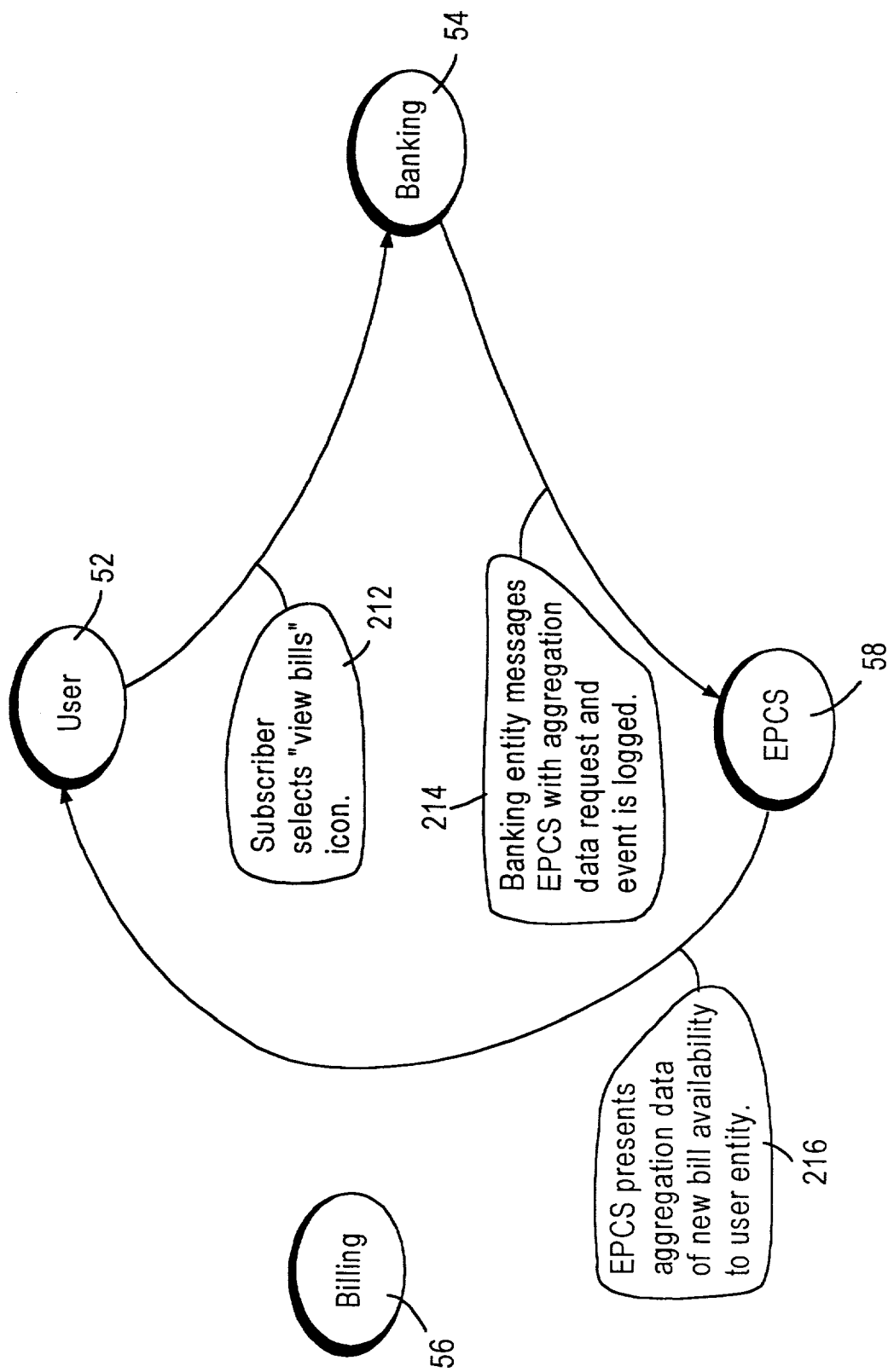
FIG. 12 is a flowchart diagram showing bill availability data and message flows between a user entity, a banking entity, and an EPCS entity in the electronic bill presentment and payment system shown in FIG. 4.
Figure 18:
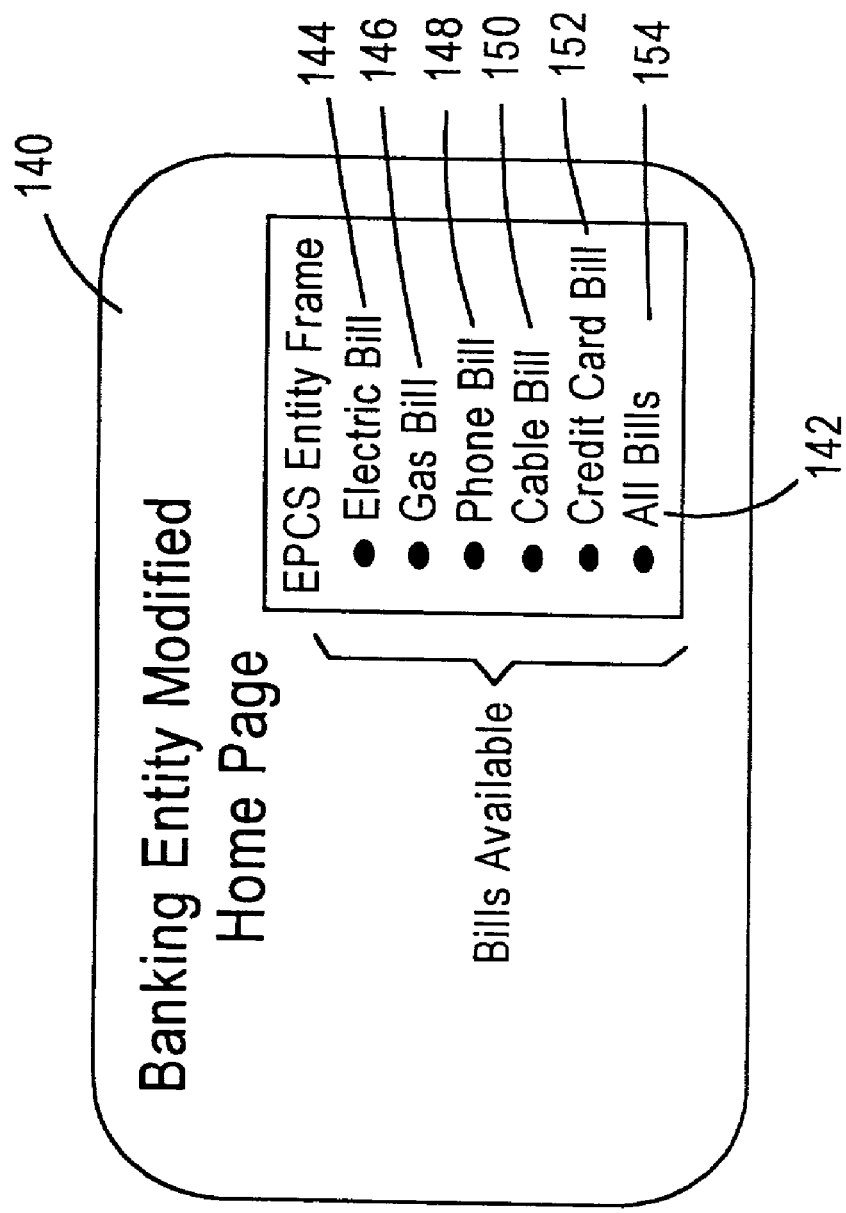
FIG. 18 shows a first modified banking entity home page having a frame presenting new bill availability data.

In FIG. 12, the subscriber selects the "view bills" icon 132 in step 212. The banking entity 54 messages the EPCS entity 58 with an aggregation data request and the event is logged in step 214. The EPCS entity 58 presents aggregation data of new bill availability to user entity 52 in step 216. FIG. 18 shows a first modified home page 140 having an EPCS entity frame 142 presenting the new bill availability data, which includes an "electric bill" icon 144, a "gas bill" icon 146, a "phone bill" icon 148, a "cable bill" icon 150, a "credit card bill" icon 152, and an "all bills" icon 154 which allows all bills to be presented simultaneously, albeit in separate frames.

Figure 13A:
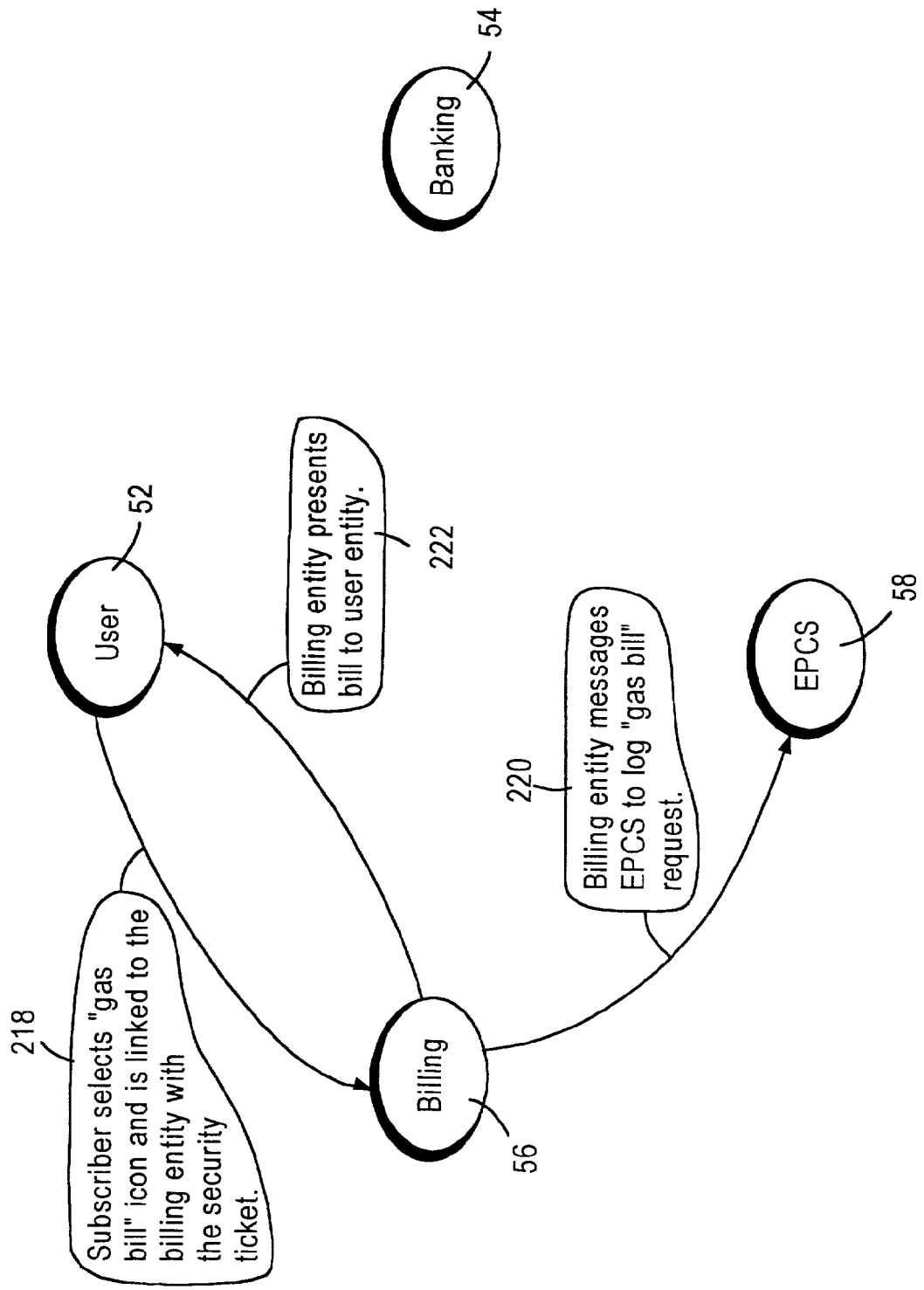
FIG. 13A is a flowchart diagram showing billing entity presentment data and message flows between a user entity, a billing entity, and an EPCS entity in the electronic bill presentment and payment system shown in FIG. 4.
Figure 19:
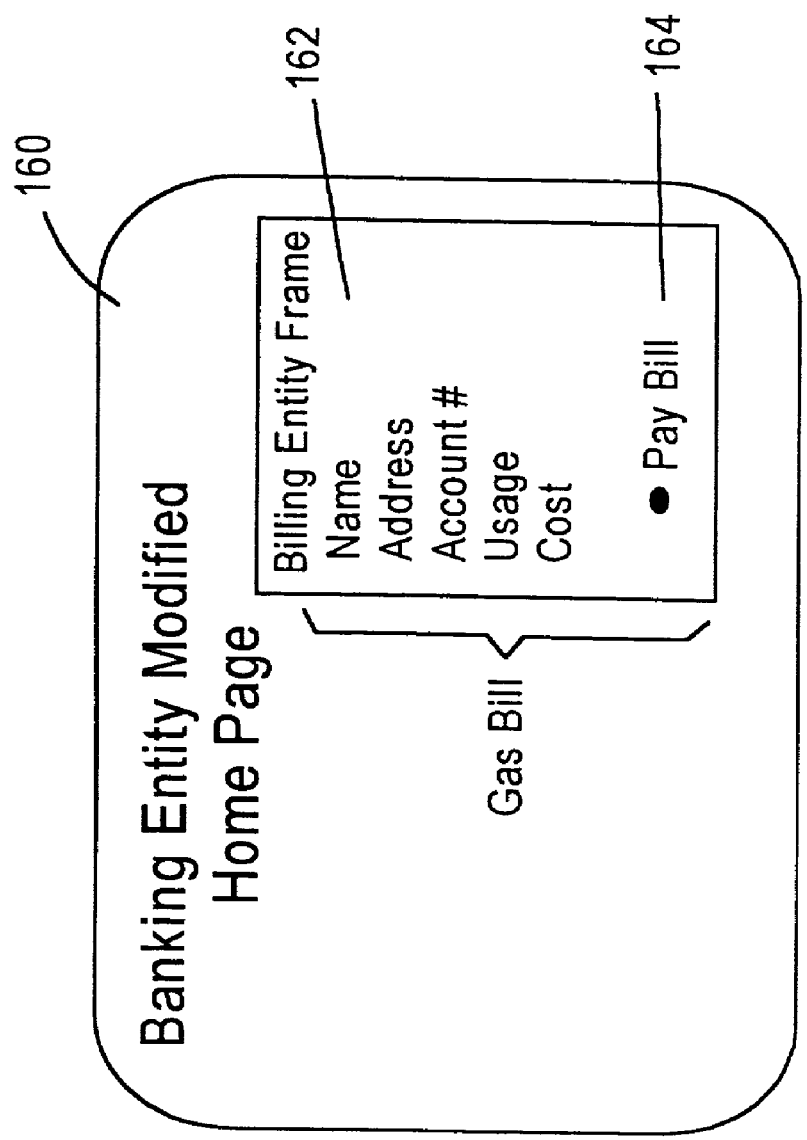
FIG. 19 shows a second modified banking entity home page having a frame presenting detailed bill data.

In FIG. 13A, the subscriber selects the "gas bill" icon 146 and is linked to the billing entity 56 along with the security ticket in step 218. The billing entity 56 messages the EPCS entity 58 to log the "view bill" request event in step 220. The billing entity 56 presents detailed bill data to the user entity 52 in step 222. FIG. 19 shows a second modified home page 160 having a billing entity frame 162 presenting the detailed bill data, which includes the subscriber name, subscriber address, account number, usage, and cost, and a "pay bill" icon 164.

Figure 14:
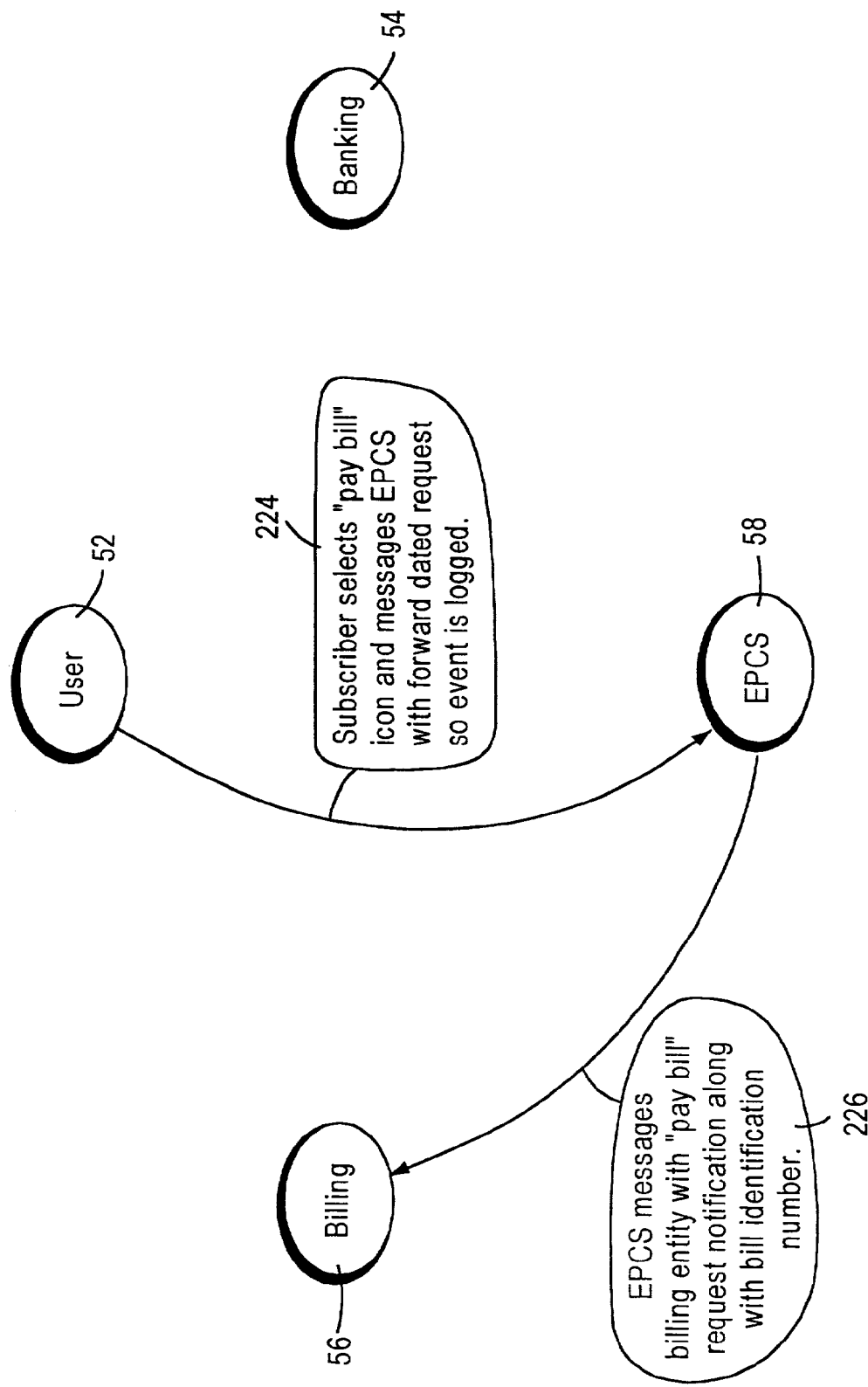
FIG. 14 is a flowchart diagram showing bill payment data and message flows between a user entity, an EPCS entity, and a billing entity in the electronic bill presentment and payment system shown in FIG. 4.

In FIG. 14, the subscriber selects the "pay bill" icon 164 and messages the EPCS entity 58 with a forward dated pay bill request so the event is logged in step 224. The EPCS entity 58 messages the billing entity 56 with a pay bill request notification along with a bill identification number in step 226.

Figure 15:
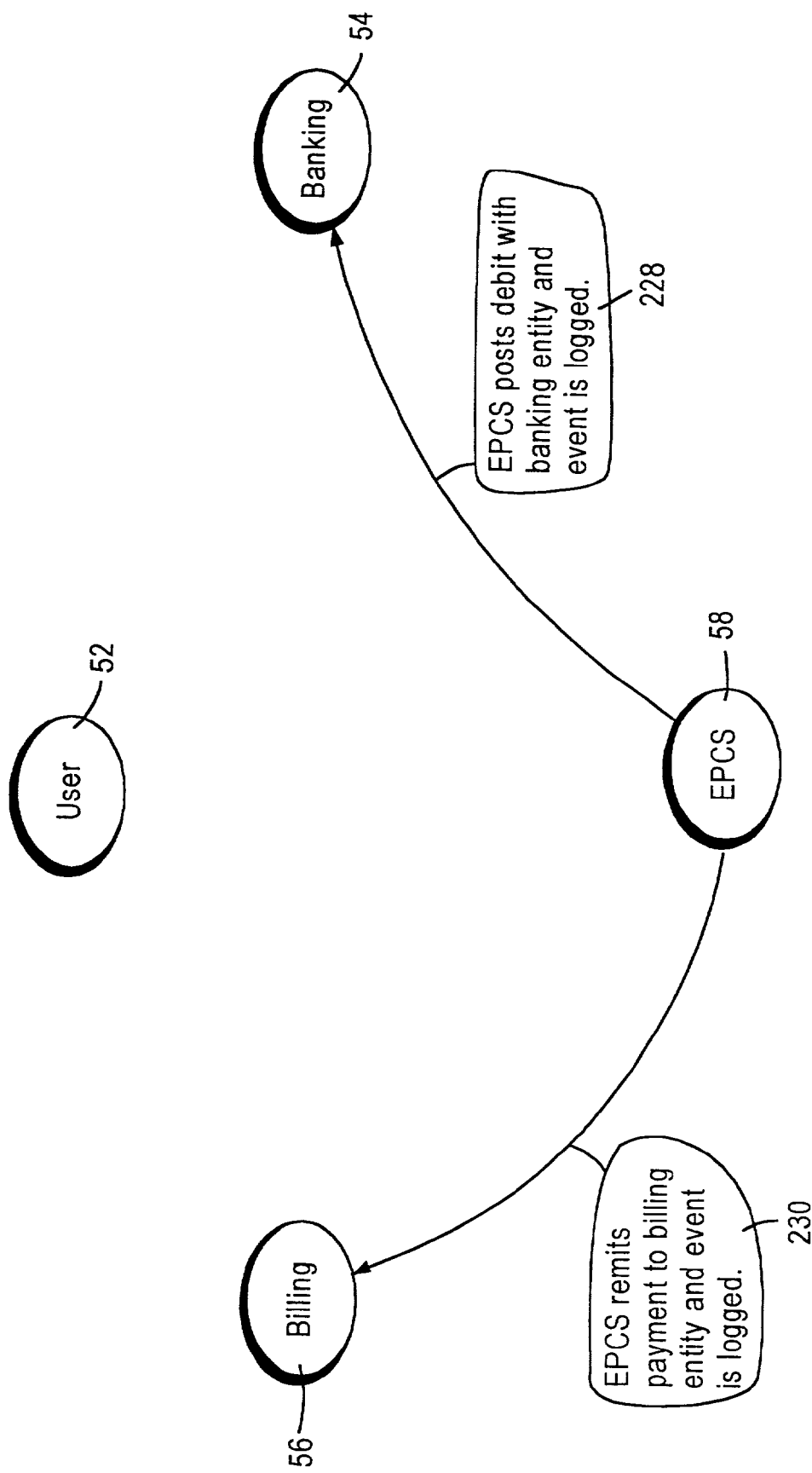
FIG. 15 is a flowchart diagram showing bill remittance and debiting data and message flows between an EPCS entity and a billing entity and a banking entity in the electronic bill presentment and payment system shown in FIG. 4.

In FIG. 15, the EPCS posts a debit with the banking entity 54 and the event is logged in step 228. The EPCS entity 58 then remits a payment to the billing entity 56 and the event is logged in step 230.

Figure 13B:
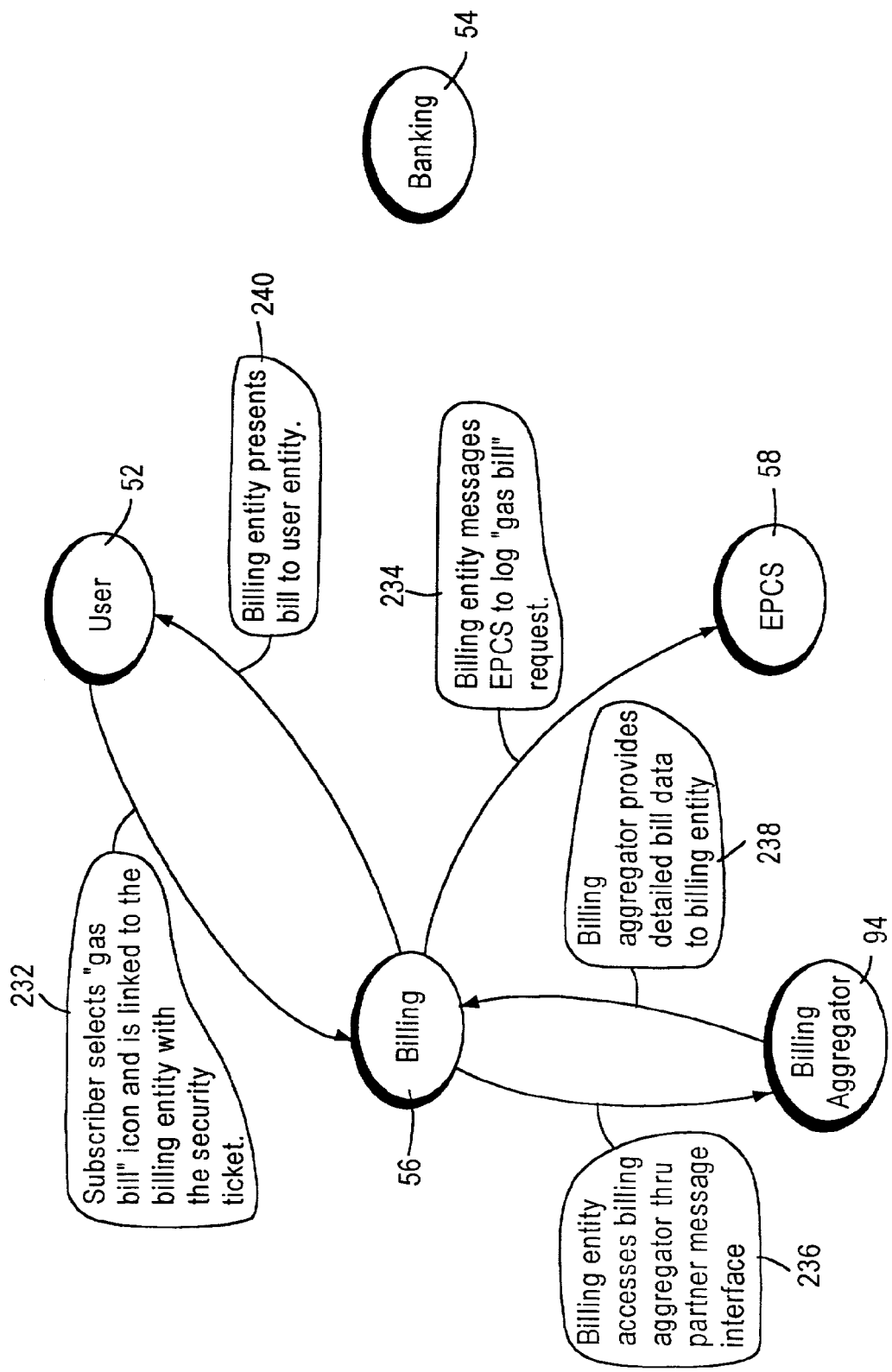
FIG. 13B is a flowchart diagram showing billing aggregator bill presentment data and message flows between a user entity, a billing entity, an EPCS entity, and an established billing aggregator in the electronic bill presentment and payment system shown in FIG. 4.

FIG. 13B can be substituted for FIG. 13A in the above-described sequence of flowchart diagrams to show how detailed bill data can be provided by the established billing aggregator 94 through the partner message interface 38 of the billing entity 56. In FIG. 13B, the subscriber again selects the "gas bill" icon 146 and is linked to the billing entity 56 along with the security ticket in step 232. The billing entity 56 again messages the EPCS entity 58 to log the "view bill" request event in step 234. However, in this case, detailed bill data is available only from the established billing aggregator 94. Thus, the billing entity 56 accesses the established billing aggregator 94 through its partner message interface 38 in step 236. In response, the established billing aggregator 94 provides detailed bill data to the billing entity 56 in step 238. The billing entity 56 then presents the detailed bill data to the user entity 52 in step 240.

It should be noted that, in an alternative embodiment, the established billing aggregator 94 could present the detailed bill data directly to the user entity 52.

Figure 13C:
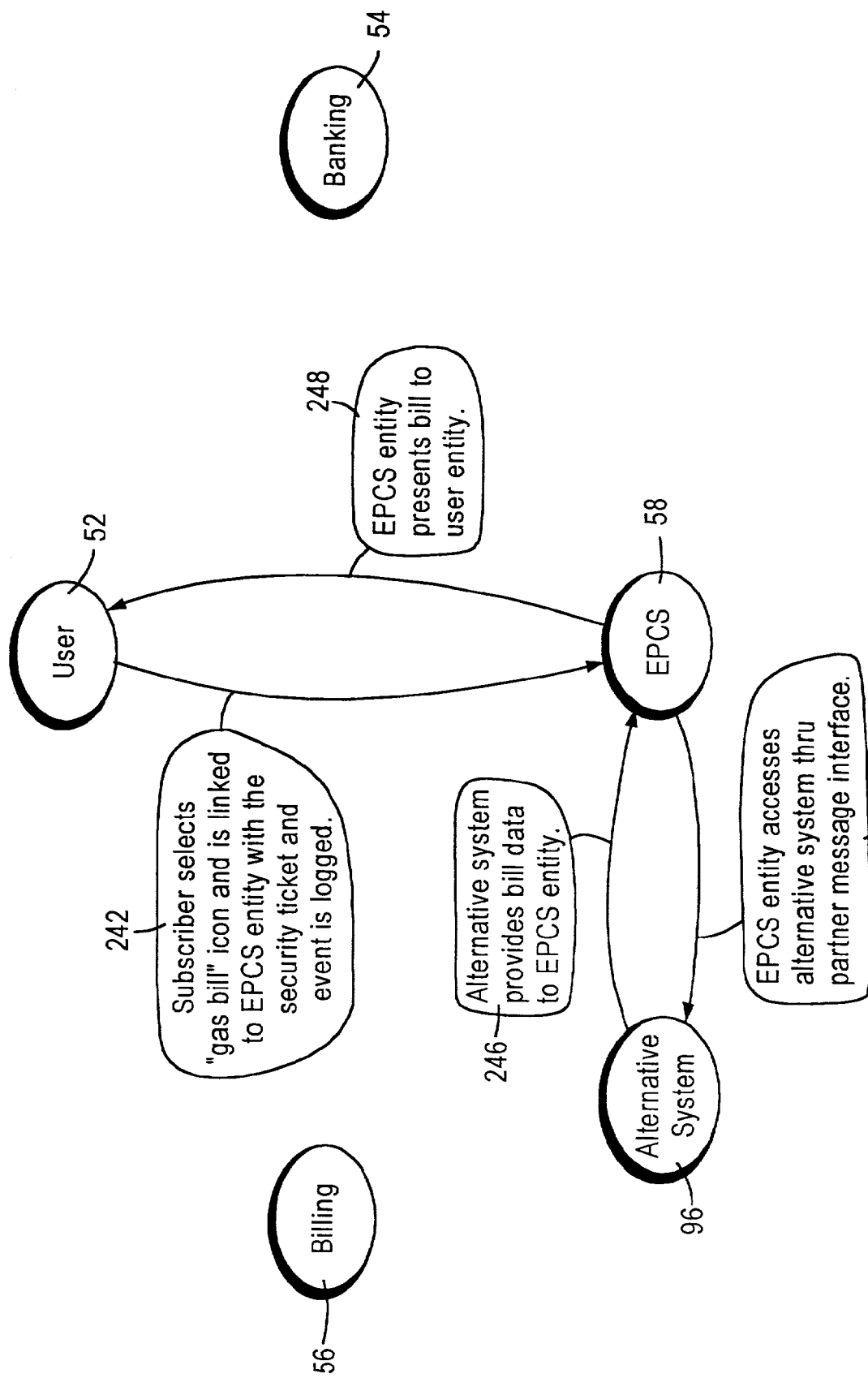
FIG. 13C is a flowchart diagram showing alternative system bill presentment data and message flows between a user entity, an EPCS entity, and an alternative bill presentment and payment system in the electronic bill presentment and payment system shown in FIG. 4.

FIG. 13C can be substituted for FIG. 13A in the above-described sequence of flowchart diagrams to show how detailed bill data can be provided by the alternative bill presentment and payment system 96 through the partner message interface 38 of the EPCS entity 58. In FIG. 13C, the subscriber selects the "gas bill" icon 146 and is linked back to the EPCS entity 58 along with the security ticket and the event is logged in step 242. In this case, detailed bill data is available only from the alternative bill presentment and payment system 96. Thus, the EPCS entity 58 accesses the alternative bill presentment and payment system 96 through its partner message interface 38 in step 244. In response, the alternative bill presentment and payment system 96 provides detailed bill data to the EPCS entity 58 in step 246. The EPCS entity 58 then presents the detailed bill data to the user entity 52 in step 248.

It should be noted that, as previously described, the EPCS entity 58 will typically require the capabilities of a billing entity 56 in order to present bills to and from the alternative bill presentment and payment system 96. Alternatively, it should be noted that detailed bill data can be provided by the alternative bill presentment and payment system 96 through the partner message interface 38 of the billing entity 56 in a manner similar to that as described in FIG. 13B.

Figure 20:
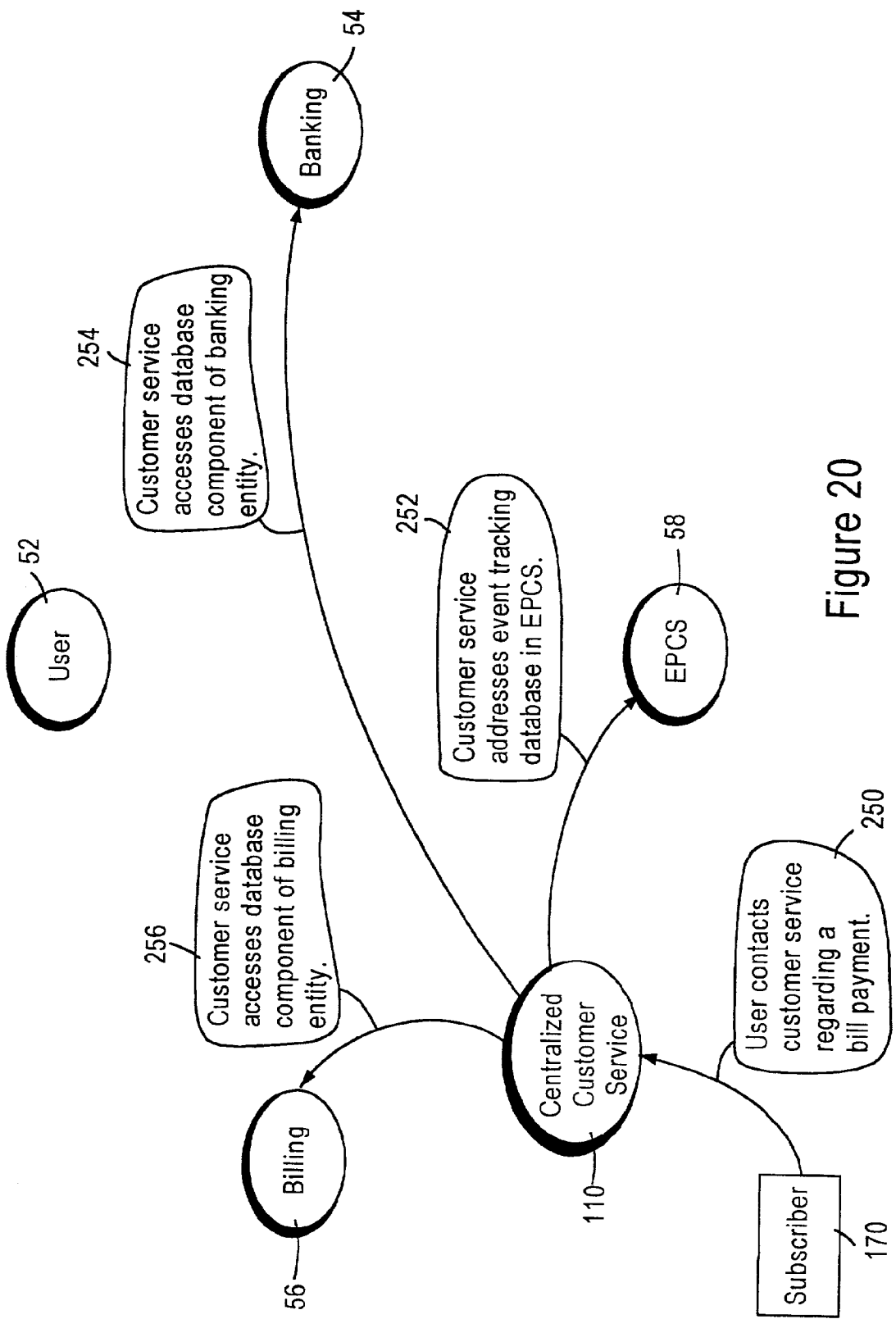
FIG. 20 is a flowchart diagram showing customer service data and message flows between a centralized customer service center, and an EPCS entity, a billing entity, and a banking entity in the electronic bill presentment and payment system shown in FIG. 4.

Referring to FIG. 20, there is shown a flowchart diagram of data and message flows between the centralized customer service center 110 and the various entities within the system 50. A subscriber 170 contacts the centralized customer service center 110 regarding a bill payment in step 250. The centralized customer service center 110 accesses the event tracking database in the EPCS entity 58 to see if a view bill, pay bill, remit payment, or debit posting event has been logged in step 252. If more detailed information regarding, for example, the posting of a debit for a bill, the centralized customer service center 110 can access the database component 32 associated with the banking entity 54, as shown in step 254. Similarly, if more detailed information regarding, for example, the remitting of a payment for a bill, the centralized customer service center 110 can access the database component 32 associated with the billing entity 56, as shown in step 256. It should be noted that, although not shown, the EPCS entity 58 can log all of the above-described accesses performed by centralized customer service center 110.

As is apparent from the foregoing description, the system 50 allows a subscriber to interact directly with individual billers while retaining the benefits of interacting with a single aggregator such as, for example, the ability to retain a single authentication and log-in procedure and a common bill presentation framework. The system 50 also allows a subscriber to retain the benefits of interacting with a single aggregator while allowing the billers and banks to retain certain preferences such as, for example, the ability to retain control of subscriber-related data and a communication channel with each subscriber.

Introduced above, billers often include supplemental information with paper bills. In a paper world, it is very difficult to selectively provide such supplemental information with only the bills mailed to those customers who are most likely to take advantage of the supplemental information. It is also very difficult to selectively avoid mailing supplemental information with bills to individual customers, e.g. to avoid providing a particular envelop stuffer to some selected group of customers.

For example, a telephone or other company may have certain customers currently using a low level of services. The company's market research may show that these customers are likely to increase their usage based upon a certain type of offer, e.g. a discount plan. The company may also have other customers who are already at a high level of usage. The company's market research may also show that these latter customers are likely to remain at a high level of usage without the discount plan.

In such a case, the company wants to make the promotional offering to the low level users but not to the high level users. Since the market research shows that the high level users will remain high-level users without the offer, little, if anything, is to be gained and much could be lost by providing the discount offer to the existing high-level users. Accordingly, the present invention allows the high level users to be advantageously serviced through a third party, such as the EPCS, or at a biller network address which is different than a biller network address at which the low level users are serviced. If the servicing is in the nature of bill presentment services, only low-level users receive a bill presentation enriched with the special promotional offering. Because only a portion of the customers are serviced from the site offering the enriched bill presentment, greater resources can be focussed on providing a more satisfying bill presentation experience to the lower level users, and hence to the users most likely to increase usage based on the promotion. The system therefore allows resources to be allocated so as to provide the greatest potential benefit to the company.

Figure 21:
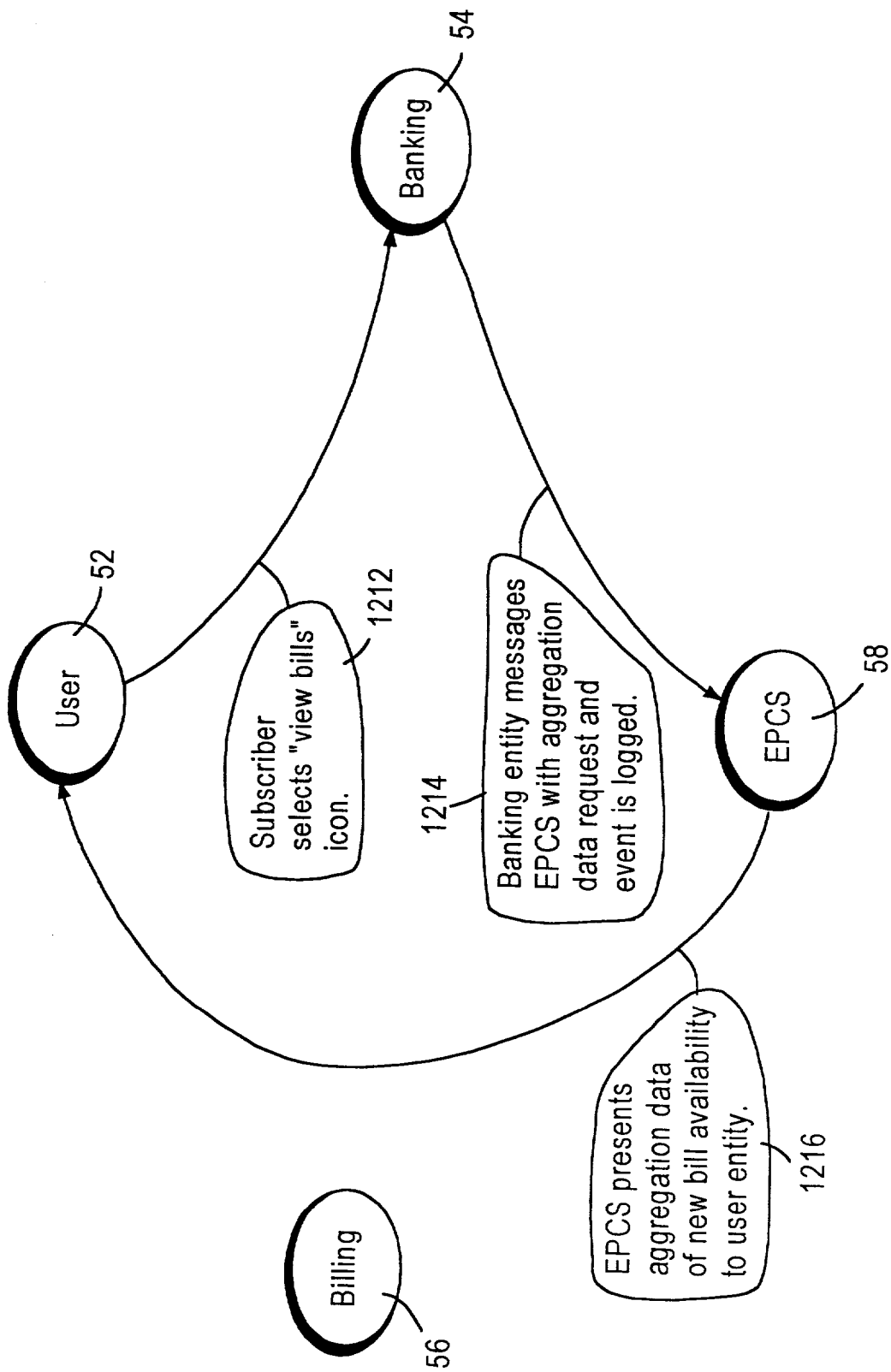
FIG. 21 is a flowchart diagram showing bill availability data and message flows between a user entity, an aggregator entity such as the depicted banking entity, and an EPCS entity in the electronic bill presentment and payment system shown in FIG. 4, modified to allow bills to be selectively presented by at one network site or another network site, in accordance with the present invention.

FIG. 21 depicts the message flow in an alternative electronic billing system implementation which provides greater flexibility in biller control of the servicing of its customers. More particularly, the system allows the biller to select those users who will be directed to a first network address which is preferably, although not necessarily, one controlled by the biller, and those users who will be directed to some other network address, e.g. a different network address controlled by the biller or some other entity, for servicing. For example, different users may be directed to different addresses and/or entities for the presentment of a detailed bill and/or supplemental information such as special offerings. Hence, this alternative system allows billers to choose which users will be directed, for example, to a biller's network address and provided with an enriched presentation experience, and which users will be serviced by the EPCS or some other entity, or at some other biller network address and provided a somewhat different presentment experience.

The database component 32 associated with the billing entity 56 stores a flag or other indicator, sometimes referred to as a "magnet", in the biller-specific subscriber profile data which indicates those users which are to be directed to, for example, the biller for presentment of bills or promotional information that supplements the bill. Users which are not flagged might be presented bills and/or general promotional information by the EPCS, or some other entity, such as a separate bill aggregator or alternative bill presentment and payment system. Alternatively, these non-flagged users could be presented bills and/or general promotional information by the biller, but from a network address different than the address used to present bills and/or special promotional information to the flagged users. The database component 32 associated with the billing entity 56 generally continues to store the billing data for both the flagged and non-flagged users. However, the billing entity also provides the billing data for the nonflagged users to the database of another entity if this other entity will be presenting bills to non-flagged users.

For example, the billing data for non-flagged users could be located at the EPCS entity 58, as has been previously discussed, if the EPCS will be presenting bills to non-flagged users. In such a case, the billing data for the non-flagged users is stored in the database component 32 of the EPCS entity 58. Whether or not the EPCS 58 will be presenting bills to non-flagged users, the database component 32 of the EPCS 58 stores one or more flags or other indicators in the biller-specific subscriber profile data to indicate that certain users are to be presented bills and/or promotional information at other than a primary biller network address. Of course, if desired, the flags could be used to indicate those users which are to be presented bills and/or promotional information at the primary biller address. In either case, the flags or other indicators stored in the EPCS database component 32 are used to ensure that certain users are presented bills and/or promotional information by the EPCS or some other entity, or at an alternate biller address, and other users are presented bills and/or promotional information at the primary biller or other entity address.

Users which are not flagged for the applicable biller in the EPCS database 32 are, in the preferred implementation, directed to the applicable biller primary network address for presentment of bills and/or supplemental information. However, as noted above, these users could, if desired, be directed to an address controlled by some other entity. Users which are flagged in the EPCS database 32 are directed to the EPCS 58 or some other entity, or perhaps a different biller network address than the address to which the non-flagged users are directed, for presentment of bills and/or supplemental information. In the preferred implementation, users which are not flagged for any billers are always directed to the applicable billers for presentment of bills and/or supplemental information. Users which are flagged for some billers and not flagged for other billers are presented bills and/or supplemental information of the billers for which they are flagged by the EPCS or at an alternate biller address, and are presented bills and/or supplemental information of the billers for which they are not flagged by the billers themselves.

Figure 22A:
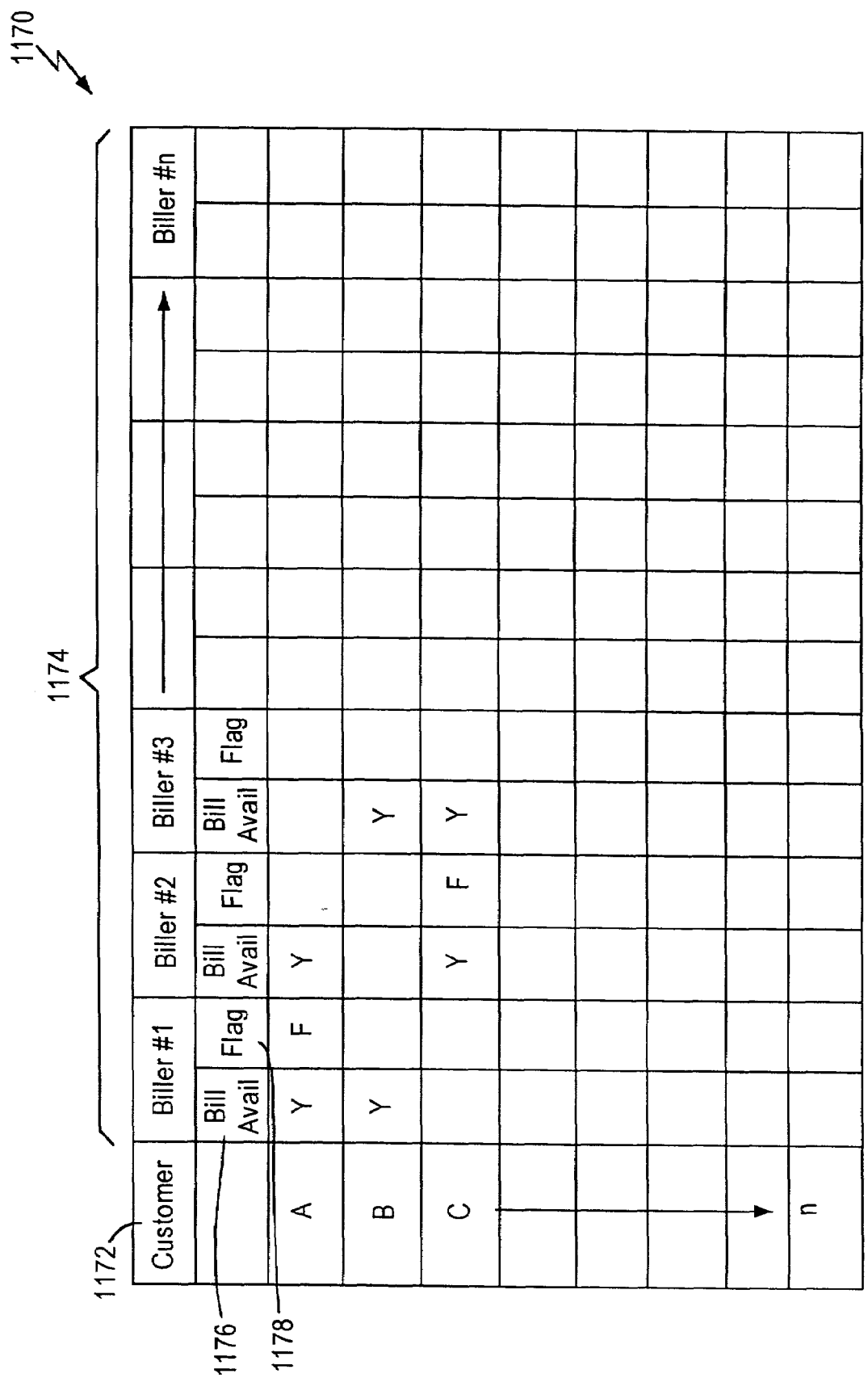
FIG. 22A depicts an EPCS database for storing bill availability information and flags for directing a user to a desired network address for bill presentation.

FIG. 22A depicts a database 1170 which is stored in the database component 32 associated with the EPCS 58. The database 1170 includes a user list 1172, listing users A, B, C . . . n, and a biller list 1174, listing billers 1, 2, 3 . . . n. For each user, the database stores bill availability information 1176. The information 1176 may simply indicate that a bill is available or may include bill summary information, such as the total bill amount. For each available bill, a flag or other indicator 1178 is optionally provided. The flag 1178 identifies the bills of those customers which are to be directed to a secondary network address for presentation of requested bills and/or supplemental information of a particular biller. The flag information may be provided to the EPCS database at the time the bill availability information is transmitted to the database by the biller. Such transmissions typically occur off-line, e.g. in a non-real-time batch transmission, but could, if desired, occur in an on-line session between the biller and the EPCS. Even in this latter case, however, the session between the biller and the EPCS would typically occur asynchronously, i.e. as a separate session, from the session between the consumer and the EPCS. If desired, the flag could be provided in a communication separate from that transmitting the bill availability information. This may be advantageous if the network address to which the customer will be sent for bill presentment and/or presentation of supplemental information will not change from billing cycle to billing cycle.

As shown in FIG. 22A, user A has bills available from billers 1 and 2. The biller 1 bill availability information is associated with a flag. Hence, as will be discussed further below, should user A request detailed bill information relating to the biller 1 bill or request payment of the bill without first requesting to view the bill, user A will be directed to a network address other than a primary network address of biller 1 for presentment of the bill and/or supplemental material. On the other hand, should user A request detailed bill information relating to the biller 2 bill or request payment of the bill without first requesting to view the bill, user A will be directed to the primary network address of the biller 2 for presentment of the bill and/or supplemental information.

User B has bills available from billers 1 and 3. The bill availability information for these bills is not associated with a flag. Accordingly, should user B request detailed bill information relating to the bill of biller 1 or biller 3 or request payment of the bill without first requesting to view the bill, user B will be directed to the primary network address of the applicable biller for presentment of the bill.

User C has bills available from billers 2 and 3. The biller 2 bill availability information is associated with a flag. Hence, should user C request detailed bill information relating to the biller 2 bill or attempt to pay the bill without first viewing the bill detail, user C will be directed to a network address other than a primary network address of biller 2 for presentment of the bill and/or supplemental information. On the other hand, should user C request detailed bill information relating to the biller 3 bill or attempt to pay the bill without first viewing the bill detail, user C will be directed to the primary network address of biller 3 for presentment of the bill and/or supplemental information.

It should be noted that none of the bill availability information associated with bills of biller 3 are shown to be flagged. This reflects a desire by biller 3 to have all its customers sent to its primary bill presentation address to view detailed bill information and/or supplemental information.

As shown in FIG. 22B, the EPCS database component 32 also stores a database 1180 of network addresses 1184 and 1186 in association with an identifier 1182 for each of the billers. As depicted, biller 1 has a primary network address at URL 1A. This address could, for example, be the address of a presentment server at the biller's network site. Biller 1 also has a secondary network address at URL 1B. This address could be a network address of a presentment server at a different entity site, e.g. at the EPCS 58, or a different presentment server at the biller's site or a different address to a single presentment server at the biller 1 site.

Biller 2 has a primary network address at URL 2A. This address could, for example, be the address of a presentment server at the biller 2 network site. Biller 2 also has a secondary network address at URL 2B. As with biller 1, this address could be a network address of a presentment server at a different entity site, or a different presentment server at the biller's site or a different address to a single presentment server at the biller 2 site.

Biller 3 has only a single network address at URL 3. This address could be the address of a presentment server at the biller's network site. Since biller 3 does not have a secondary network address, all customers of biller 3 are directed to a single presentment server for presentment of detailed bill information and/or supplemental information.

It will be recognized that, if desired, the number of different secondary network addresses for a given biller identified in database 1182 could be increased to 3 or more. In such a case, different flags, each for example representing a different network address, are used in database 1170 to identify which of the multiple secondary addresses a specific customer is to be directed for electronic bill and/or supplemental information presentation.

Turning back to FIG. 21, as shown the subscriber selects the "view bills" icon 1132 in step 1212. The banking, or other aggregator, entity 54 messages the EPCS entity 58 with an aggregation data request and the event is logged in step 1214. The EPCS entity 58 presents aggregation data of new bill availability to user entity 52 in step 1216.

Figure 23A:
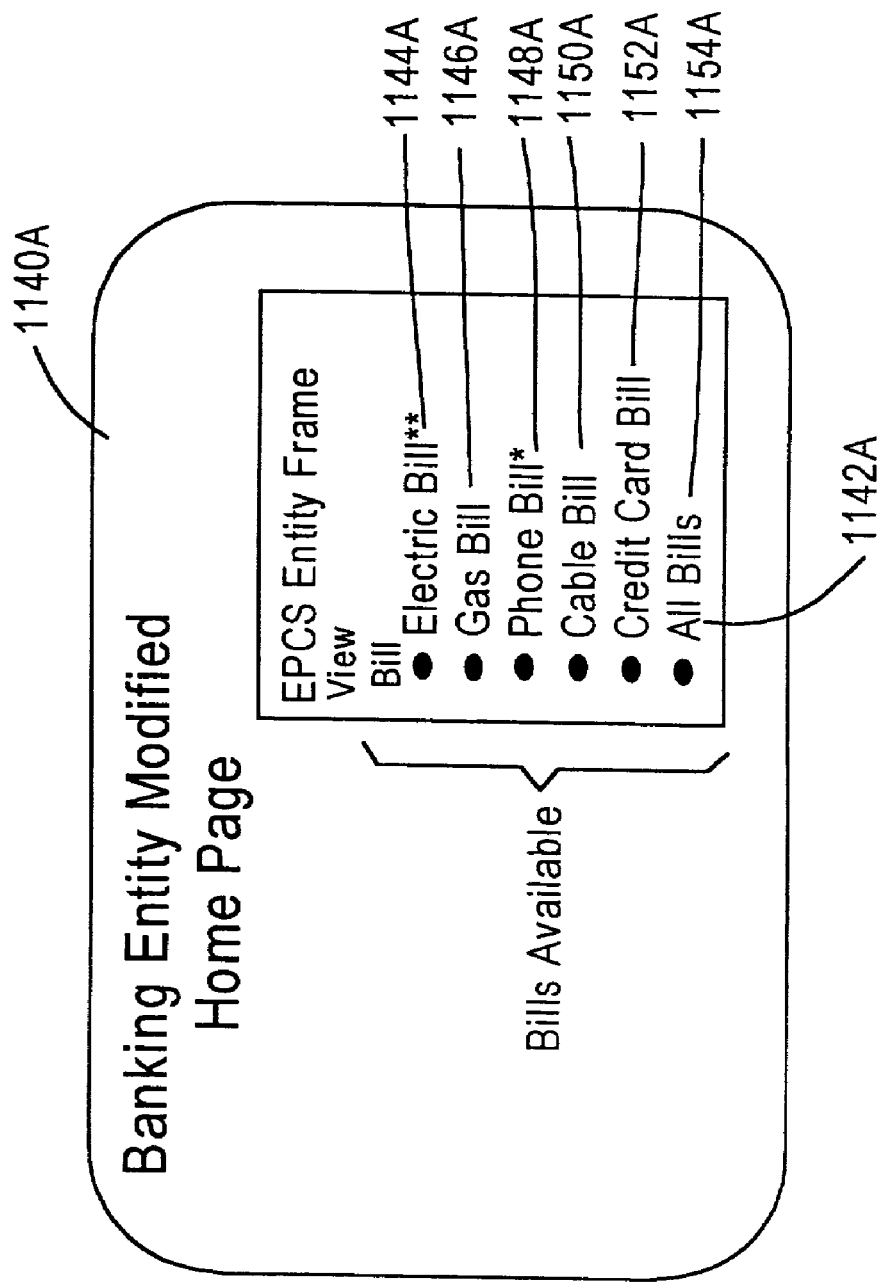
FIG. 23A shows a modified banking entity home page having a frame presenting new bill availability data for a first subscriber, with certain data available at a biller network address and other data available at an EPCS network address or some other network address, in accordance with the present invention.

As shown in FIG. 23A, the banking entity modified home page 1140A includes an EPCS entity frame 1142A presenting the new bill availability data for a first subscriber. FIG. 23A is similar to FIG. 18, except that the user will be hyper-linked to the biller's primary network address to obtain detailed bill data and/or supplemental information from some of the billers, but will be hyper-linked to the biller's secondary network address to obtain detailed bill data and/or supplemental information of other of the billers.

More particularly, the available bills shown on screen 1140A include an "electric bill" icon 1144A, a "gas bill" icon 1146A, a "phone bill" icon 1148A, a "cable bill" icon 1150A, a "credit card bill" icon 1152A, and an "all bills" icon 1154A which allows all bills to be presented simultaneously, albeit in separate frames. The electric and phone bills are shown with one or more asterisks to indicate that these bills or associated supplemental material will be provided to the first subscriber by the EPCS 58 or biller 56 at a secondary biller network address, as will be described in detail below, rather than by the biller 56 at a primary biller address. The asterisk(s) would not actually appear on the screen displayed to the user but is shown here to indicate that the first subscriber has not been flagged by the billers associated with the electric and phone bills so as to aid in the understanding of the invention.

Figure 23B:
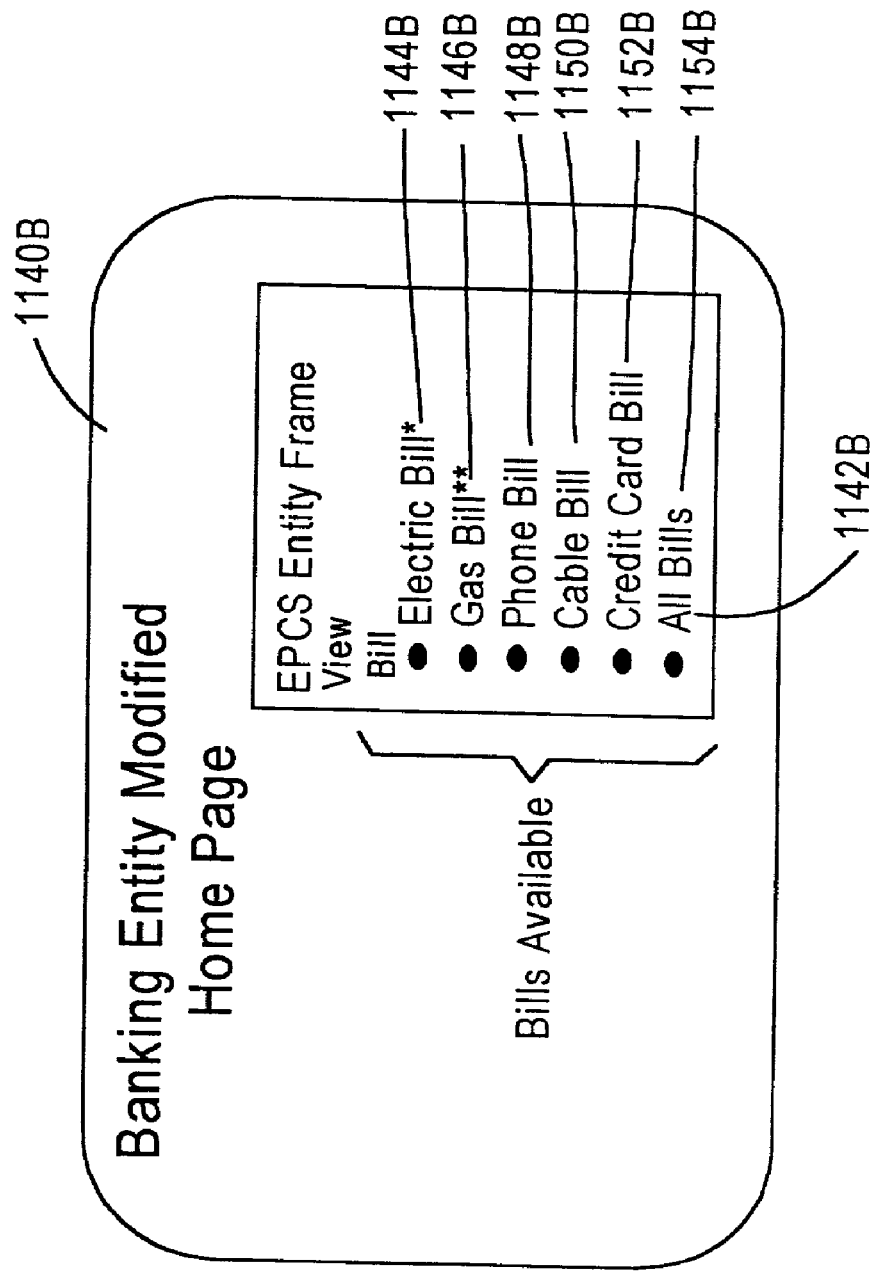
FIG. 23B shows a modified banking entity home page having a frame presenting new bill availability data for a second subscriber, with certain data available at a biller network address and other data available at an EPCS network address or some other network address, in accordance with the present invention.

FIG. 23B is similar to FIG. 23A but is for a second subscriber. The banking entity modified home page 1140B includes an EPCS entity frame 1142B presenting the new bill availability data for the second subscriber. The available bills shown on screen 1140B include an "electric bill" icon 1144B, a "gas bill" icon 1146B, a "phone bill" icon 1148B, a "cable bill" icon 1150B, a "credit card bill" icon 1152B, and an "all bills" icon 1154B. In the case of FIG. 23B, the second subscriber will be hyper-linked to the biller to obtain his/her electric bill and/or supplemental information. It should be noted that, although both the first and second subscribers are billed by the same phone company, the first subscriber is directed to the EPCS for presentation of its phone bill and/or supplemental information, and the second subscriber is directed to the biller itself for presentment of its phone bill and/or supplemental information. The second subscriber will also be hyper-linked to supplemental promotional information. However, although both the first and second subscribers are billed by the same gas utility company, the biller network address to which the second subscriber will be linked is different than the biller address to which the first subscriber will be linked for presentation of their respective gas bills and/or associated supplemental information. Finally, the second subscriber will also be hyper-linked to the EPCS 58 to obtain its electric bill and/or associated supplemental information. Hence, in FIG. 23B, the gas and electric bills rather than the electric and phone bills, are shown with an asterisk(s) to indicate that the second subscriber has not been flagged by the electric and gas companies and that these bills and/or associated supplemental information will be provided to this particular user at a secondary network address by the biller 56 or the EPCS 58, rather than by the biller 56 at a primary network address.

Figure 23C:
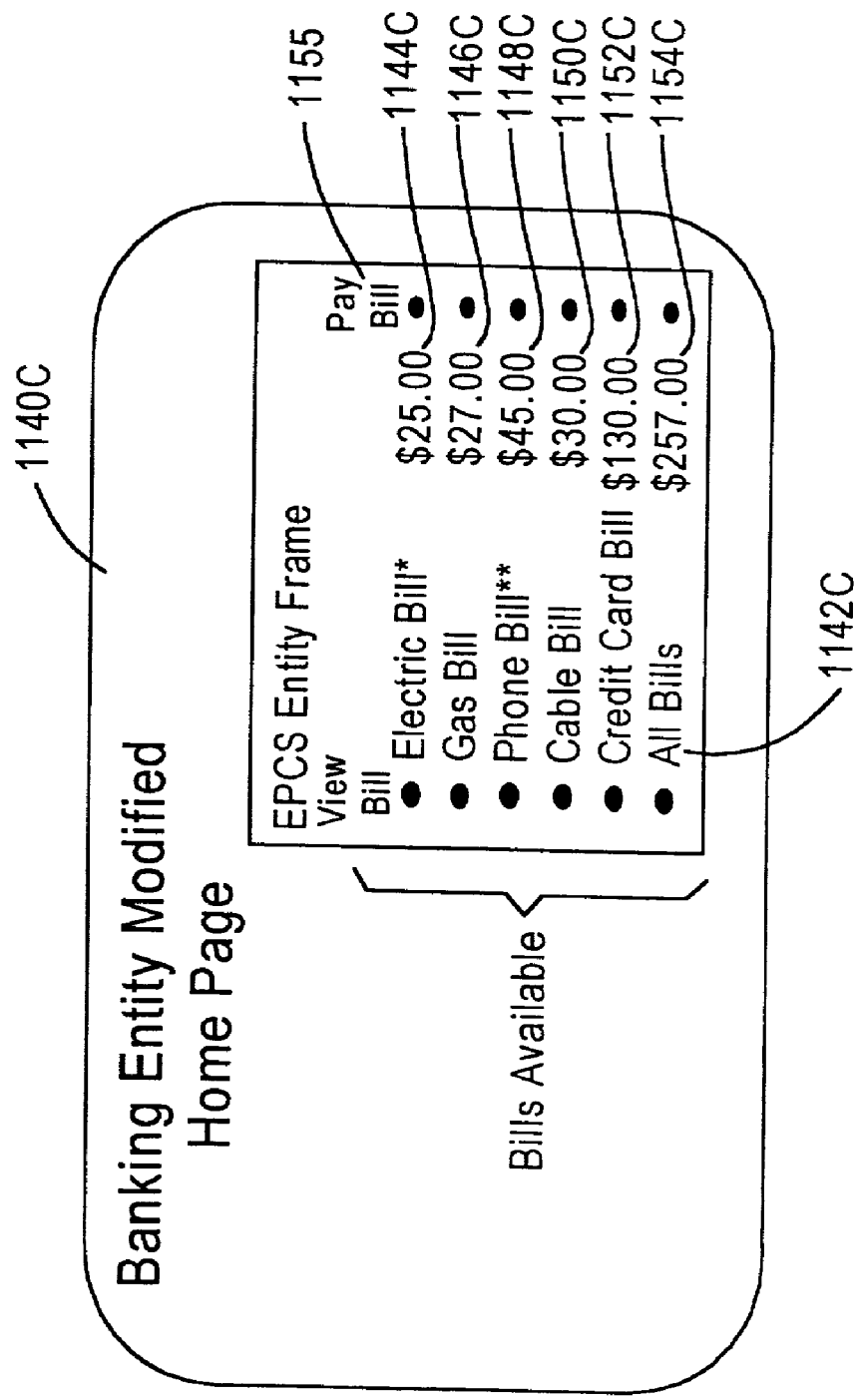
FIG. 23C shows a modified banking entity home page similar to that shown in FIG. 23A, except that the home page has a frame presenting new bill availability data which includes total bill amounts, for the first subscriber, with certain data available at a biller network address and other data available at an EPCS network address or some other network address, in accordance with the present invention.

FIG. 23C is similar to FIG. 23A except that the banking entity modified home page 1140C includes an EPCS entity frame 1142C presenting the new bill availability data, including total bill amounts, for the first subscriber. The modified home page 1140C can be substituted for the modified home page 1140A. The available bills shown on screen 1140C include an "electric bill" icon 1144C, a "gas bill" icon 1146C, a "phone bill" icon 1148C, a "cable bill" icon 1150C, a "credit card bill" icon 1152C, and an "all bills" icon 1154C. A "pay bill" icon 1155 is also provided so that a user can request the payment of the bill amount based upon a review of only the information presented in EPCS frame 1142C. In the case of FIG. 23C, the electric and phone bills are shown with one or more asterisks, as in FIG. 23A, to indicate that the billers associated with these bills have not flagged the first subscriber. Hence, if the "view bill" icon is clicked-on the first subscriber will be hyper-linked as discussed above with reference to FIG. 23A to the appropriate entity and address to view the detailed bill information and/or associated supplemental information.

As discussed above with reference to FIGS. 14 and 15, when, after reviewing billing information, detailed or otherwise, the user selects "pay bill", the user is directed to the EPCS 58 which communicates with the applicable billing and banking entities to process the payment. To perform this function, the database component 32 associated with the EPCS 58 entity is made aware of the total amount of each available bill for a user 52. Accordingly, each billing entity 56 must provide bill summary information, including the total bill amount, for each available bill to the aggregator database, which is preferably but not necessarily located at the EPCS entity 58, as has been previously discussed. As shown, the database component 32 of the EPCS entity 58 stores bill summary information for each available bill for each user which is accessed and used by the EPCS to process payments responsive to the receipt of user initiated "pay bill" messages received directly from the user or from the user's sponsor.

In the case of FIG. 23C, the payment process can be initiated by the user directly from the bill availability information presented by the EPCS entity 58 in frame 1142C. However, as noted above, certain billers have flagged the first subscriber, thereby indicating a desire that the first subscriber be directed to those billers. Hence, as will be described further below, the system further provides the ability to direct the user to the biller or any other desired entity even in those cases where the user is offered the option of providing the pay bill instruction from the EPCS bill availability screen, such as in FIG. 23C.

Figure 24A:
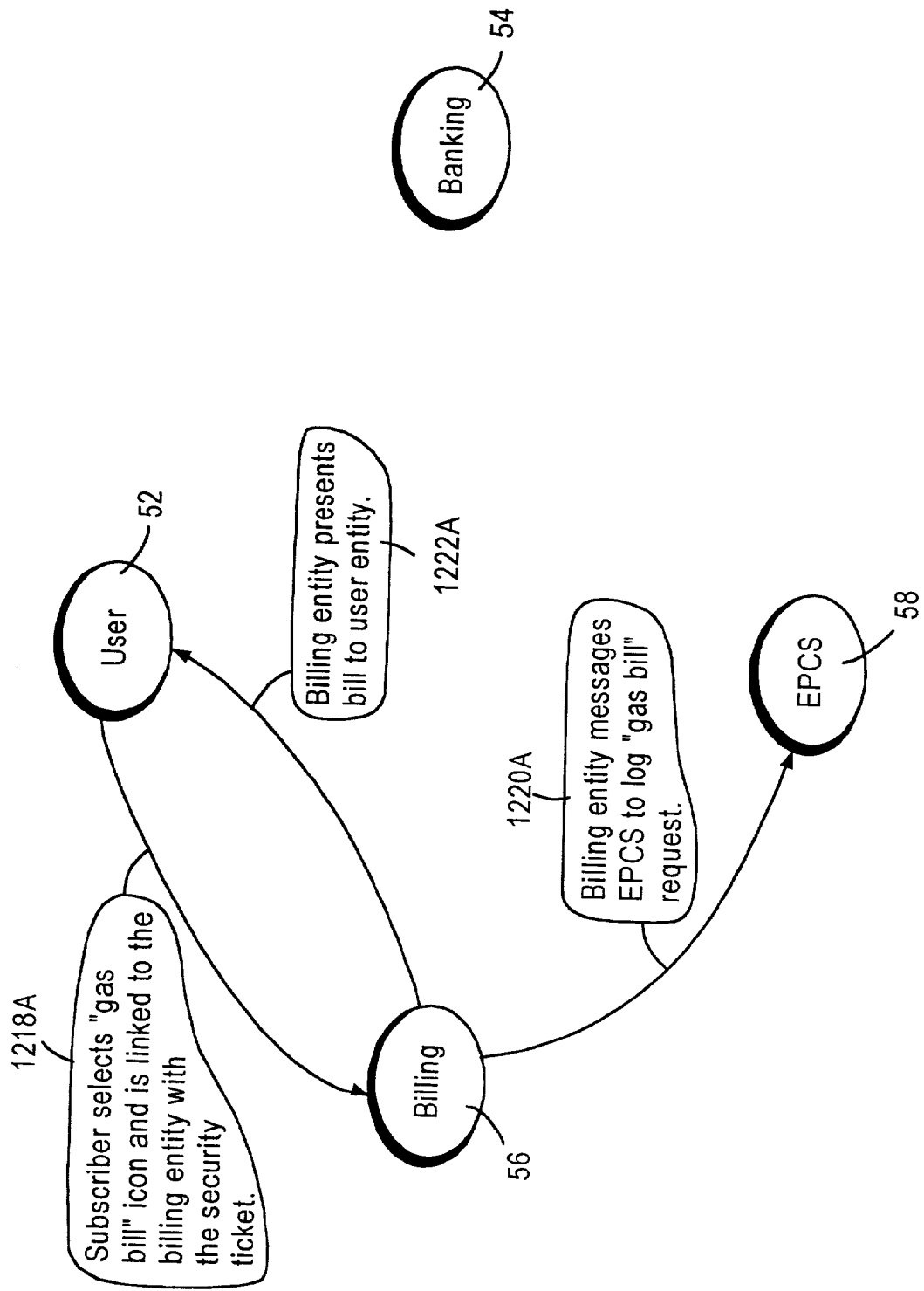
FIG. 24A is a flowchart diagram showing message flows between a user entity, a billing entity, and an EPCS entity in the electronic bill presentment and payment system shown in FIG. 4 for the first subscriber requesting a bill identified in FIG. 23A which is available at the biller address, in accordance with the present invention.

In FIG. 24A, which is similar to FIG. 13A, the first subscriber selects the "gas bill" icon 1146A and is linked to a network address at the billing entity 56, with the security ticket in step 1218A. The billing entity 56 messages the EPCS entity 58 to log the "view bill" request event in step 1220A. The billing entity 56 presents detailed bill data to the user entity 52 in step 1222A.

Figure 24B:
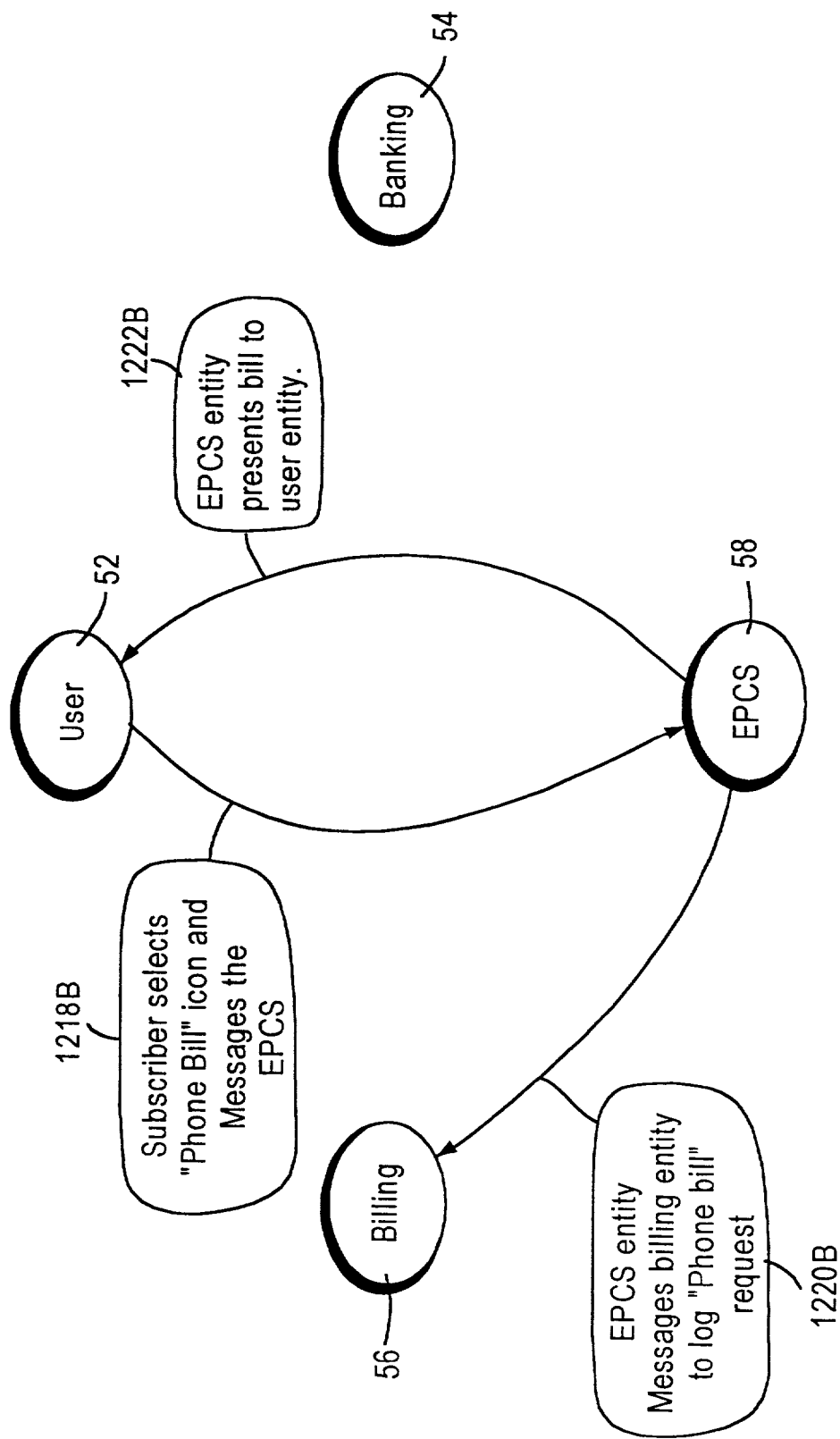
FIG. 24B is a flowchart diagram showing message flows between a user entity, a billing entity, and an EPCS entity in the electronic bill presentment and payment system shown in FIG. 4 for the first subscriber requesting a bill identified in FIG. 23A which is available at the EPCS address, in accordance with the present invention.

In FIG. 24B, which is similar to FIG. 24A, the first subscriber selects the "phone bill" icon 1148B and messages the EPCS 58 for detailed billing data in step 1218B. The EPCS entity 58 messages the billing entity 56 to log the "view bill" request event in step 1220B. The EPCS entity 58 presents detailed bill data to the user entity 52 in step 1222B.

Figure 24C:
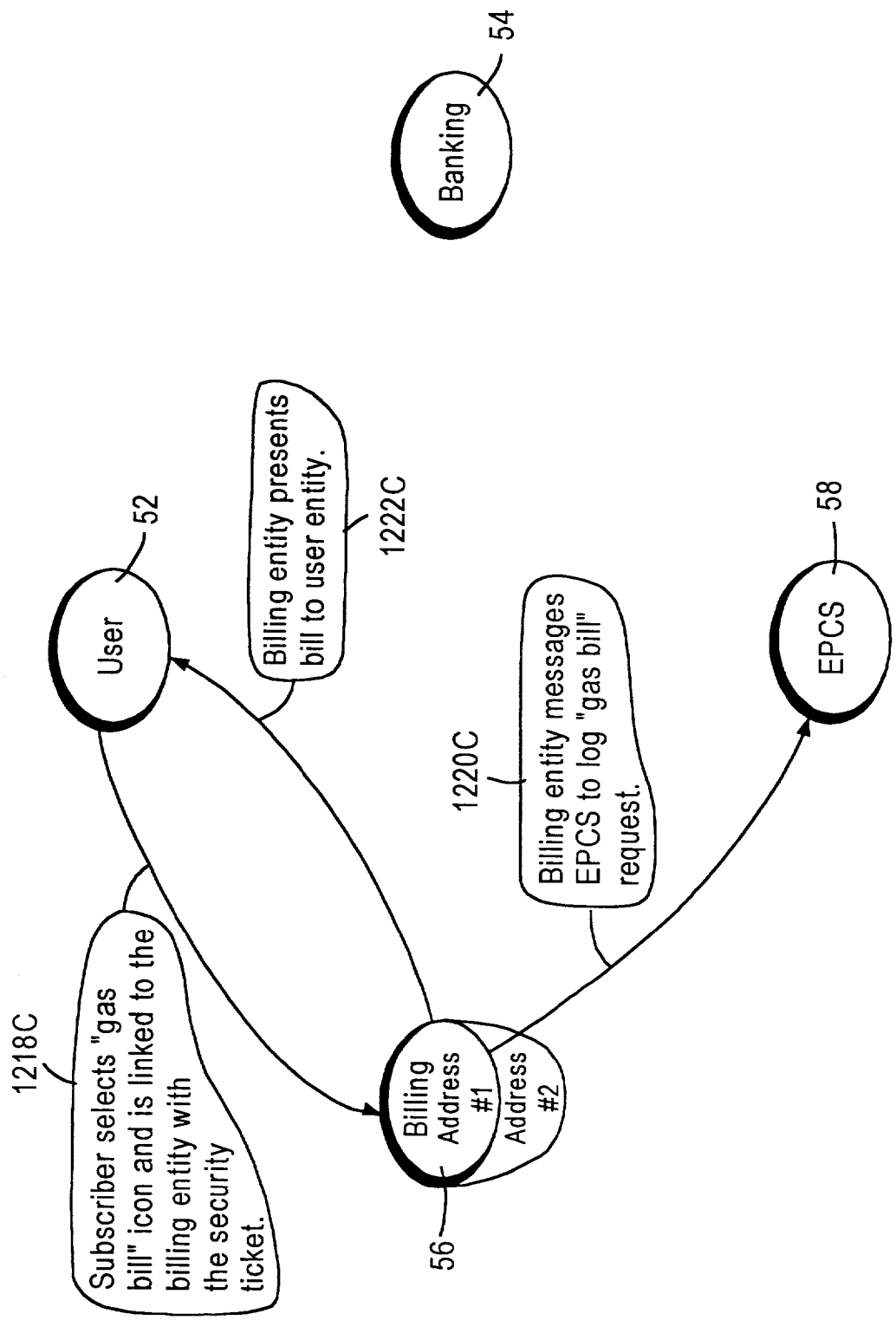
FIG. 24C is a flowchart diagram showing message flows between a user entity, a billing entity, and an EPCS entity in the electronic bill presentment and payment system shown in FIG. 4 for the second subscriber requesting a bill identified in FIG. 23B which is available at an alternate biller address, in accordance with the present invention.

In FIG. 24C, which is similar to FIG. 24A, the second subscriber selects the "gas bill" icon 1146C and is linked to a secondary network address at the billing entity 56, with the security ticket in step 1218C. Although the billing entity 56 in FIGS. 24A and 24C represent the same gas company, the network address of the billing entity, i.e. the gas company, to which the second subscriber is linked in step 1218C is different than the network address to which the first subscriber is linked in step 1218A. Thus, in the case of the gas company, the biller retains control over all bill presentments and simply flags different users so that the EPCS will provide hyperlinks which direct different users to different biller network addresses as desired by the biller. Here again, the billing entity 56 messages the EPCS entity 58 to log the "view bill" request event in step 1220C. The billing entity 56 also presents detailed bill data to the user entity 52 in step 1222C, however, as will be described in greater detail below, the presentations made to the subscriber linked to the primary network address of the gas company and to the subscriber linked to the secondary network address of the gas company will be different.

Figure 24D:
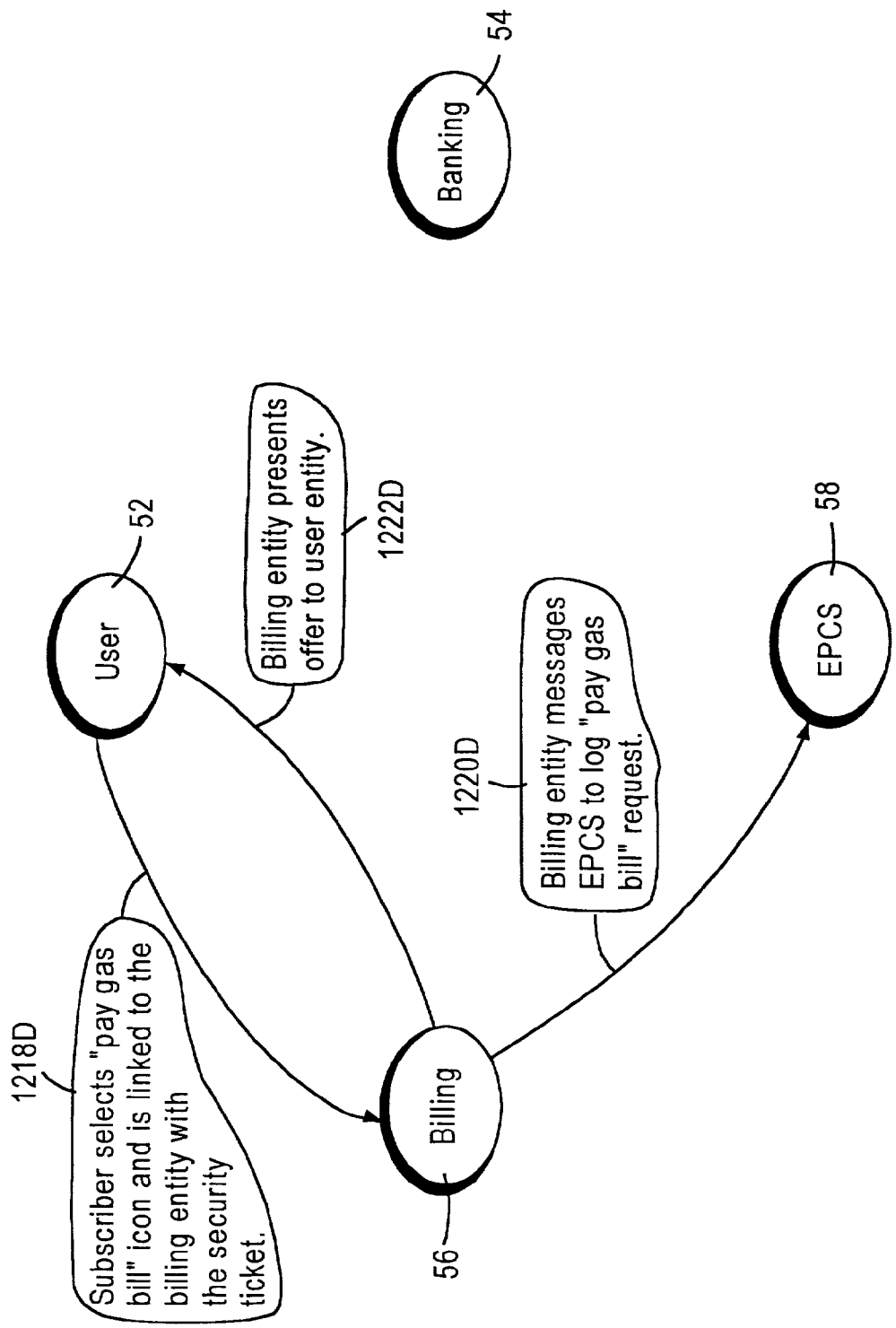
FIG. 24D is a flowchart diagram showing message flows between a user entity, a billing entity, and an EPCS entity in the electronic bill presentment and payment system shown in FIG. 4 for the first subscriber directing payment of a bill identified in FIG. 23C, in accordance with the present invention.

In FIG. 24D, which is similar to FIG. 24A, the first subscriber selects, e.g. clicks-on, the "pay bill" icon 1155 after highlighting the "gas bill" in the bill summary information shown in FIG. 23C. Although, as discussed above, the payment instruction will be processed by the EPCS, the first subscriber is automatically linked to a network address at the billing entity 56, with the security ticket, in step 1218D. The billing entity 56 messages the EPCS entity 58 to log the "pay bill" request event in step 1220D. The EPCS 58 may initiate processing of the pay instruction based upon this message from the billing entity 56 or based upon some other message, as will be recognized by those skilled in the art. The billing entity 56 presents a special promotional offer to the user entity 52 in step 1222D. Hence, even though the user has not requested detailed bill information from the biller, the user is forced to the billing entity for presentation of supplemental information, as may be desired by the biller, without presenting the detailed bill. It will of course be recognized that the first subscriber can be forced to any biller whose bill is shown to be available in FIG. 23C, as may be desirable under the circumstances, whenever the user clicks on the "pay bill" icon to direct payment of that biller's bill.

Figure 25A:
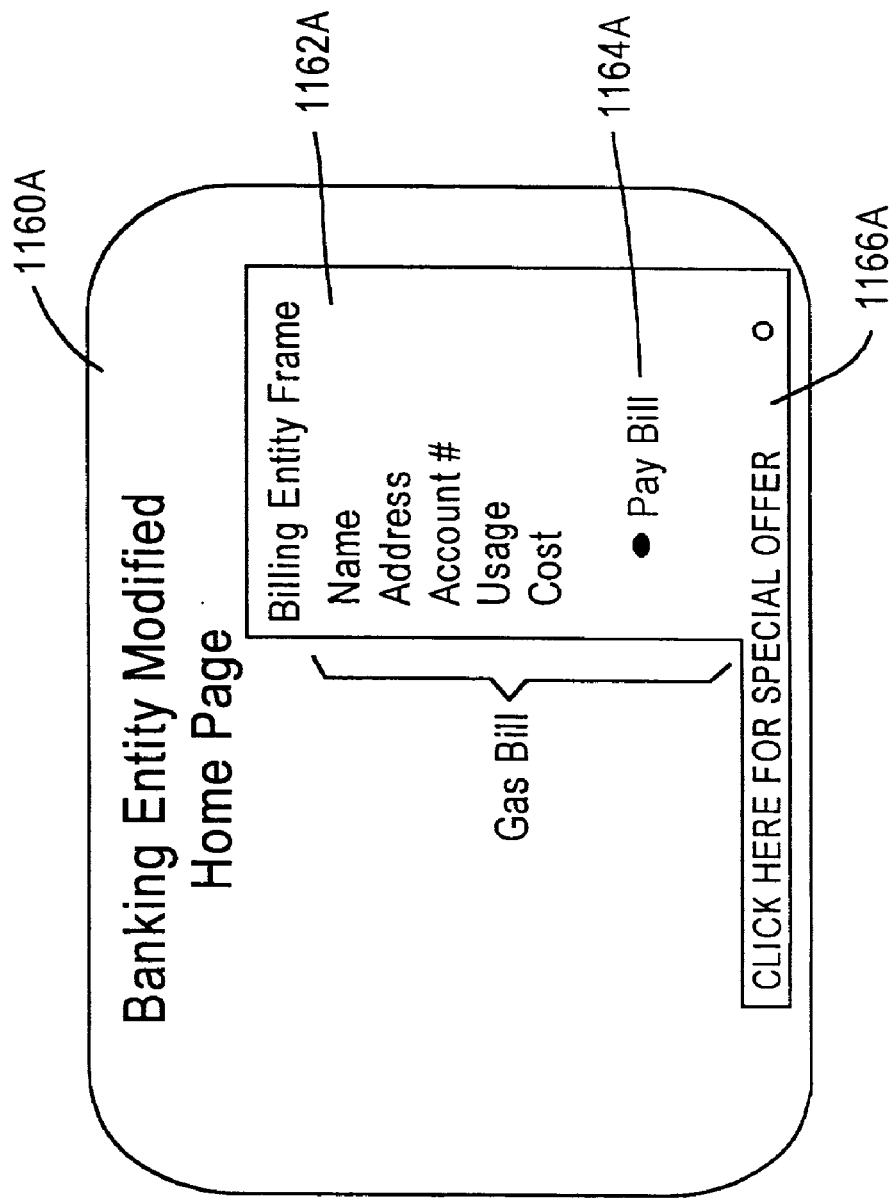
FIG. 25A shows another modified banking entity home page having a billing entity frame presenting detailed bill data and special promotional information to the first subscriber, in accordance with the present invention.

FIG. 25A shows a home page 1160A having a billing entity frame 1162A presenting the detailed gas bill data to the first subscriber, after a "view bill" request. The home page 1160A includes, within frame 1162A, the subscriber name, subscriber address, account number, usage, and cost, and a "pay bill" icon 1164A. As shown in FIG. 25A, billing entity frame 1162A also includes an icon 1166A which can be clicked on to present special targeted supplemental information, e.g. a special discount offer, survey or software upgrade etc., to the first subscriber. The first subscriber may also be provided with other general supplemental information, such offers as which are being generally made to all gas company customers. Hence, a rich presentation is provided to the first subscriber.

Figure 25B:
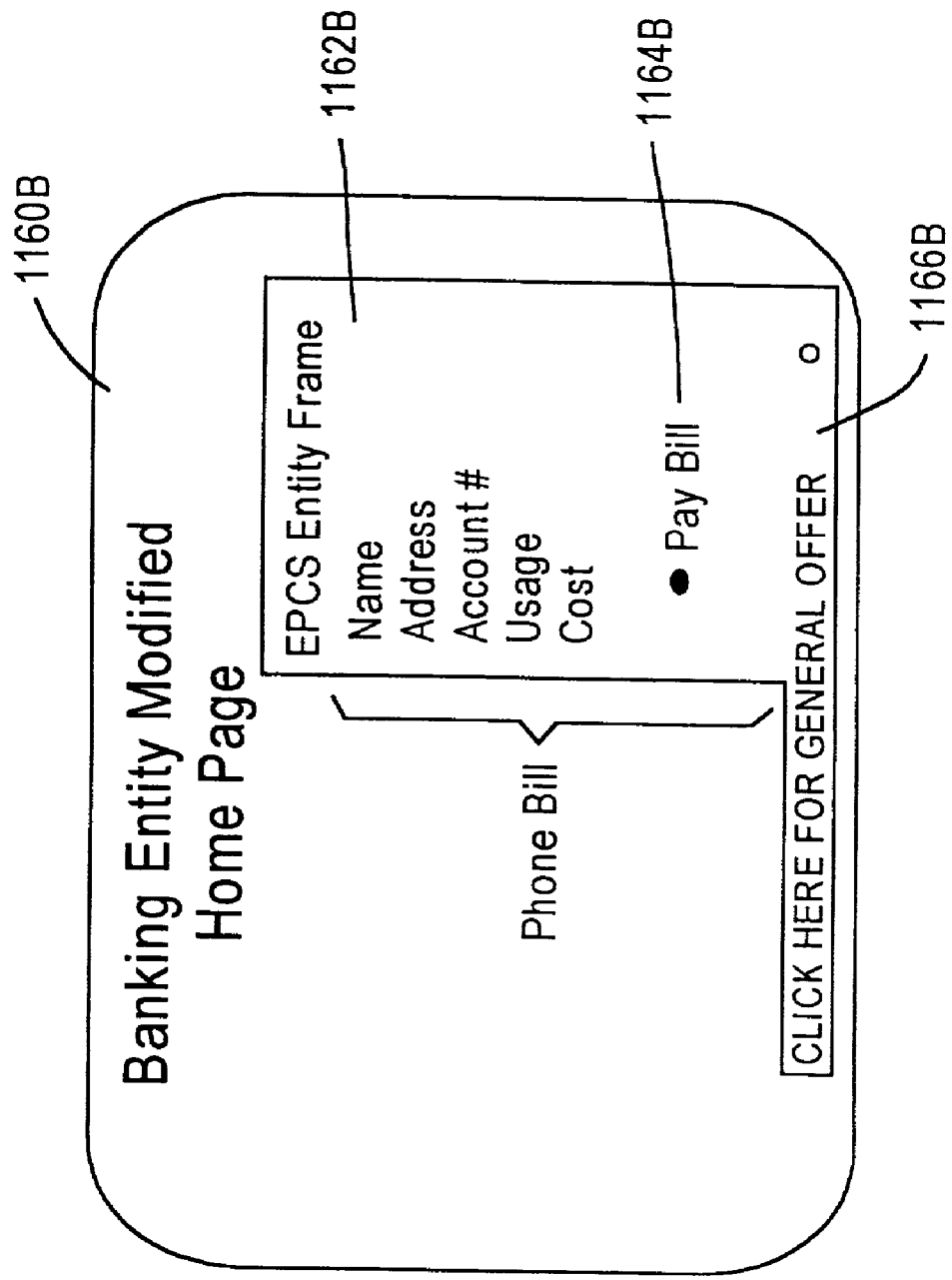
FIG. 25B shows another modified banking entity home page having an EPCS entity frame presenting detailed bill data and general promotional information to the first subscriber, in accordance with the present invention.

FIG. 25B shows a home page 1160B having an EPCS entity frame 1162B presenting the detailed phone bill data to the first subscriber, after a "view bill" request. The home page 1160B includes, within frame 1162B, the same information included in frame 1162A of FIG. 25A. However, the FIG. 25B home page 1160B does not include the special targeted information for presentation to the first subscriber. Rather, the EPCS entity frame 1162B only includes an icon 1166B which can be clicked on to present general, typically untargeted, supplemental information, e.g. a general offer to install an additional phone line within a facility, to the first subscriber. Hence, a more basic presentation is provided to the first subscriber.

Figure 25C:
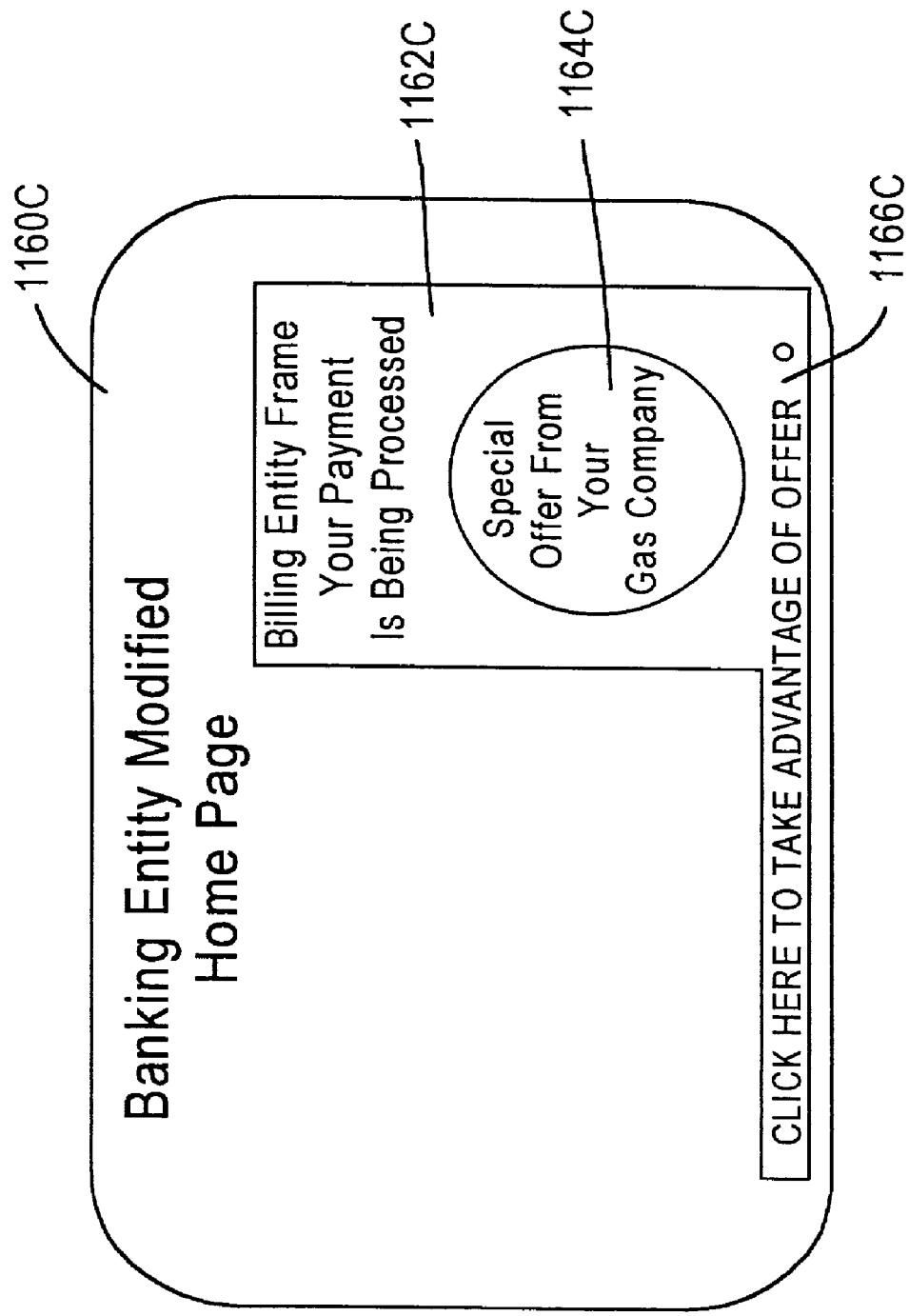
FIG. 25C shows another modified banking entity home page having a billing entity frame presenting only promotional information to the first subscriber, in accordance with the present invention.

FIG. 25C shows a home page 1160C having a billing entity frame 1162C presenting a description of a special promotional offering by the gas company to the first subscriber, without the presentation of detailed billing information, after a "pay bill" request is entered during presentation of the bill availability information. It should be noted that the special offering could be presented with the bill even though the pay bill request has been entered, if so desired. The home page 1160C includes, within frame 1162C, a description of the special offering 1164C, a message indicating the payment is being processed, and an icon 1166C which can be clicked on to place an order for the offered product. As discussed above, a special targeted promotional offering might be described or other supplemental information could, if desired, be presented to the first subscriber. The first subscriber may also be presented with a description of other offers which are being generally made to gas company customers. Hence, a rich presentation is provided to the first subscriber after a selecting "pay bill" from the EPCS presentation shown if FIG. 23C.

It will be understood that, in the case of the first subscriber, richer, targeted gas, cable and credit card bill presentations, and more basic, untargeted electric and phone bill presentations are provided by the respective billing entities 56. On the other hand, the second subscriber receives richer, targeted phone, cable and credit card bill presentations, and more basic, untargeted electric and gas bill presentations from the respective billing entities 56.

Yet another capability provided by the electronic bill presentment and payment system 50 allows the billing entity 56 to select those customers who will be forced to view supplemental information and/or bill detail before being permitted to pay a bill. The database component 32 associated with the billing entity 56 stores another flag or indicator in the biller-specific subscriber profile data which indicates those subscribers which are to be directed to, for example, the billing entity 56 for presentment of bill detail and/or supplemental information before being permitted to pay a bill. In this respect, the system 50 can assure a biller that a customer has viewed the supplemental information and/or bill detail. This other type of flag or indicator is also a magnet, and will be referred to as a force flag.

Figure 22C:
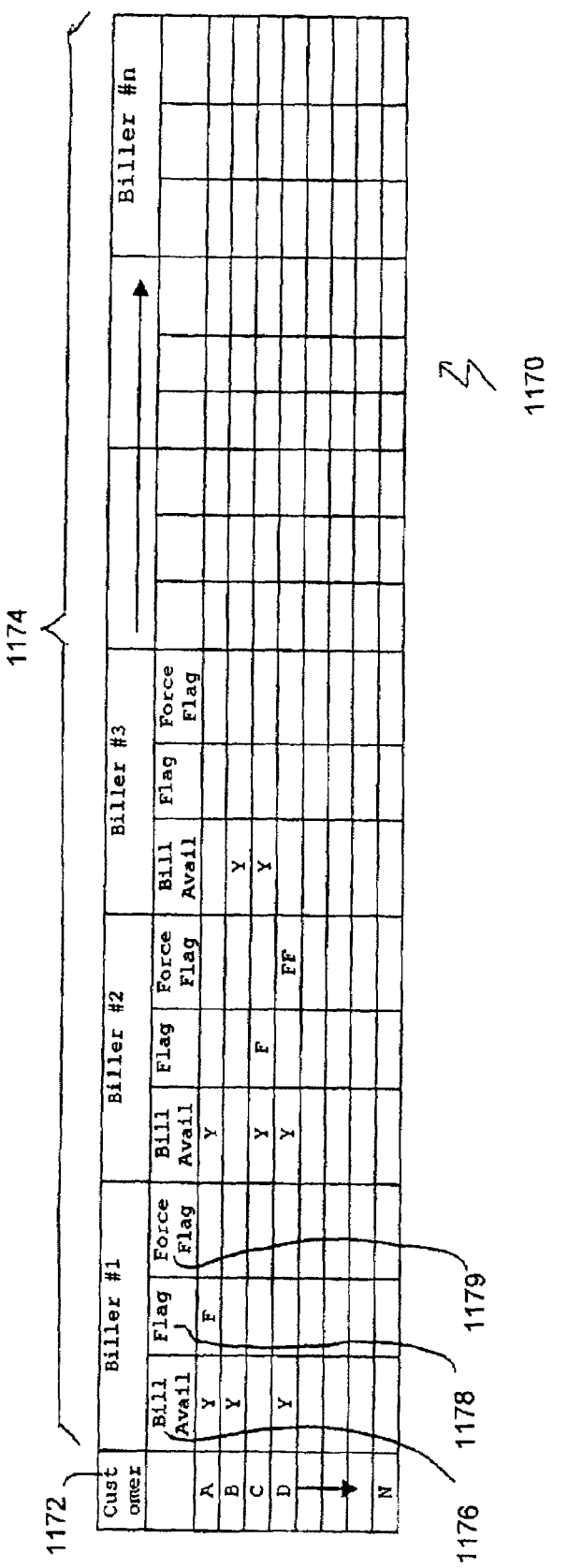
FIG. 22C is a further depiction of the EPCS database of FIG. 22A showing force flags for directing a user to a desired network address for supplemental information or bill detail presentation in accordance with the present invention.

FIG. 22C is a further depiction of database 1170, including a representation of the force flags 1179. As shown, the database 1170 also includes entries for user D. The force flag 1179 identifies the bills of those customers which are to be forced to view supplemental information and/or bill detail before making a payment and/or viewing bill detail. Force flag information, including the event or events with which a force flag is associated as well as network addresses to which users will be directed, is preferably provided to the EPCS database 1170 at the time the bill availability information is transmitted to the database by the billing entity 56, though it could be provided at different times. Force flag information includes URL's, the customers with whom the URL's are associated, and information associating the URL's with the customers. Updated force flag information is provided to the EPCS database 1170 as customers view forced supplemental information and/or bill detail so that once a user views forced information, that user will not be forced to view the same information again. It should be understood that force flag information is provided by the billing entity as the billing entity desires. The received force flag information is stored in database 1170 either for a predetermined period, determined by the billing entity 56, or for an indeterminate period, not being removed, altered, or changed until direction is received from the billing entity 56 to do so, though an indication of a customer having viewed supplemental information is stored upon the customer having first viewed the supplemental information.

As shown in FIG. 22C, user D has bills available from billers 1 and 2. The biller 2 bill availability information is associated with a force flag. The biller 1 bill availability information is not associated with a force flag. As described above, bill availability information may indicate that a bill is available, or may include bill summary information.

FIG. 22D is a further depiction of database 1180 which shows forced network addresses 1188 in association with the biller identifiers 1182, in addition to network addresses 1184 and 1186. As depicted, billers 1 and 2 are each associated with at least one forced network address. These forced addresses could be at a presentment server associated with the respective biller, could be at a presentment server associated with a different entity, or could be at a non-presentment server at either the respective biller or another entity. The other entity could be an entity not a part of the system 50.

Similar to the secondary network addresses discussed above, the number of different forced network addresses identified in database 1180 and associated with a biller could be more than one forced network address. In such a case, different force flags, each for example representing a different network address, are used in database 1170 to identify which of the multiple forced addresses a specific customer is to be directed for supplemental information and/or bill detail. This allows billers to not only tailor specific supplemental information and/or bill detail for a group of customers, but also to tailor specific supplemental information and/or bill detail for a particular bill of a particular customer.

The network addresses associated with force flags can include parameters which are passed from the EPCS entity 58 to the server hosting the network address. These parameters can include information identifying customers, and specific information to be presented such as a bill identifier, a force flag identifier, or other information. The server hosting the network address uses these parameters to customize information presented to the customer. In this manner, fewer network addresses need to be stored in database 1180, as a single network address can include customized information for individual customers.

Figure 23D:
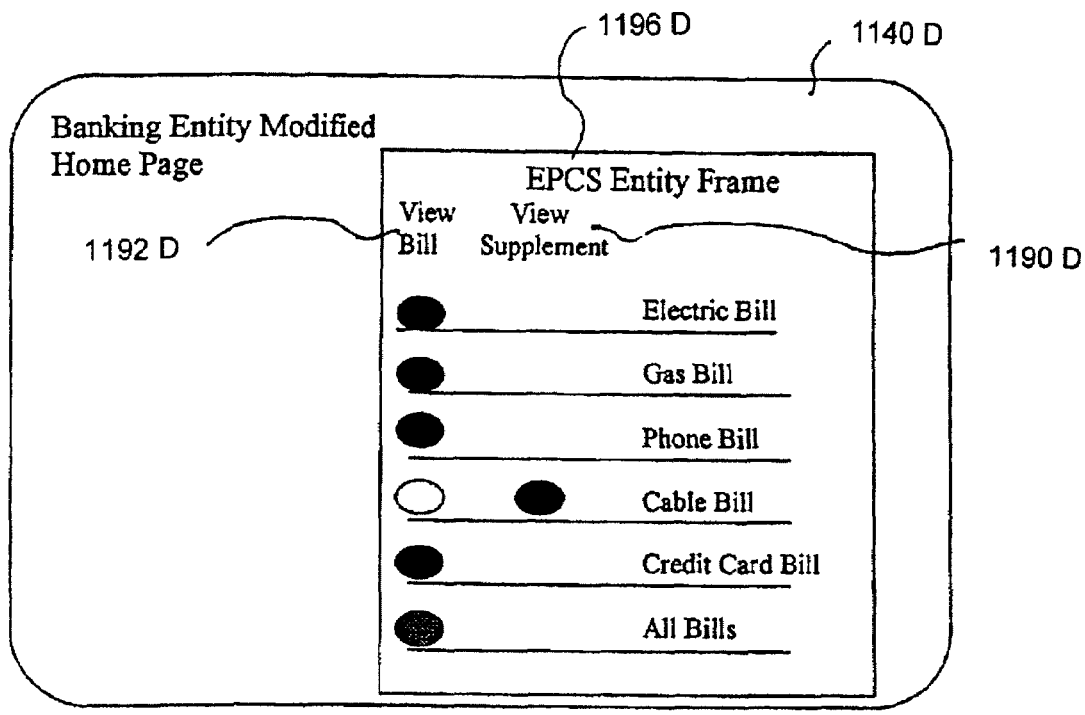
FIG. 23D shows a modified banking entity home page having a frame presenting new bill availability data showing supplemental information which is required to be viewed before a bill is viewed in accordance with the present invention.

Turning again to FIG. 21, the EPCS entity 58 presents aggregation data of new bill availability to user entity 52 in step 1216. Aggregation data of new bill availability can be presented to the user entity 52 by the EPCS entity 58 in yet another format when the forced viewing capabilities of the system 50 are utilized. As shown in FIG. 23D, the banking entity modified home page 1140D is similar to that shown in FIG. 23A, except that the EPCS frame 1196D includes "view supplement" icons 1190D and "view bill" icons 1192D. The listings of available bills (i.e., electric bill, gas bill, etc) are preferably not themselves icons, rather, they are plain text.

When a "view supplement" icon 1190D is selected the user is hyper-linked to a forced network address to obtain supplemental information. When a "view bill" icon 1192D is selected the user is hyper-linked to either a primary or a secondary address to obtain bill detail, or perhaps bill detail and additional supplemental information, similar to the discussion above.

In FIG. 23D, the "cable bill" is associated with a "view supplement" icon 1190D and a "view bill" icon 1192D. The "view bill" icon associated with the "cable bill", as well as the "view bill" icon associated with "all bills", is not available. An unavailable icon is preferably not selectable by the user. As shown in FIG. 23D, unavailable icons are presented to the user shaded. In an alternative, an unavailable icon may not be presented to the user in any form. That is, there is nothing to view or to select. Furthermore, in yet another alternative, an unavailable icon may be selectable by the user. However, upon selecting a selectable yet unavailable icon, the user could be presented a notice informing the user, for example, that a "view supplement" icon must first be selected before viewing a bill. No matter the presentation format of unavailable icons, the user must first view the supplemental information, in this example associated with the "cable bill", before viewing a bill. Likewise, the "view bill" icon associated with "all bills", discussed above, will not be available until the user has viewed all indicated supplemental information. It should be understood that if multiple bills are associated with forced supplemental information, a "view supplement" icon could be associated with "all bills". In such a case, selecting this icon would present the supplemental information associated with each bill.

To view supplemental information, a user selects, or clicks on, a "view supplement" icon 1190D. The user is then hyper-linked to a forced network address. This forced network address is stored in database 1180. As discussed above, the content of the forced network address may reside at a billing entity presentment server, another entity's presentment server, or a non-presentment server associated with the billing entity or another entity.

Figure 24E:
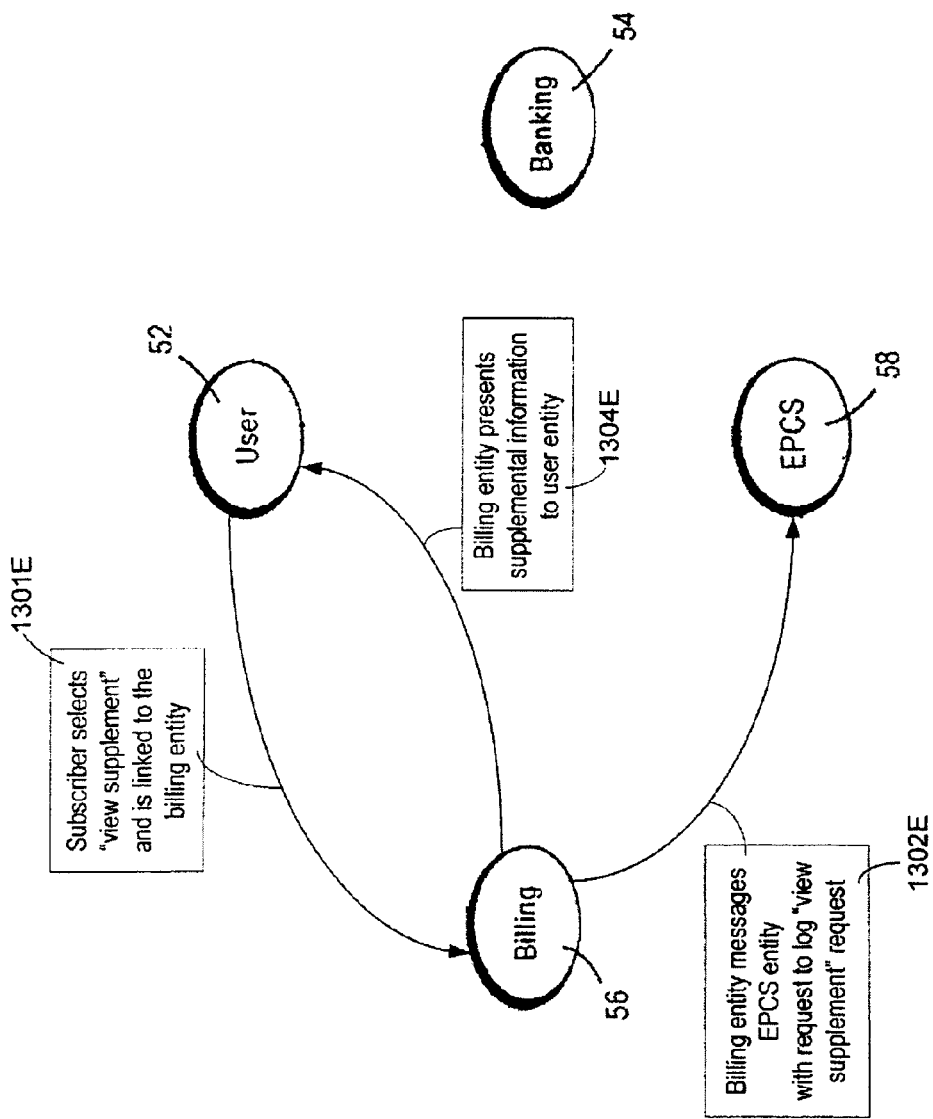
FIG. 24E is a flowchart diagram showing message flows between a user entity, a billing entity, and an EPCS entity in the electronic bill presentment and payment system shown in FIG. 4 for requesting required supplemental information from FIG. 23D, the required supplemental information stored at a billing entity, in accordance with the present invention.

Turning next to FIG. 24E, a first alternative flow of communications in accessing forced supplemental information is depicted. Following step 1216 of FIG. 21, the subscriber selects a "view supplement" icon 1190D and is linked to a network address at the billing entity 56, step 1301E. This linking is a redirection of the user's browser. The billing entity 56 messages the EPCS entity 58 to log the "view supplement" request event in step 1302E. The billing entity 56 presents the supplemental information to the user entity 52 in step 1304E. The EPCS entity 58 then removes the force flag associated with the subscriber and the biller from database 1170. It should be understood that the banking entity 54 could capture the subscriber request. Though not depicted in FIG. 24E, the banking entity 54 could message the EPCS entity 58 in place of, or in addition to, the billing entity 56.

Figure 24F:
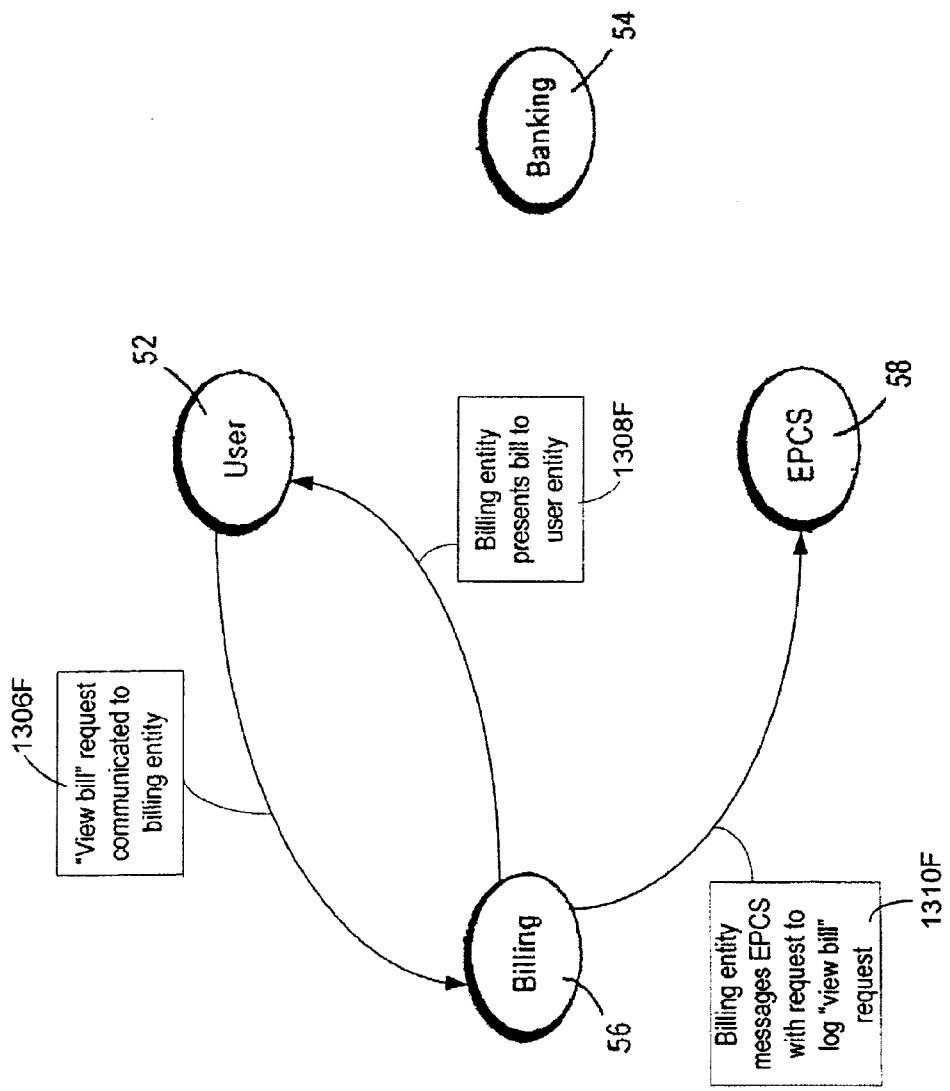
FIG. 24F is a flowchart diagram showing message flows between a user entity, a billing entity, and an EPCS entity in the electronic bill presentment and payment system shown in FIG. 4 for requesting bill detail from the billing entity frame of FIG. 25D, in accordance with the present invention.
Figure 24G:
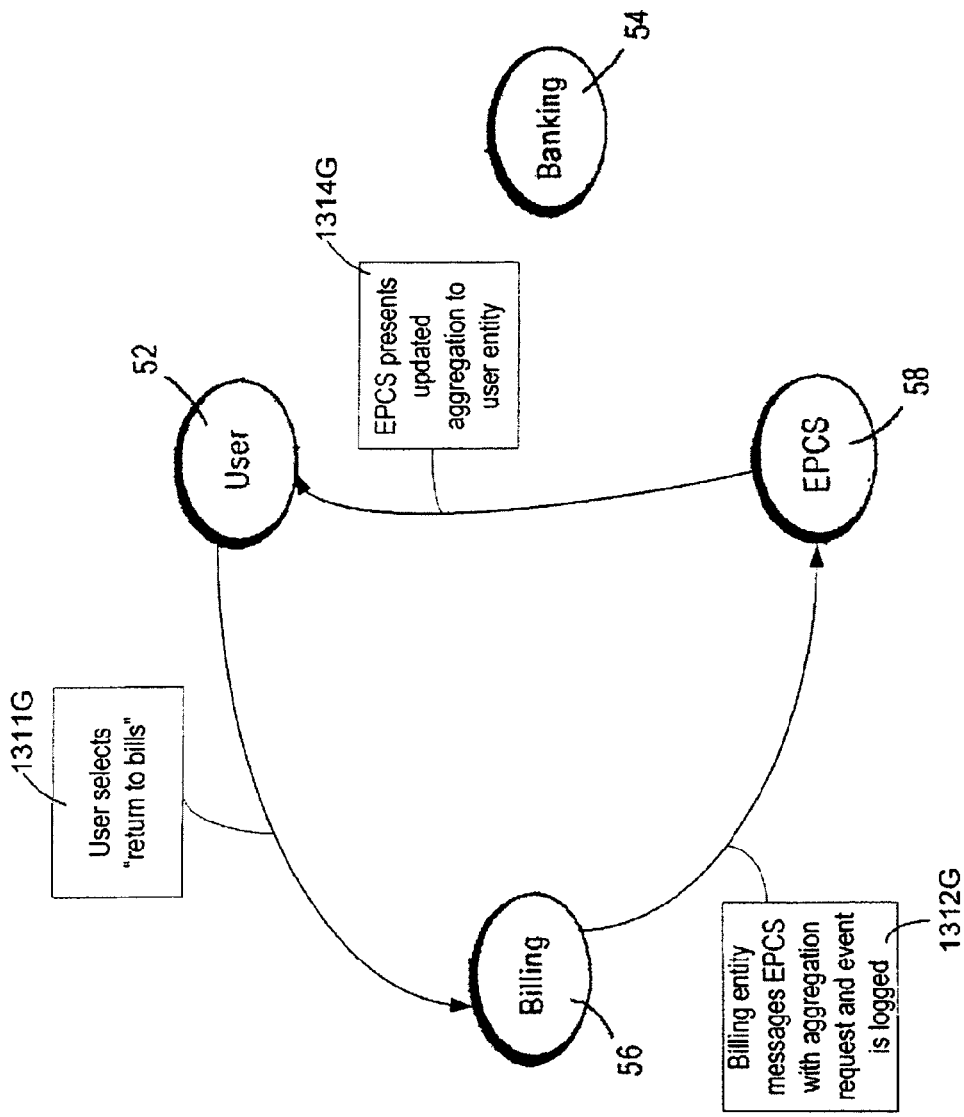
FIG. 24G is a flowchart diagram showing message flows between a user entity, a billing entity, and an EPCS entity in the electronic bill presentment and payment system shown in FIG. 4 for requesting updated bill aggregation data from the billing entity frame of FIG. 25D, in accordance with the present invention.
Figure 24H:
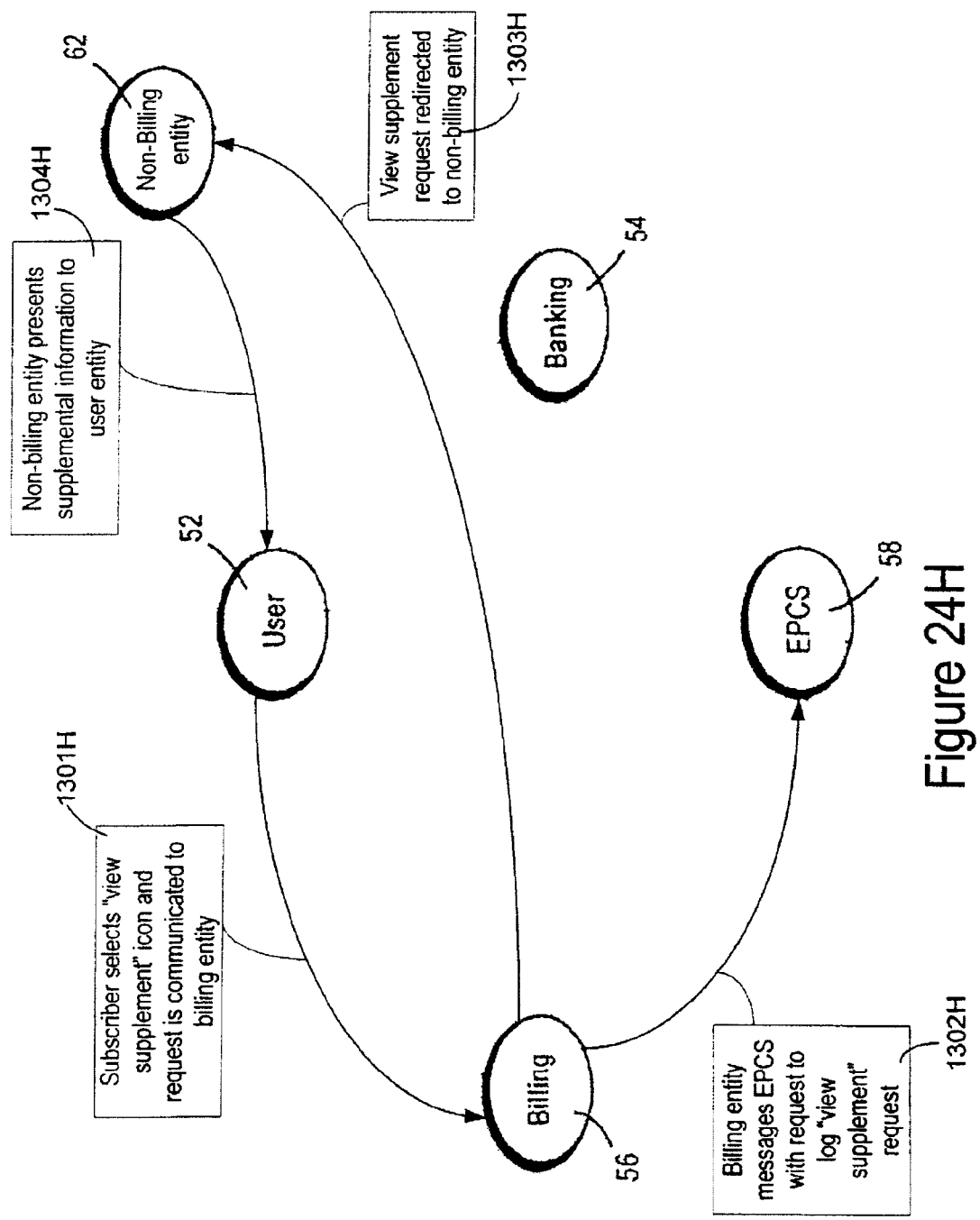
FIG. 24H is a first flowchart diagram showing message flows between a user entity, a billing entity, and an EPCS entity in the electronic bill presentment and payment system shown in FIG. 4, as well as an entity other than the billing entity, for requesting required supplemental information from FIG. 23D, the required supplemental information stored at the entity other than the billing entity, in accordance with the present invention.
Figure 24I:
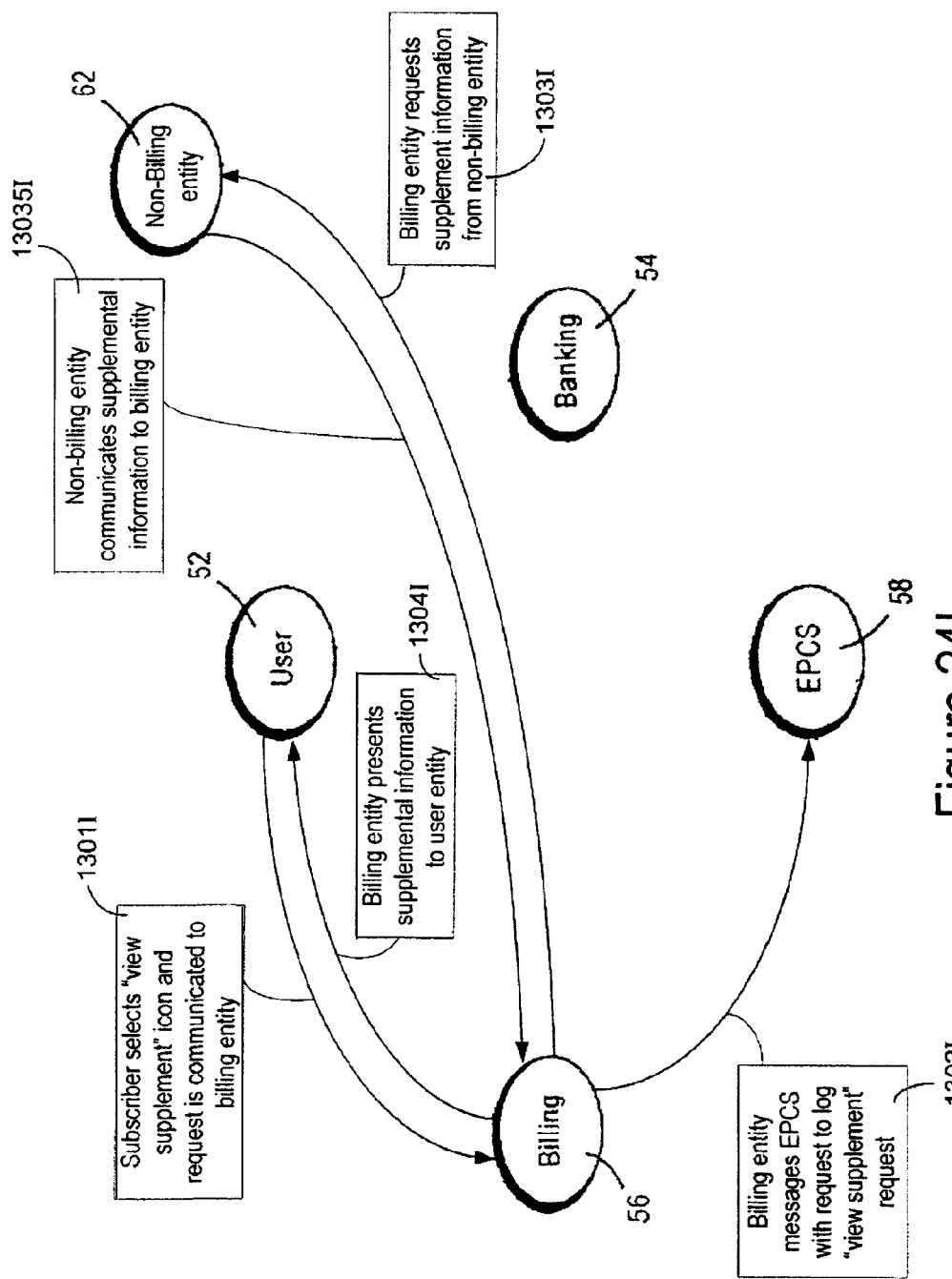
FIG. 24I is a second flowchart diagram showing alternate message flows between the entities shown in FIG. 24H for requesting required supplemental information from FIG. 23D, the required supplemental information stored at the entity other than the billing entity, in accordance with the present invention.

Turning next to FIG. 24H, a second alternative flow of communications in accessing forced supplemental information is depicted. In this alternative, the billing entity 56 does not message the EPCS entity 58 to log the "view supplement" request. Rather, following step 1216 of FIG. 21, the subscriber selects a "view supplement" icon 1190D and the request is routed to the EPCS entity 58, step 1301H. The EPCS entity 58 then logs the "view supplement" request upon receipt of the request. The request is then routed to the billing entity 56, step 1302H. The billing entity 56 then presents the supplemental information to the user entity 52 in step 1304H. This alternative is especially advantageous when the supplemental information is stored at a server other than a server associated with the billing entity 56, such as the EPCS entity 58, a billing aggregator, an alternative bill presentment and payment system, or other entity, as each of these alternative storage sites has a different level of integration with the system 50.

Figure 25D:
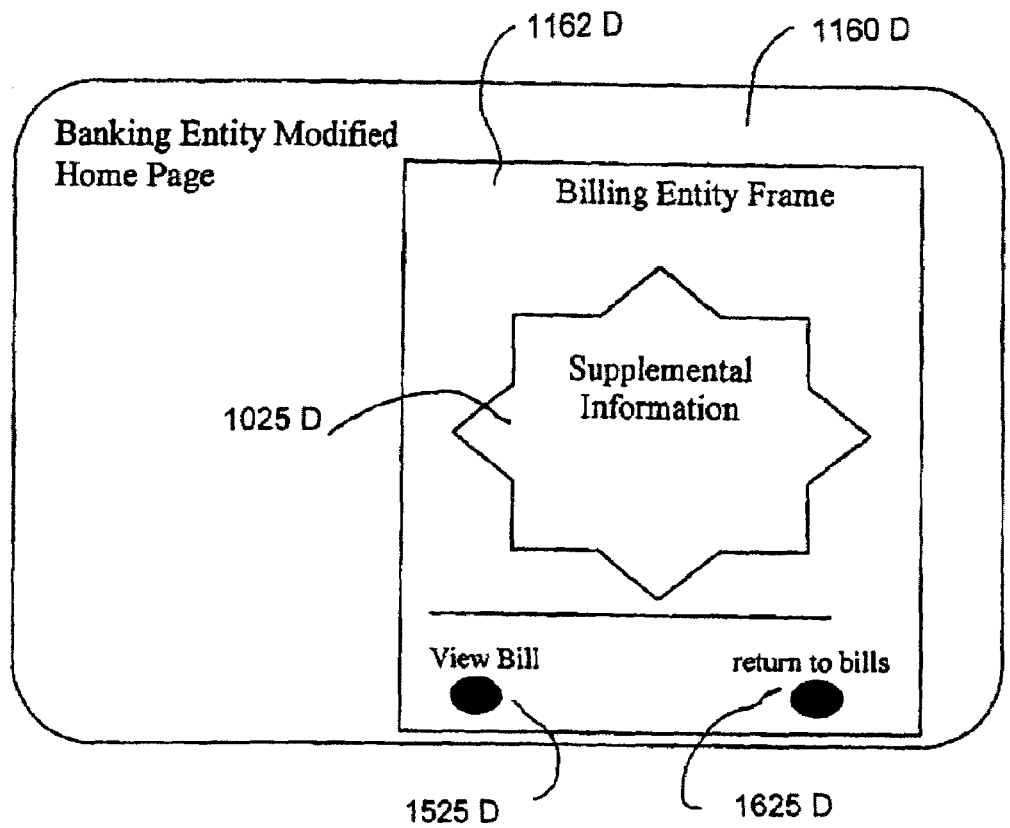
FIG. 25D shows another modified banking entity home page having a billing entity frame presenting forced supplemental information and having a "view bill" icon and a "return to bills" icon, in accordance with the present invention.

The supplemental information could be presented in a billing entity frame in a modified home page of the banking entity 54, or in a separate page from the banking entity 54 home page. Preferably, the supplemental information is presented via a billing entity 56 frame. FIG. 25D depicts the supplemental information 1025D presented in a billing entity frame 1162D within a modified banking entity home page 1160D. This frame also includes a "view bill" icon 1525D and a "return to bills" icon 1625D.

FIGS. 24F and 24G depict the flow of communications after selection of an icon in FIG. 25D. In step 1306F of FIG. 24F, after the "view bill" icon 1525D is selected from the billing entity frame 1162D of FIG. 25D, the request is communicated from the user entity 52 to the billing entity 56. The billing entity 56 then presents the bill to the user entity 52 at step 1308F. The billing entity also messages the EPCS entity 58 to log the "view bill" request event, step 1310F.

As shown in FIG. 24G, when the user selects the "return to bills" icon 1625D from the billing entity frame 1162D of FIG. 25D, step 1311G, the billing entity 56 messages the EPCS entity 58 with an aggregation data request, and the request is logged, step 1312G. The EPCS entity 58 then presents updated aggregation data of new bill availability to the user entity 52, in an EPCS entity frame, as described above and depicted in FIG. 21, step 1216.

Figure 23E:
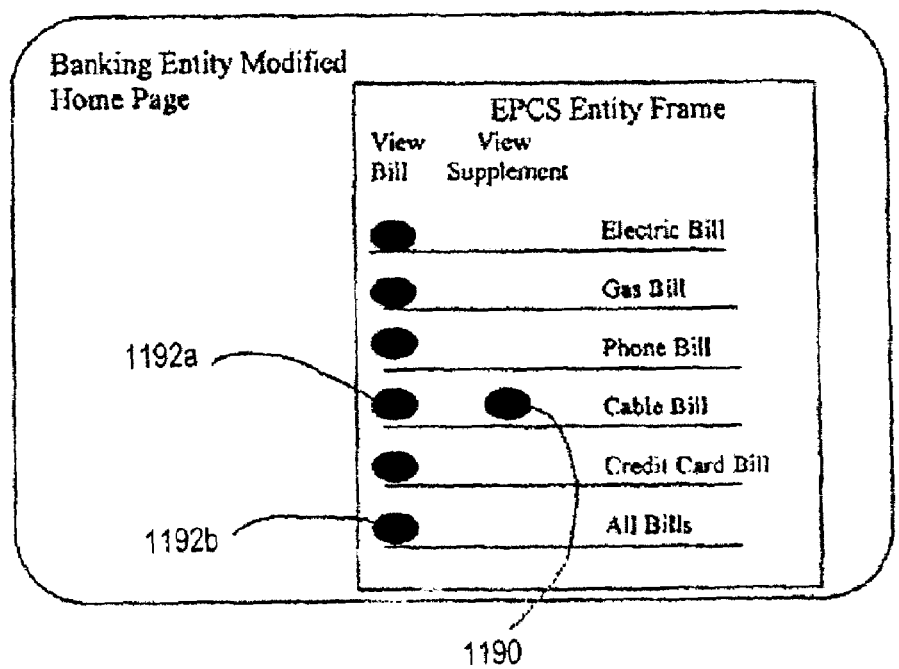
FIG. 23E shows the modified banking entity home page of FIG. 23D subsequent to the required supplemental information having been viewed.

As shown in FIG. 23E, the "view bill" icon 1192*a* associated with the "cable bill" and the "view bill" icon 1192*a* associated with "all bills" are now available, as the subscriber has viewed the supplemental information and the "cable bill" force flag for this user has been removed. Also as shown in FIG. 23E, the "view supplement" icon 1190 associated with the "cable bill" is also available, should the user wish to once again view the supplemental information.

The supplemental information from the billing entity 56 could also be presented to the subscriber via a second page separate from the banking entity home page. The second page is preferably spawned in a new window after selection of a "view supplement" icon, as will be recognized by one skilled in the art. This new page, containing the supplemental information, could also contain the "view bill" and/or the "return to bills" icons, discussed above. If this page does contain one of or both of these icons, selecting the "view bill" icon from this separate page causes the billing entity 56 to present the bill to the subscriber in the billing entity frame 1162D in the banking entity modified home page 1160D, as described above and depicted in steps 1306F through 1310F of FIG. 24F. Selecting the "return to bills" icon causes the EPCS entity 58 to present updated aggregation data to the subscriber in an updated EPCS frame, as described above and depicted in steps 1312G through 1314G of FIG. 24G. If the separate page does not include these icons, the EPCS entity 58 immediately presents updated aggregation data in an EPCS frame upon receiving the request to log the "view supplement" request from the billing entity 56, as described above and shown in FIG. 24E, or upon receiving a request to view supplemental information as described above and shown in FIG. 24H. A biller preferably provides an indication to the EPCS entity 58 that a forced network address will be presented in a separate page, and an indication if that page will or will not include these bill related icons.

Figure 23F:
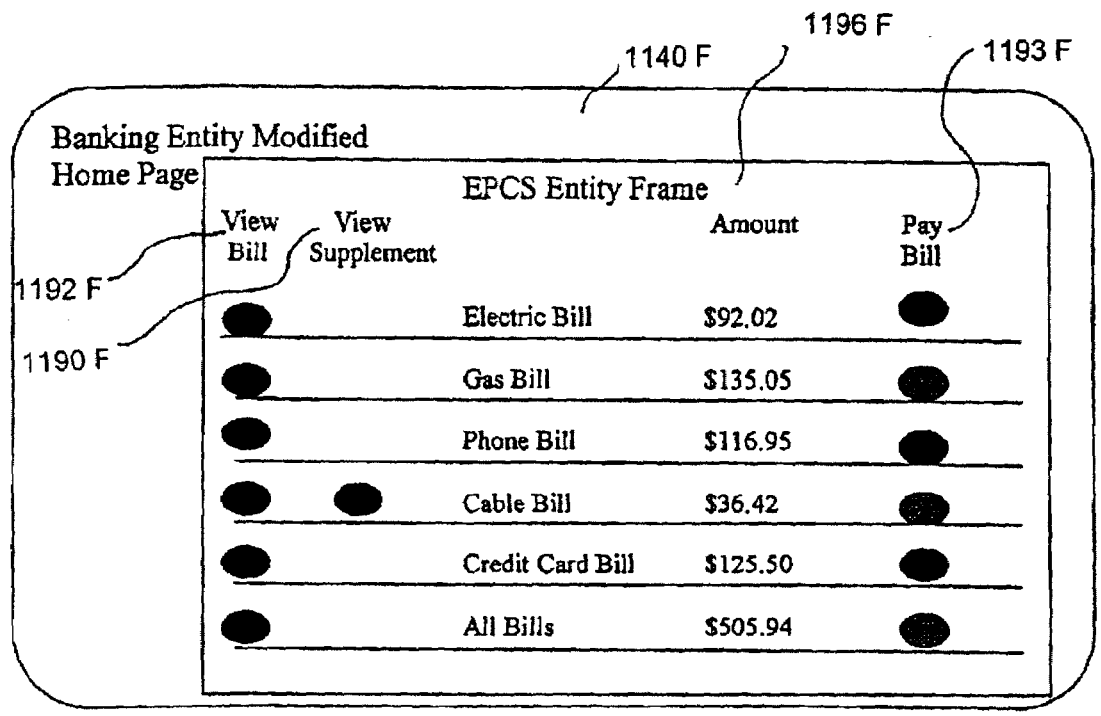
FIG. 23F shows a modified banking entity home page similar to that shown in FIG. 23F, except that the home page has a frame presenting new bill availability data which includes total bill amounts, as well as showing supplemental information which is required to be viewed before a bill is viewed in accordance with the present invention.

As discussed above and shown in FIG. 23C, an EPCS entity frame could include bill amounts. Also as discussed above and shown in FIG. 23D, an EPCS entity frame could include "view supplement" icons which must be first selected before corresponding "view bill" icons can be selected. FIG. 23F depicts an EPCS entity frame 1196F which combines the features depicted in FIGS. 23C and 23D. In FIG. 23F, the banking entity modified home page 1140F includes an EPCS entity frame 1196F which includes "view supplement" icons 1190F, "view bill" icons 1192F, "pay bill" icons 1193F, and bill amounts.

In this Figure the "pay bill" icon associated with the "gas bill", the "pay bill" icon associated with the "cable bill", and the "pay bill" icon associated with "all bills" are each unavailable. The gas biller and the cable biller both require that the customer first view information before paying the respective bill. Because, in this example, the supplemental information associated with the "cable bill" and the bill detail associated with the "gas bill" have not both been viewed, the user is unable to utilize the "pay bill" icon associated with "all bills." It should be understood that the "electric bill", "phone bill", and "credit card" bill are available for payment even though the remaining bills are not yet payable.

In this example, the "cable bill" is associated with a "view supplement" icon. Similar to the above discussion relating to forced viewing of supplemental information before viewing a bill, the "pay bill" icon is not available, that is, payment cannot be made, until the customer views supplemental information.

The flow of communications to view supplemental information presented in FIG. 23F is the same as to view supplemental information presented in FIG. 23D. The first alternative, as depicted in FIG. 24E and discussed above, may be utilized. The user selects the "view supplement" icon associated with the "cable bill" and the request is communicated to the billing entity 56. The billing entity 56 then presents the supplemental information to the user entity 52. The billing entity 56 also messages the EPCS entity 58 with a request to log the "view supplement" request event. Or, the second alternative may be utilized, also as discussed above and depicted in FIG. 24H. A "view supplement" request from the subscriber is routed to the EPCS entity 58, from where it is redirected to the billing entity 56. The EPCS entity 58 logs the request when it is received from the user.

The presentation of the supplemental information, also as discussed above, could be via a billing entity frame within the banking entity home page, or could be via a separate page. If via a separate page which does not contain bill related icons, upon EPCS entity 58 receipt of the request to log a "view supplement" request, or upon receipt of the "view supplement" request itself, the EPCS entity 58 preferably provides updated aggregation data to the user entity 52 via an EPCS frame in the banking entity home page, as discussed above. For presentation of supplemental information via a billing entity frame, or for presentation via a separate page containing bill related icons, the presentation and flow of communications are discussed below.

Figure 25E:
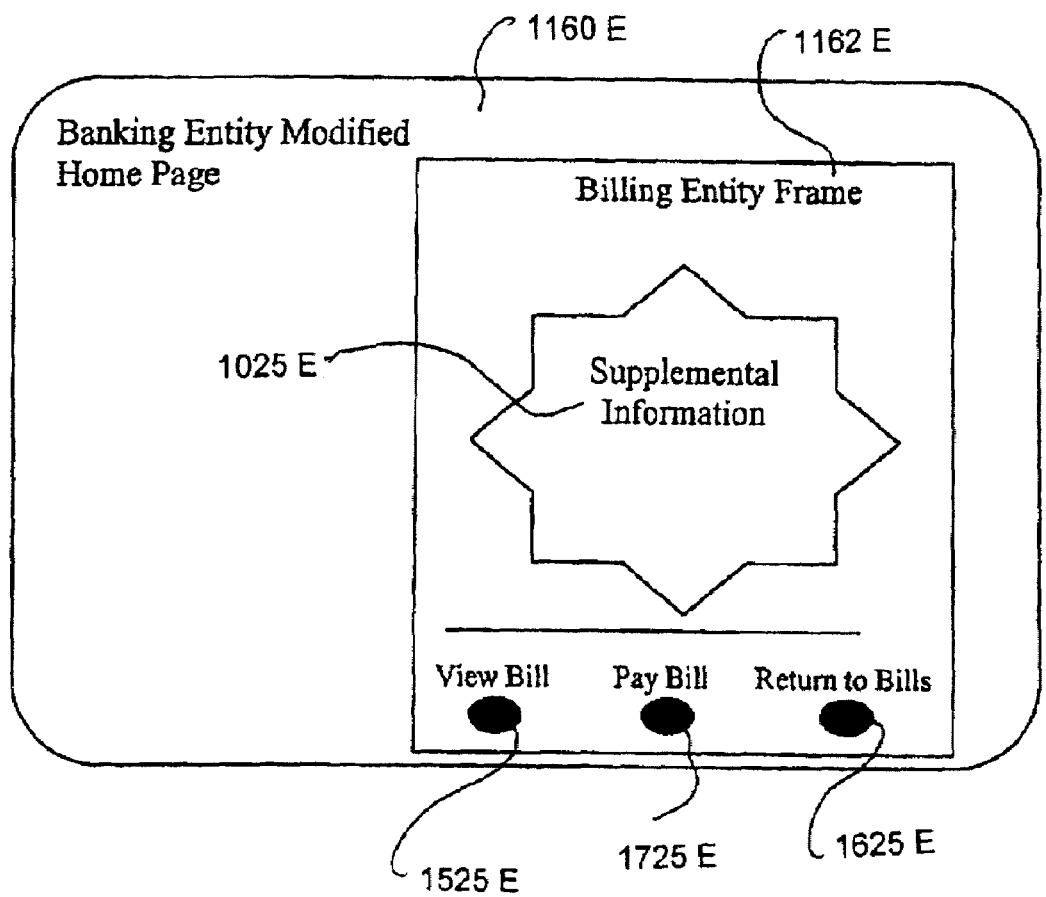
FIG. 25E shows another modified banking entity home page having a billing entity frame presenting forced supplemental information and having "view bill", "pay bill", and "return to bills" icons, in accordance with the present invention.

FIG. 25E depicts supplemental information 1025E presented via a billing entity frame 1162E within a modified banking entity home page 1160E. The billing entity frame 1162E includes a "return to bills" icon 1625E, a "view bill" icon 1525E, and a "pay bill" icon 1725E. It should be understood that the supplemental information could contain just one, or any combination of, these icons. Preferably, at a minimum, an EPCS frame will include a "return to bills" icon 1625E. In the present example, the cable customer is required to view supplemental information before paying his bill. Because the customer has performed the required condition of viewing the supplemental information, whereby performance of the obligation is confirmed by the request to view the supplemental information, the billing entity 56 makes the "pay bill" icon 1725E available in the supplemental information presented to the user. The supplemental information could be presented via a separate page. In such a case, bill related icons could be included in the supplemental information, as discussed above.

Also in FIG. 23F, the "gas bill" is not associated with a "view supplement" icon. However, as will be understood by reference to the discussion above relating to viewing of supplemental information before viewing bill details, the gas biller requires that this customer views bill detail before making payment. The gas biller supplies a forced network address to the EPCS entity 58 for storage in database 1180 and indicates to the EPCS entity 58 that the gas bill is magnetized, thus a force flag is associated with the gas biller's customer. This force flag directs the customer to bill detail. Upon the customer viewing bill detail, the customer can make payment. Bill detail information, similar to the discussion above, could include bill related icons, such as a "pay bill" icon.

At this point it should be noted that while the foregoing detailed description was directed to an electronic bill presentment and payment technique, any number of system types can employ the distributed database entities 30 to facilitate distributed data accessing within a network in accordance with the present invention. It should further be noted that at least the presentment portion of this electronic bill presentment and payment technique can be practiced by a biller entity without utilizing an EPCS entity or a Banking entity. In such a case, a biller and a customer would communicate directly with one another in requesting billing information and presenting bills and supplemental information.

The present invention is not to be limited in scope by the specific embodiments described herein. Indeed, various modifications of the present invention in addition to those described herein, will be apparent to those of skill in the art from the foregoing description and accompanying drawings. Accordingly, the claims set forth below should be construed in view of the full breadth and spirit of the invention as disclosed herein.

What is claimed is:

1. A method for electronic bill presentment and payment, comprising:
   transmitting bill information and forced-to-view information associated with a bill, wherein the forced-to-view information is associated with supplemental information that must be accessed prior to accepting a payment request for the bill;
   subsequent to transmission of the first information and second information, receiving a message that the supplemental information has been accessed; and
   accepting a payment request for the bill only after the message has been received.

2. The method of claim 1, further comprising storing the bill information and the forced-to-view information; and
   storing an indicator that the supplemental information has been accessed.

3. The method of claim 1, further comprising transmitting, prior to accepting the payment request, an indication that payment of the bill is available.

4. The method of claim 1, wherein the bill information includes at least a portion of bill summary information or a link to bill detail.

5. The method of claim 1, wherein the forced-to-view information comprises a link to supplemental information.

6. The method of claim 1, further comprising receiving the bill information prior to transmitting the bill information and the forced-to-view information.

7. The method of claim 1, wherein the supplemental information is a special announcement, a promotional offer, a regulatory notice, or a notice associated with an account.

8. The method of claim 1, further comprising transmitting web page data, wherein web page data is configured to render an icon, wherein the selection of the forced-to-view information is associated with the presentation of the ion.

9. The method of claim 8, wherein the selection of the icon results in the access of the supplemental information.

10. The method of claim 8, wherein selection of the icon causes the receipt of the message that the supplemental information has been accessed.

11. The method of claim 10, wherein the icon is a pay bill icon, and wherein selection of the pay bill icon causes the payment request for the bill to be submitted.

12. The method of claim 11, wherein selection of the pay bill icon further causes the receipt of the message that the supplemental information has been accessed.

13. A system for electronic bill presentment and payment, comprising a computer-readable storage medium having one or more computer-readable program code portions stored therein, the one or more computer-readable program code portions comprising at least one executable portion operable to:

transmit bill information and forced-to-view information associated with a bill, wherein the forced-to-view information is associated with supplemental information that must be accessed prior to accepting a payment request for the bill;

subsequent to transmission of the bill information and the forced-to-view information, receive a message that the supplemental information has been accessed; and accept a payment request for the bill only after the message has been received.

14. The system of claim 13, further comprising at least one memory, and at least one executable portion operable to:

store the bill information and the forced-to-view information in the memory; and store an indicator that the supplemental information has been accessed.

15. The system of claim 13, further comprising at least one executable portion operable to:

transmit, prior to accepting the payment request, an indicator that payment of the bill is available.

16. The system of claim 13, wherein the bill information includes at least a portion of bill summary information or a link to bill detail.

17. The system of claim 13, wherein the forced-to-view information comprises a link to supplemental information.

18. The system of claim 13, further comprising at least one executable portion operable to:

receive the bill information, prior to the transmission of the bill information and the forced-to-view information.

19. The system of claim 13, wherein the supplemental information is a special announcement, a promotional offer, a regulatory notice, or a notice associated with an account.

20. The system of claim 13, further comprising at least one executable portion operable to transmit web page data, wherein web page data is configured to render an icon, wherein the selection of the forced-to-view information is associated with the presentation of the ion.

21. The system of claim 20, wherein the selection of the icon results in the access of the supplemental information.

22. The system of claim 20, wherein selection of the icon causes the receipt of the message that the supplemental information has been accessed.

23. The system of claim 22, wherein the icon is a pay bill icon, and wherein selection of the pay bill icon causes the payment request for the bill to be submitted.

24. The system of claim 23, wherein selection of the pay bill icon further causes the receipt of the message that the supplemental information has been accessed.

25. A method of electronic bill presentment and payment, comprising:

transmitting bill information and forced-to-view information associated with a bill, wherein the forced-to-view information includes supplemental information that must be accessed prior to accepting a payment request for the bill;

subsequent to transmitting the bill information and the forced-to-view information, receiving a message that the forced-to-view information has been accessed; and accepting a payment request for the bill only after the message has been received.

26. The method of claim 1, wherein the supplemental information is bill detail.

27. The system of claim 13, wherein the supplemental information is bill detail.

* * * * *

UNITED STATES PATENT AND TRADEMARK OFFICE
CERTIFICATE OF CORRECTION

| | | |
|---|---|---|
| PATENT NO. | : 7,302,411 B2 | Page 1 of 1 |
| APPLICATION NO. | : 09/798895 | |
| DATED | : November 27, 2007 | |
| INVENTOR(S) | : Ravi Ganesan and Kenneth Hobday | |

It is certified that error appears in the above-identified patent and that said Letters Patent is hereby corrected as shown below:

At column 34, line 33, after "to" delete "transmission of" and insert --transmitting--. After "the" delete "first" and insert --bill--.

At column 34, line 34, delete "second" and insert --the forced-to-view--.

Signed and Sealed this

Second Day of September, 2008

JON W. DUDAS
*Director of the United States Patent and Trademark Office*